United States Patent
Lin et al.

(10) Patent No.: US 9,851,531 B2
(45) Date of Patent: Dec. 26, 2017

(54) OPTICAL LENS ASSEMBLY AND IMAGING LENS WITH INFRARED RAY FILTERING

(71) Applicant: GeniuS Electronic Optical Co., Ltd., Taichung (TW)

(72) Inventors: Wen Hua Lin, Taichung (TW); Tsang-Yi Liao, Taichung (TW); Hong-Yen Lin, Taichung (TW); Guo Jin Su, Taichung (TW); Chi Sheng Fang, Taichung (TW)

(73) Assignee: GeniuS Electronic Optical Co., Ltd, Taichung (TW)

( * ) Notice: Subject to any disclaimer, the term of this patent is extended or adjusted under 35 U.S.C. 154(b) by 326 days.

(21) Appl. No.: 13/654,398

(22) Filed: Oct. 17, 2012

(65) Prior Publication Data
US 2013/0301136 A1    Nov. 14, 2013

(30) Foreign Application Priority Data
May 11, 2012   (TW) .............................. 101116933 A

(51) Int. Cl.
*G02B 13/00*    (2006.01)

(52) U.S. Cl.
CPC ..... *G02B 13/0045* (2013.01); *G02B 13/0035* (2013.01)

(58) Field of Classification Search
CPC .................... G02B 5/208; G02B 5/28–5/289
USPC ................................ 359/350–361, 577–590
See application file for complete search history.

(56) References Cited

U.S. PATENT DOCUMENTS

| | | | | |
|---|---|---|---|---|
| 6,768,581 B1 * | 7/2004 | Yip | ........................ | G02B 1/115 359/212.1 |
| 7,924,501 B2 * | 4/2011 | Chen | ...................... | G02B 1/115 359/359 |
| 8,520,301 B2 * | 8/2013 | Lin | ........................ | G02B 7/021 359/359 |
| 2006/0291061 A1 * | 12/2006 | Iyama et al. | .................. | 359/614 |
| 2008/0100910 A1 * | 5/2008 | Kim | ........................ | G02B 5/282 359/356 |
| 2011/0080636 A1 * | 4/2011 | Nakanishi | .............. | G02B 5/223 359/359 |
| 2012/0099188 A1 * | 4/2012 | Akozbek | ................ | G02B 5/208 359/360 |

(Continued)

FOREIGN PATENT DOCUMENTS

| | | |
|---|---|---|
| CN | 1536377 | 10/2004 |
| CN | 101013253 | 8/2007 |

OTHER PUBLICATIONS

Office Action from China Patent Application No. 201210145528.9 dated Feb. 2, 2015.

*Primary Examiner* — Bumsuk Won
*Assistant Examiner* — Jeffrey Madonna
(74) *Attorney, Agent, or Firm* — Baker & McKenzie LLP

(57) ABSTRACT

Example embodiments provide for an optical lens assembly and imaging lens with IR light filtering. The lens comprises a body having two surfaces and a plurality of layers of optical thin film layered along a direction formed on at least one surface. The optical thin films comprise less than 20 layers and thicker than 400 nm and thinner than 2000 nm thickness. Through the alternately layered layers of optical thin film, the transmittance of the lens for incident light in infrared ray band is reduced. Therefore, the infrared ray is mostly filtered without use of an additional infrared ray filter.

7 Claims, 26 Drawing Sheets

Transmittance (%) VS Wavelength (nm)

(56) References Cited

U.S. PATENT DOCUMENTS

2013/0155495 A1* 6/2013 Wang .................. G02B 3/00
                                                                 359/356
2013/0258455 A1* 10/2013 Pei .................... G02B 5/223
                                                                 359/355

* cited by examiner

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

Transmittance (%) VS Wavelength (nm)

OPTICAL LENS ASSEMBLY AND IMAGING LENS WITH INFRARED RAY FILTERING

TECHNICAL FIELD

Present embodiments relate to an optical lens assembly and an imaging lens, and particularly, relates to an optical lens assembly and an imaging lens with infrared (IR) ray filtering.

BACKGROUND

FIG. 1 depicts a structure of a conventional optical lens assembly. As shown, the conventional optical lens assembly 1 is composed of three pieces of conventional imaging lens 10, 20, 30, a cover glass 80, an image sensor 90 and an IR filter 100. Each imaging lens 10, 20, 30 has two surfaces 11, 12, 21, 22, 31, 32, wherein each surface 11, 21, 31 facing the object side will be referred to as an "object-side surface" and wherein each surface 12, 22, 32 facing the image side will be referred to as an "image-side surface". The imaging lenses 10, 20, 30 are positioned in a lens base (not shown) through a lens barrel (not shown). A focusing module (not shown) on the lens base drives the lens barrel and changes the relative position and distance between the lens barrel and the image sensor 90 to focus incident light, and to enable the image sensor 90 to sense a clear image. The cover glass 80 protects the image sensor 90. To enable a better sensing of the image, prior to the incident light reaching the image sensor 90, the IR filter 100 is provided to block the IR band wavelengths of the incident light from reaching the image sensor 90, which effectively prevents the image quality from being affected by the IR band rays.

FIGS. 2 to 7 illustrate the spectrum resulting from the IR light filtering effect of conventional IR filters. The conventional imaging lenses used herein are made of E48R material provided by ZEONEX having refractive index of 1.533. Additionally, the IR filter used here are made of glass having on its object-side surface 60 layers of IR filtering thin films, and on its image-side surface 4 layers of anti-reflection layers which have higher transparency to visible light. Please refer to Tables 1-3 for the detail thickness and total thickness of each layer of IR filtering thin films or anti-reflection thin films on the object-side surface and/or the image-side surface of the IR filter:

TABLE 1

| | | | |
|---|---|---|---|
| The object-side surface | Total amount of the IR filtering thin films | 60 | |
| | Material | $Ti_3O_5$ | $SiO_2$ |
| | Physical total thickness (nm) | 3377.95 | 5331.76 |
| | Total thickness (nm) | 8709.71 nm | |
| The image-side surface | Total amount of the anti-reflection thin films | 4 | |
| | Material | $Ti_3O_5$ | $SiO_2$ |
| | Physical total thickness (nm) | 143.69 | 127.7 |
| | Total thickness (nm) | 271.39 nm | |

TABLE 2

The object-side surface (IR filtering thin films)

| Layer | 1 | 2 | 3 | 4 | 5 | 6 | 7 | 8 | 9 | 10 |
|---|---|---|---|---|---|---|---|---|---|---|
| Material | $Ti_3O_5$ | $SiO_2$ | $Ti_3O_5$ | $SiO_2$ | $Ti_3O_5$ | $SiO_2$ | $Ti_3O_5$ | $SiO_2$ | $Ti_3O_5$ | $SiO_2$ |
| Physical thickness | 116.41 | 185.05 | 113.71 | 178.96 | 106.94 | 171.36 | 108.2 | 173.86 | 105.72 | 171.09 |

| Layer | 11 | 12 | 13 | 14 | 15 | 16 | 17 | 18 | 19 | 20 |
|---|---|---|---|---|---|---|---|---|---|---|
| Material | $Ti_3O_5$ | $SiO_2$ | $Ti_3O_5$ | $SiO_2$ | $Ti_3O_5$ | $SiO_2$ | $Ti_3O_5$ | $SiO_2$ | $Ti_3O_5$ | $SiO_2$ |
| Physical thickness | 172.32 | 172.46 | 105.42 | 171.28 | 106.98 | 171.74 | 105.41 | 171.73 | 106.8 | 171.45 |

| Layer | 21 | 22 | 23 | 24 | 25 | 26 | 27 | 28 | 29 | 30 |
|---|---|---|---|---|---|---|---|---|---|---|
| Material | $Ti_3O_5$ | $SiO_2$ | $Ti_3O_5$ | $SiO_2$ | $Ti_3O_5$ | $SiO_2$ | $Ti_3O_5$ | $SiO_2$ | $Ti_3O_5$ | $SiO_2$ |
| Physical thickness | 105.72 | 172.27 | 106.86 | 171.73 | 106.47 | 173.26 | 107.59 | 173.45 | 108.25 | 176.26 |

| Layer | 31 | 32 | 33 | 34 | 35 | 36 | 37 | 38 | 39 | 40 |
|---|---|---|---|---|---|---|---|---|---|---|
| Material | $Ti_3O_5$ | $SiO_2$ | $Ti_3O_5$ | $SiO_2$ | $Ti_3O_5$ | $SiO_2$ | $Ti_3O_5$ | $SiO_2$ | $Ti_3O_5$ | $SiO_2$ |
| Physical thickness | 110.33 | 178.91 | 113.14 | 183.91 | 115.98 | 186.43 | 116.22 | 184.15 | 114.08 | 181.73 |

| Layer | 41 | 42 | 43 | 44 | 45 | 46 | 47 | 48 | 49 | 50 |
|---|---|---|---|---|---|---|---|---|---|---|
| Material | $Ti_3O_5$ | $SiO_2$ | $Ti_3O_5$ | $SiO_2$ | $Ti_3O_5$ | $SiO_2$ | $Ti_3O_5$ | $SiO_2$ | $Ti_3O_5$ | $SiO_2$ |
| Physical thickness | 112.9 | 181.36 | 113.72 | 183.6 | 116.38 | 188.88 | 119.59 | 192.59 | 121.6 | 193.77 |

| Layer | 51 | 52 | 53 | 54 | 55 | 56 | 57 | 58 | 59 | 60 |
|---|---|---|---|---|---|---|---|---|---|---|
| Material | $Ti_3O_5$ | $SiO_2$ | $Ti_3O_5$ | $SiO_2$ | $Ti_3O_5$ | $SiO_2$ | $Ti_3O_5$ | $SiO_2$ | $Ti_3O_5$ | $SiO_2$ |
| Physical thickness | 122.36 | 194.96 | 122.55 | 195.51 | 121.87 | 193.25 | 193.25 | 120.78 | 118.61 | 95.22 |

TABLE 3

|  |  | Layer | | | |
|---|---|---|---|---|---|
|  |  | 1 | 2 | 3 | 4 |
| The image-side surface (anti-reflection thin films) | Material physical thickness | $Ti_3O_5$ 17.48 | $SiO_2$ 30.82 | $Ti_3O_5$ 126.22 | $SiO_2$ 96.88 |

FIG. 2 shows the spectrum after one piece of the IR filter formed only with the 60 layers of IR filtering thin film on the object-side surface. FIG. 3 shows the spectrum after one piece of the IR filter formed only with the 4 layers of anti-reflection thin film on the image-side surface. FIG. 4 shows a comparison of the spectrums of one piece of the IR filter formed only with 60 layers of IR filtering thin film on the object-side surface, one piece of the IR filter formed only with the 4 layers of anti-reflection thin film on the image-side surface, and one piece of the IR filter formed with the 60 layers of IR filtering thin film on the object-side surface and the 4 layers of anti-reflection thin film on the image-side surface. FIG. 5 shows an enlarged drawing of FIG. 4 in the wavelength range between 850 nm to 1300 nm. The thin line 101 represents the spectrum after one piece of the IR filter formed only with 60 layers of the IR filtering thin film on the object-side surface, the thin line 102 represent the spectrum after one piece of the IR filter formed only with the 4 layers of anti-reflection thin film on the image-side surface, and the bold line 103 represents the spectrum after one piece of the IR filter formed with the 60 layers of IR filtering thin film on the object-side surface and the 4 layers of anti-reflection thin film on the image-side surface. As shown, the IR filter formed with the 60 layers of IR filtering thin film on the object-side surface and the 4 layers of anti-reflection thin film on the image-side surface shows better IR filtering result and transparency to visible light, as compared with the other IR filters.

Tables 4-6 depicts a summary of values of transmittance in the wavelength range between 850 nm to 1300 nm for an IR filter formed with the 60 layers of IR filtering thin film on the object-side surface and the 4 layers of anti-reflection thin film on the image-side surface:

TABLE 4

| Wavelength (nm) | 850 | 875 | 900 | 925 | 950 | 975 |
|---|---|---|---|---|---|---|
| Transmittance (%) | 65.596355 | 0.173758 | 0.008252 | 0.000030 | 0.000002 | 0.000001 |

TABLE 5

| Wavelength (nm) | 1000 | 1025 | 1050 | 1075 | 1100 | 1125 |
|---|---|---|---|---|---|---|
| Transmittance (%) | 0.000001 | 0.000001 | 0.000001 | 0.000001 | 0.000001 | 0.000001 |

TABLE 6

| Wavelength (nm) | 1150 | 1175 | 1200 | 1225 | 1250 | 1275 | 1300 |
|---|---|---|---|---|---|---|---|
| Transmittance (%) | 0.000358 | 0.001106 | 0.167090 | 0.094031 | 2.991597 | 24.515900 | 4.239430 |

The transmittance is approximately less than 3% in the range of wavelength between 875 nm to 1250 nm.

The spectrum shown in FIGS. 6 to 7 are obtained based on the transmittance of five pieces of the conventional imaging lens. FIG. 6 shows the spectrum after the conventional optical lens assembly composed of the aforesaid conventional five pieces of the imaging lens and/or one piece of the IR filter, and FIG. 7 shows an enlarged drawing of FIG. 6 in the wavelength range between 850 nm to 1300 nm. The imaging lenses used here are formed with 4 layers of anti-reflection layers on both object-side and image-side surfaces. Please refer to the below Table 7 for the details:

TABLE 7

|  |  | Layer | | | |
|---|---|---|---|---|---|
|  |  | 1 | 2 | 3 | 4 |
| The object-side surface | Material | $Ti_3O_5$ | $SiO_2$ | $Ti_3O_5$ | $SiO_2$ |
|  | Physical thickness (nm) | 17.48 | 30.82 | 126.22 | 96.88 |
| The image-side surface | Material | $Ti_3O_5$ | $SiO_2$ | $Ti_3O_5$ | $SiO_2$ |
|  | Physical thickness (nm) | 17.48 | 30.82 | 126.22 | 96.88 |

As illustrated in FIGS. 6 and 7, thin line 111 represents the spectrum only after five pieces of the traditional imaging lens, thin line 112 represents the spectrum only after one piece of the IR filter formed with the 60 layers of IR filtering thin film on the object-side surface and the 4 layers of anti-reflection thin film on the image-side surface, and bold line 113 represents the spectrum after five pieces of the traditional imaging lens and one piece of the IR filter formed with the 60 layers of IR filtering thin film on the object-side surface and the 4 layers of anti-reflection thin film on the image-side surface. As shown, it is clear that even using the IR filter, i.e. the spectrums of the thin line 112 and the bold line 113, the ripple is inevitable. Please refer to the below Tables 8-10 for the details:

TABLE 8

| Wavelength (nm) | 850 | 875 | 900 | 925 | 950 | 975 |
|---|---|---|---|---|---|---|
| Transmittance (%) | 54.602513 | 0.136266 | 0.006065 | 0.000021 | 0.000001 | 0.000001 |

TABLE 9

| Wavelength (nm) | 1000 | 1025 | 1050 | 1075 | 1100 | 1125 |
|---|---|---|---|---|---|---|
| Transmittance (%) | 0.000001 | 0.000001 | 0.000001 | 0.000001 | 0.000001 | 0.000001 |

TABLE 10

| Wavelength (nm) | 1150 | 1175 | 1200 | 1225 | 1250 | 1275 | 1300 |
|---|---|---|---|---|---|---|---|
| Transmittance (%) | 0.000142 | 0.000421 | 0.061105 | 0.033138 | 1.021718 | 6.389431 | 2.364835 |

Therefore, the transmittance in the IR light band of one piece of the IR filter formed with 60 layers of IR filtering thin film on the object-side surface and 4 layers of anti-reflection thin film on the image-side surface is approximately less than 3%, and the transmittance for visible light, such as incident light having wavelength between 450 nm to 650 nm, is greater than 80%. With the help of the IR filter formed with the 60 layers of IR filtering thin film on the object-side surface and the 4 layers of anti-reflection thin film on the image-side surface, the transmittance of the optical lens assembly for the IR light band is less than 1.1% and the transmittance for visible light is also very good. However, because the additional IR filter effectively increases the total length of the optical lens assembly, applications of the optical lens assembly in products seeking lighter and thinner appearances are substantially limited.

SUMMARY

Present example embodiments provide an optical lens assembly and imaging lens with infrared (IR) light filtering which do not use an additional IR filter, unlike the conventional optical lens assembly, to shorten the total length of the optical lens assembly.

Example embodiments also provide for an optical lens assembly and imaging lens with infrared (IR) light filtering, which reduces the transmittance of the imaging lens for incident light with wavelength between 900 nm to 1250 nm. Filtering is performed on the IR light for wavelengths between 900 nm to 1250 nm through a plurality of optical thin films of the first material and a plurality of optical thin films of the second material layered along a direction and the structure where each of the optical thin films of the second material is layered between two adjacent layers of optical thin films of the first material in the optical thin films.

Example embodiments also provide for an optical lens assembly and imaging lens with infrared (IR) light filter which reduces transmittance of the imaging lens for incident light having wavelength between 900 nm to 1250 nm through controlling the layered number along the direction and thickness of each layer of the optical thin films layered on the surface(s) of the imaging lens.

Example embodiments also provide for an imaging lens comprising: (a) for incident light with wavelength between 500 nm to 1300 nm, minimum transmittance of the imaging lens within a range between 900 nm and 1250 nm; (b1) for incident light with wavelength between 900 nm to 1250 nm, transmittance of the imaging lens is not greater than 60%; and (c) for incident light with wavelength between 450 nm to 650 nm, transmittance of the imaging lens is greater than 80%.

Example embodiments also provide for an optical lens assembly comprising: (a) for incident light with wavelength between 500 nm to 1300 nm, minimum transmittance of the optical lens assembly falls within a range between 900 nm and 1250 nm; (b2) for incident light with wavelength between 900 nm to 1250 nm, transmittance of the optical lens assembly is not greater than 10%; and (c) for incident light with wavelength between 450 nm to 650 nm, transmittance of the optical lens assembly is greater than 80%.

Example embodiments also provide for an imaging lens comprising: a body having a refracting index and comprising two surfaces, at least one of the surfaces having a curved surface portion, and a plurality layers of optical thin film formed on at least one of the surfaces; the optical thin films having a plurality of optical thin films of a first material and a plurality of optical thin films of a second material layered along a direction, each of the optical thin films of the second material layered between two adjacent layers optical thin films of the first material, the optical thin films of the first material having a first refracting index greater than the refracting index of the body, and the optical thin films of the second material having a second refracting index smaller than the refracting index of the body, a total amount of the optical thin films is no more than 20 layers, and a total thickness of the optical thin films is no less than 400 nm and no greater than 2000 nm; the imaging lens operable as follows: (a) for incident light with wavelength between 500 nm to 1300 nm, minimum transmittance of the imaging lens within a range between 900 nm and 1250 nm; (b1) for incident light with wavelength between 900 nm to 1250 nm, transmittance of the imaging lens is not greater than 60%; and (c) for incident light with wavelength between 450 nm to 650 nm, the transmittance of the imaging lens is greater than 80%.

Example embodiments also provide for an optical lens assembly comprising: an imaging lens assembly comprising at least three pieces of the imaging lens facing opposite directions to each other, the imaging lens respectively comprising a body, the body having a refractive index and comprising two surfaces, at least one of the surfaces having a curved surface portion, a plurality of layers of optical thin film formed on at least one surface of each imaging lens, the optical thin films having a plurality of optical thin films of a first material and a plurality of optical thin films of a second material layered along a direction, and each of the optical thin films of the second material layered between two adjacent layers optical thin films of the first material, the optical thin films of the first material having a first refracting index greater than the refracting index of the body, and the optical thin films of the second material having a second refractive index smaller than the refractive index of the body, a total amount of the optical thin films is no more than 20 layers, and a total thickness of the optical thin films is no less than 400 nm and no greater than 2000 nm; the optical lens assembly operable as follows: (a) for incident light with wavelength between 500 nm to 1300 nm, a minimum transmittance of the optical lens assembly falls within a range between 900 nm and 1250 nm; (b2) for incident light with wavelength between 900 nm to 1250 nm, the transmittance of the optical lens assembly is not greater than 10%; and (c) for incident light with wavelength between 450 nm to 650 nm, the transmittance of the optical lens assembly is greater than 80%.

The imaging lens in the specification has thin films formed on both surfaces. The thin films may comprise other types of thin films not described above. The total amount, total thickness of the optical thin films, and the thickness of each layer could be varied to meet variable needs or requirements, for example, due to different wavelength ranges, application requirements, production technical barriers, or other factors. The total amount and the thickness of the optical thin films may be modified to alter the transmittance, spectrum character or other characters. Preferably, the total number of optical thin films on each surface is not less than 6 layers and not more than 16 layers when both of the two surfaces of the body are formed with the optical thin films, or the total number of optical thin films on each surface is not less than 6 layers and not more than 16 layers when only one surface is formed with the optical thin films. In an exemplary embodiment for reducing the ripple portion in the spectrum filtered by the imaging lens, the thinnest layer of the optical thin films of the first material is controllable to be adjacent to the thinnest layer of the optical thin films of the second material in the optical thin films. Additionally, at the image-side surface, similar controlling manner to the thickness may be optionally applied. As such, through experiments, the collected data shows a better spectrum; however, present embodiments are not limited to this.

Further, the optical thin films in example embodiments are a multilayer-thin-film structure comprising the optical thin films of the first material and the optical thin films of the second material layered along a direction. For example, the optical thin films of the first material are not limited to, but could be chosen from, the group of $Ti_3O_5$ (refractive index 2.322), $Ta_2O_5$ (refractive index 2.18), H4 (refractive index 1.96, a mixture of $TiO_2$ and $La_2O_3$), $ZrO_2$ (refractive index 1.95), OS-50 (refractive index 2.294), and $Nb_2O_5$ (refractive index 2.34). Furthermore, the optical thin films of the second material are not limited to, but could be chosen, from the group of $SiO_2$ (refractive index 1.455), and $MgF_2$ (refractive index 1.38). Example embodiments may apply the optical thin films and other types of thin films into implementation. For example, on one of the surfaces of at least one imaging lens of the imaging lens assembly, a plurality of layers of optical thin film in a total of not more than 20 layers could be formed, and on the other surface, a plurality of anti-reflection layers, which transmittance is greater than 80% for incident light with wavelength between 450 nm to 650 nm could be formed, and such implementation also filters a certain level of IR light. In this example embodiment, the surface formed with the anti-reflection thin films is not limited to any of the object-side surface and the image-side surface. In an example embodiment, the object-side surface is formed with the optical thin films and the image-side surface is formed with the anti-reflection layers. In another example embodiment, the object-side surface is formed with the anti-reflection thin films and the image-side surface is formed with the optical thin films.

Through the layered structure of the optical thin films on the surfaces of the imaging lens, which collectively filters the IR light band in the spectrum, example embodiments of the optical lens assembly and imaging lens filters the IR light to reduce the undesirable effects of the IR light upon the imaging sensor of the optical lens assembly and upon the image quality.

BRIEF DESCRIPTION OF THE DRAWINGS

Exemplary embodiments will be more readily understood from the following detailed description when read in conjunction with the appended drawing, in which.

DETAILED DESCRIPTION

Figure 1:
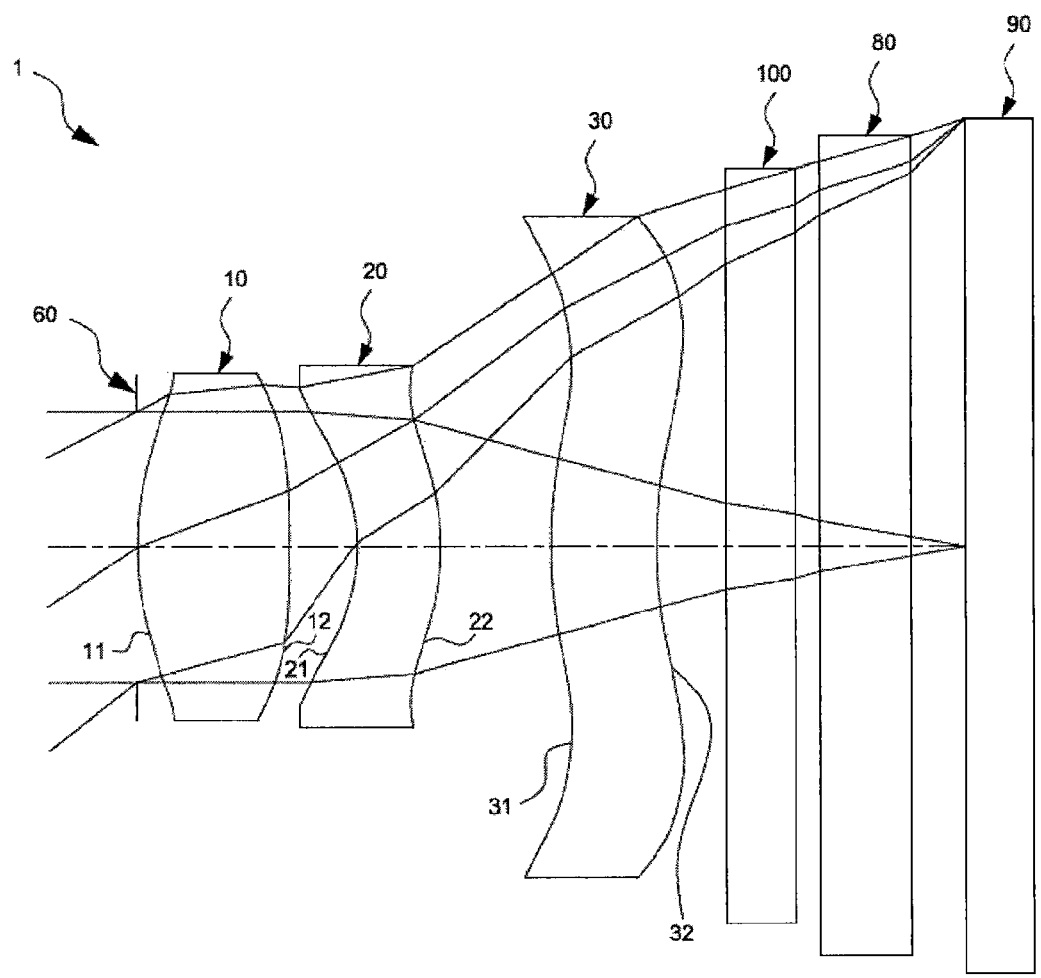
FIG. 1 shows a structure of a conventional optical lens assembly.
Figure 2:
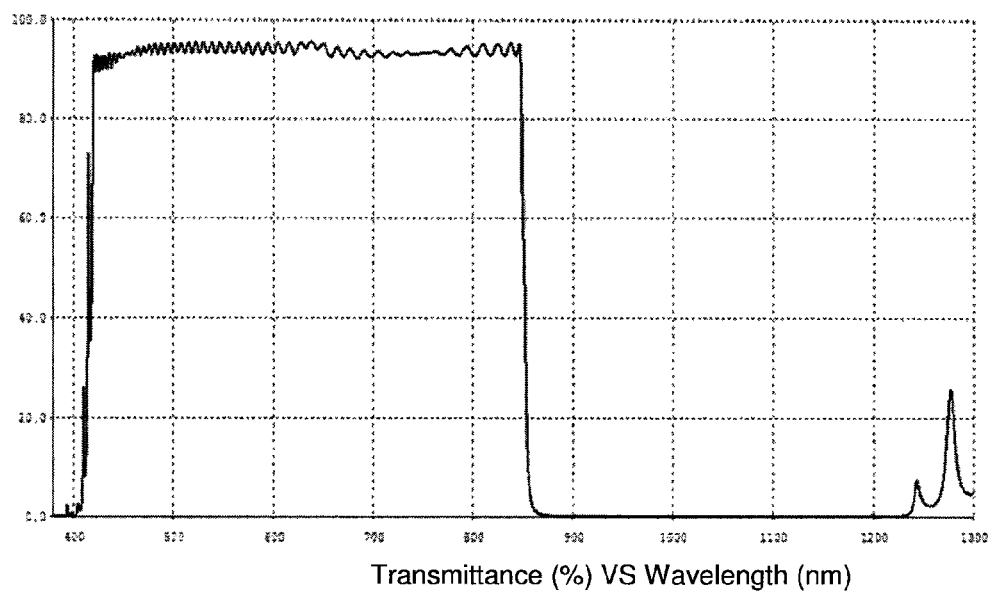
FIG. 2 shows the spectrum after one piece of the IR filter formed only with the 60 layers of IR filtering thin film on the object-side surface.
Figure 3:
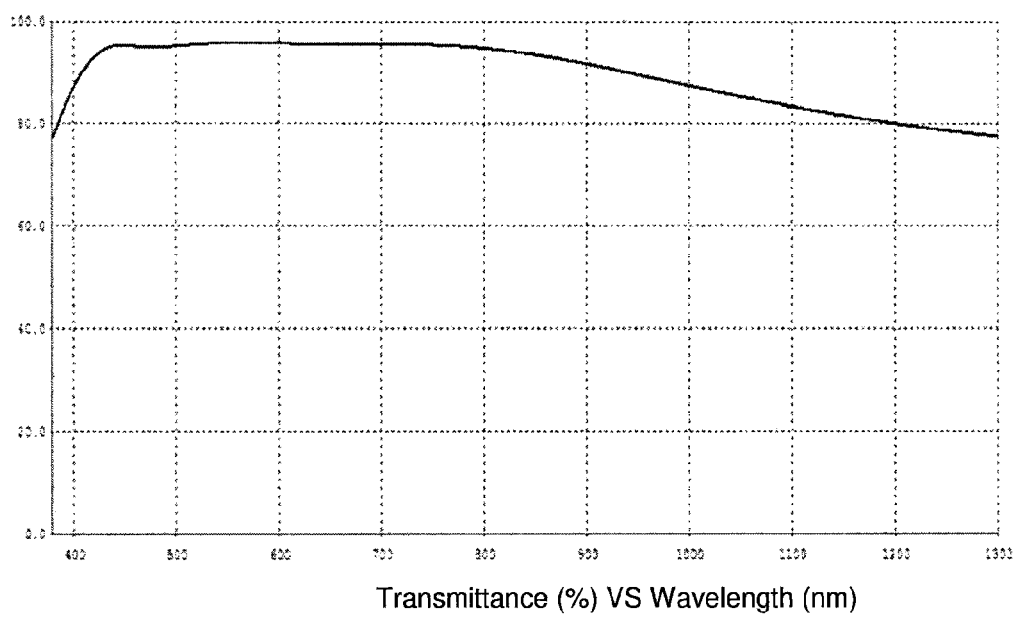
FIG. 3 shows the spectrum after one piece of the IR filter formed only with the 4 layers of anti-reflection thin film on the image-side surface.
Figure 4:
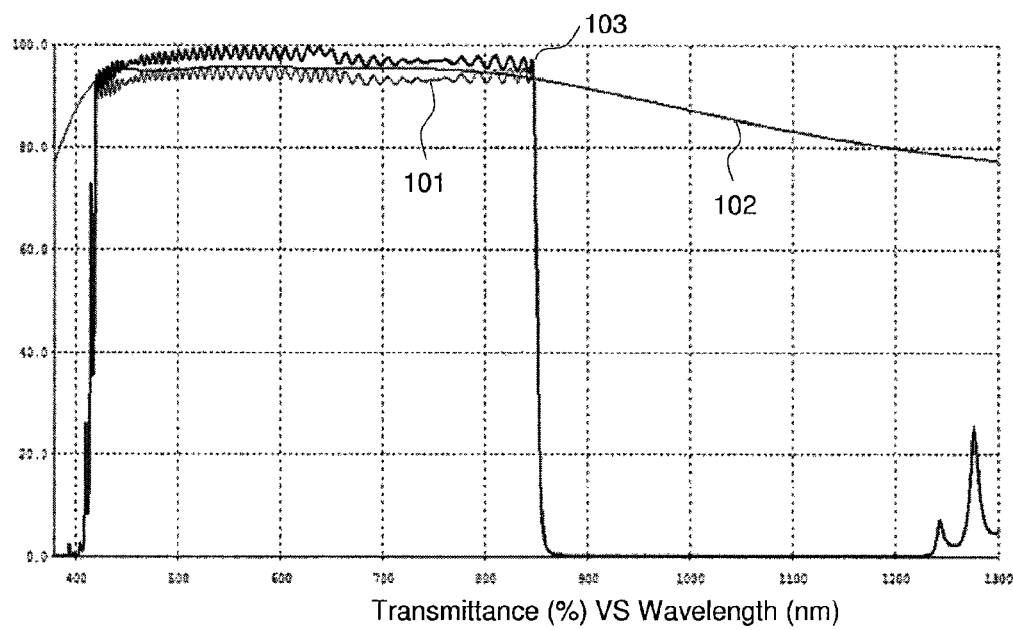
FIG. 4 shows the comparison of the spectrums of one piece of the IR filter formed only with 60 layers of IR filtering thin film on the object-side surface, one piece of the IR filter formed only with the 4 layers of anti-reflection thin film on the image-side surface, and one piece of the IR filter formed with the 60 layers of IR filtering thin film on the object-side surface and the 4 layers of anti-reflection thin film on the image-side surface.
Figure 5:
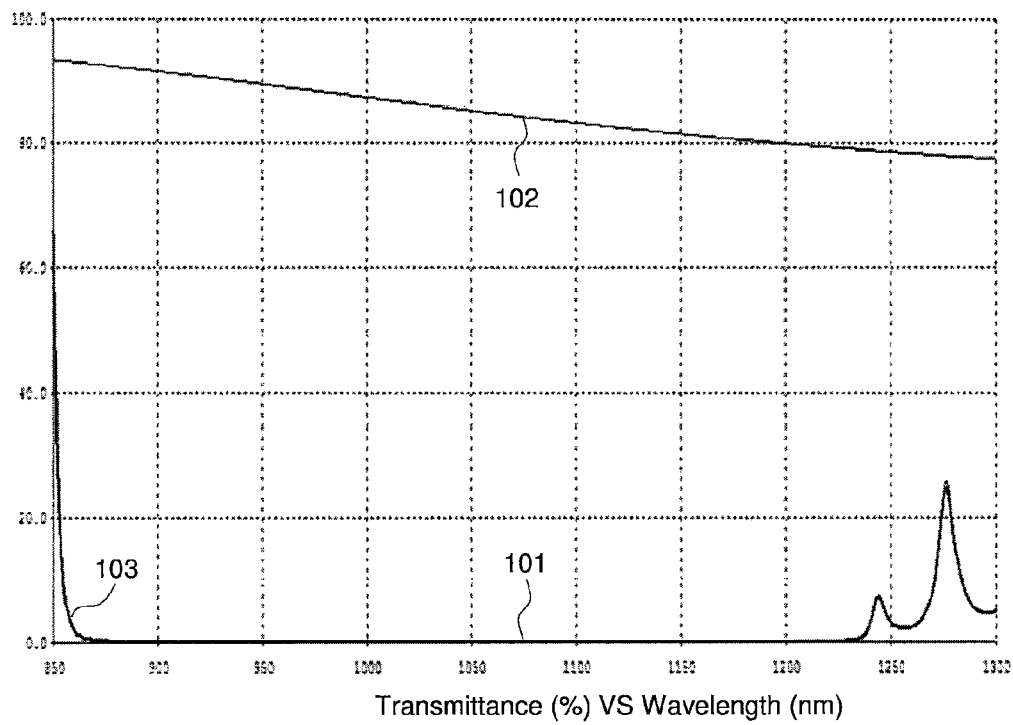
FIG. 5 shows an enlarged drawing of FIG. 4 in the wavelength range between 850 nm to 1300 nm.
Figure 6:
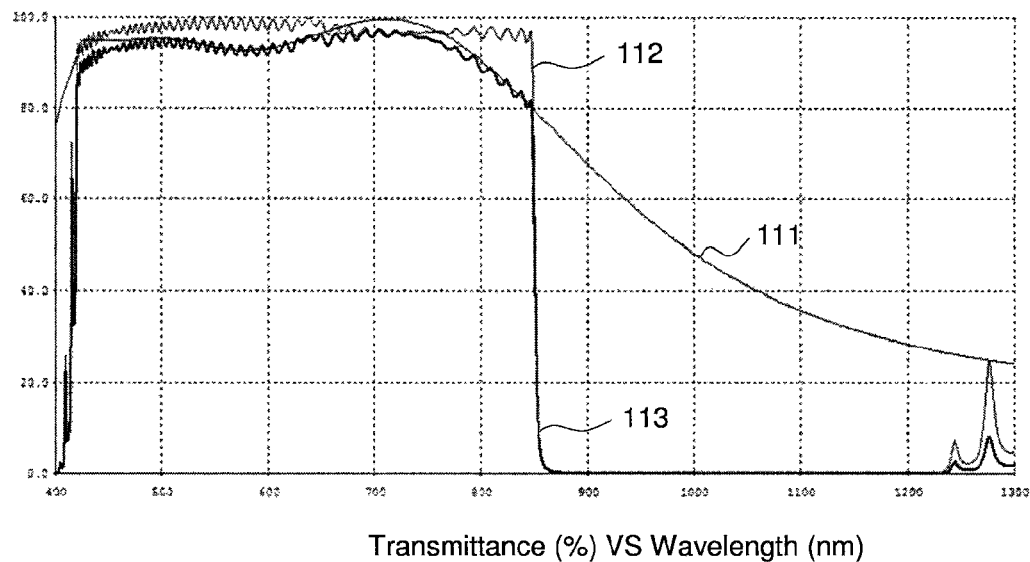
FIG. 6 shows the spectrum after the conventional optical lens assembly comprising conventional five pieces of the imaging lens and/or one piece of the IR filter.
Figure 7:
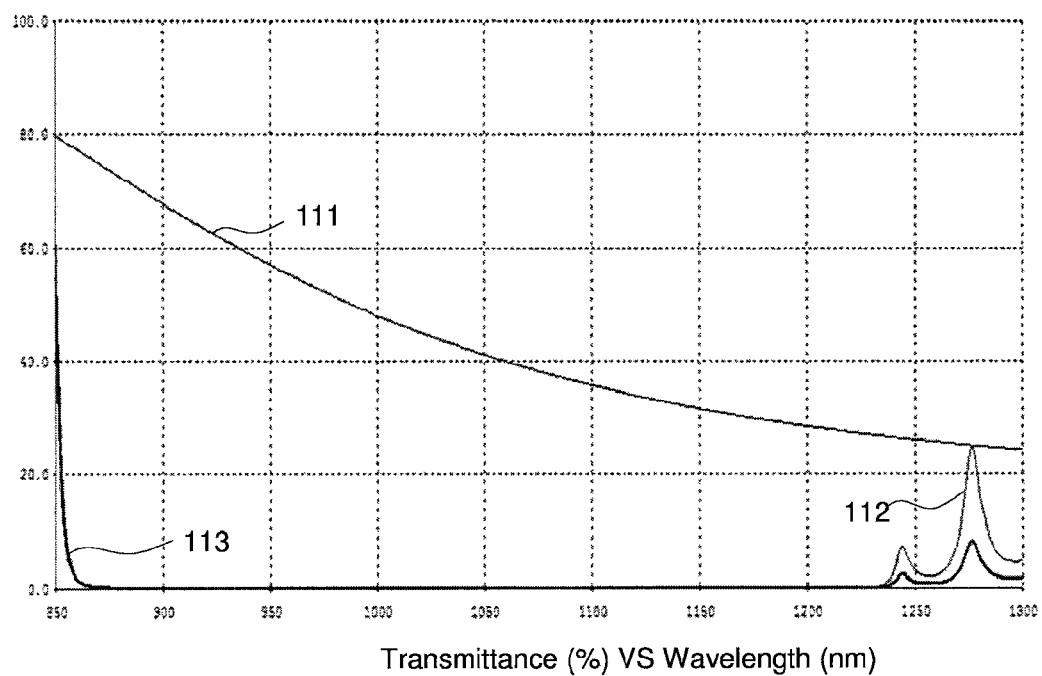
FIG. 7 shows an enlarged drawing of FIG. 6 in the wavelength range between 850 nm to 1300 nm.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to one embodiment, although it may, and various example embodiments may be readily combined and interchanged, without departing from the scope or spirit of the present embodiments. Furthermore, the terminology as used herein is for the purpose of describing example embodiments only and is not intended to be a limitation of the embodiments. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Example embodiments provide for an optical lens assembly and an imaging lens thereof operable to filter IR light. Each imaging lens comprises a body and a plurality of layers of optical thin film. The body has refractive index and comprises two surfaces, at least one of the surfaces having a curved surface portion, and a plurality of layers of optical thin film formed on at least one of the surfaces. The optical thin films have a plurality of optical thin films of a first material and a plurality of optical thin films of a second material layered along a direction, each of the optical thin films of the second material layered between two adjacent layers of optical thin films of the first material. The optical thin films of the first material have a first refractive index greater than the refractive index of the body, and the optical thin films of the second material have a second refractive index smaller than the refractive index of the body. A total number of the optical thin films on each single surface is not greater than 20 layers, and a total thickness of the optical thin films is not less than 400 nm and not greater than 2000 nm. The imaging lens is operable with the following characteristics: (a) for incident light with wavelength between 500 nm to 1300 nm, a minimum transmittance of the imaging lens falls within a range between 900 nm and 1250 nm; (b1) for incident light with wavelength between 900 nm to 1250 nm, the transmittance of the imaging lens is not greater than 60%; and (c) for incident light with wavelength between 450 nm to 650 nm, the transmittance of the imaging lens is greater than 80%.

The optical lens assembly in example embodiments comprises at least three of the aforesaid imaging lenses having good optical characteristics positioned opposite to each other to form an imaging lens device. The imaging lens device is positioned before an image sensor to allow incident light refracting and entering the image sensor to sense an image. It is understood that the changing of the shape could change the focus of the imaging lens, therefore the shapes of the imaging lenses are not limited and each imaging lens may be in a different shape. Preferably, each imaging lens comprises a body, for example, but not limited to, made by a material having refractive index of 1.533. The body has a refractive index and comprises two surfaces, such as an object-side surface and an image-side surface, at least one of the surfaces having a curved surface portion. On at least one surface of each imaging lens, a plurality of layers of optical thin film are formed, for example, the optical thin films on each single surface having a total number of not more than 20 layers and total thickness of not less than 400 nm and not greater than 2000 nm are formed by vacuum coating. The optical thin films have a plurality of optical thin films of a first material and a plurality of optical thin films of a second material layered along a direction, and each of the optical thin films of the second material is layered between two adjacent layers of optical thin film of the first material. The optical thin films of the first material have a first refractive index which is greater than the refractive index of the body, and the optical thin films of the second material have a second refractive index which is lower than the refractive index of the body. Through the layered optical thin films, preferably, the transmittance of the imaging lens for incident light with wavelength between 900 nm to 1250 nm is reduced, and the optical lens assembly is operable with the following characteristics: (a) for incident light with wavelength between 500 nm to 1300 nm, a minimum transmittance of the optical lens assembly falls within a range between 900 nm and 1250 nm; (b2) for incident light with wavelength between 900 nm to 1250 nm, the transmittance of the optical lens assembly is not greater than 10%; and (c) for incident light with wavelength between 450 nm to 650 nm, the transmittance of the optical lens assembly is greater than 80%. Therefore, example embodiments of the imaging lens or the optical lens assembly are operable to block a significant level of IR lights with wavelength in the range between 900 nm to 1250 nm and also provide good transparency for visible light with wavelength in the range between 450 nm to 650 nm.

The total number, total thickness of the optical thin films, and the thickness of each layer could be varied to meet variable needs or requirements, for example, due to different wavelength ranges, application requirements, production technical barriers, or other factors. The total number and the thickness of the optical thin films may be changed to alter the transmittance, spectrum character or other characters. Preferably, the total number of optical thin films on each surface is not less than 6 layers and not more than 16 layers when both of the two surfaces of the body are formed with the optical thin films, or the total number of optical thin films on each surface is not less than 6 layers and not more than 16 layers when only one surface is formed with the optical thin films. In an exemplary embodiment for reducing the ripple in the spectrum filtered by the imaging lens, at least 6 layers of optical thin film may be layered along a direction on the surface(s) and the thinnest layer of the optical thin films of the first material may be controllable to be adjacent to the thinnest layer of the optical thin films of the second material in the optical thin films. Collected data of example embodiments indicate better achievable spectrum.

Further, the optical thin films in example embodiments are a multilayer-thin-film structure comprising optical thin films of a first material and optical thin films of a second material layered along a direction. The optical thin films of the first material could be chosen from, for example, the group of $Ti_3O_5$ (refractive index 2.322), $Ta_2O_5$ (refractive index 2.18), H4 (refractive index 1.96, a mixture of $TiO_2$ and $La_2O_3$), $ZrO_2$ (refractive index 1.95), OS-50 (refractive index 2.294), and $Nb_2O_5$ (refractive index 2.34). Furthermore, the optical thin films of the second material could be chosen from, for example, the group of $SiO_2$ (refractive index 1.455), and $MgF_2$ (refractive index 1.38). Example embodiments are operable to apply the optical thin films and other types of thin films into implementation. For example, on one of the surfaces of at least one imaging lens of the imaging lens assembly, a plurality of layers of optical thin film in a total of not more than 20 layers could be formed, and on the other surface, a plurality of anti-reflection layers, which transmittance is greater than 80% for incident light with wavelength between 450 nm to 650 nm, could be formed, and such implementation also filters a certain level of IR light. In this exemplary implementation, the surface formed with the anti-reflection thin films is not limited to any of the object-side surface and the image-side surface. In an example embodiment, the object-side surface is formed with the optical thin films and the image-side surface is formed with the anti-reflection layers. In another example embodiment, the object-side surface is formed with the anti-reflection thin films and the image-side surface is formed with the optical thin films.

Examples and measured spectrums will hereinafter be provided below to assist in understanding the optical characteristics of the optical lens assembly and the imaging lens for example embodiments. A wide-field light source is provided in front of the object-side surface of the optical lens assembly and the imaging lens thereof to provide wide-field incident light, and the spectrums shown here are obtained by detecting and analyzing the spectrum behind the image-side surface of the optical lens assembly and the imaging lens thereof to illustrate optical characteristics of the optical lens assembly and the imaging lens in example embodiments, but they are not limited to this. The spectrum measured with the same optical lens assembly or imaging lens may be altered by the method for detection or analysis, environment, material or other factors. Meanwhile, it is noted that, for showing the optical characteristics of the optical lens assembly and the imaging lens thereof in a more comprehensive way, exemplary embodiments provide the spectrums of the imaging lens formed with thin films on the object-side surface only, on the image-side surface only, and on both of the object-side surface and the image-side surface in order. However, those with only one surface, including either the object-side surface or the image-side surface formed with thin films, are not so called "imaging lens" in this field. Example embodiments are also not limited to these types of lenses. Besides, for comparing the effect of each embodiment, the data of the following embodiments are obtained based on the imaging lens and the optical lens assembly with the same shape, combination, and material, so as to eliminate the varieties among the embodiments as much as possible.

Figure 8:
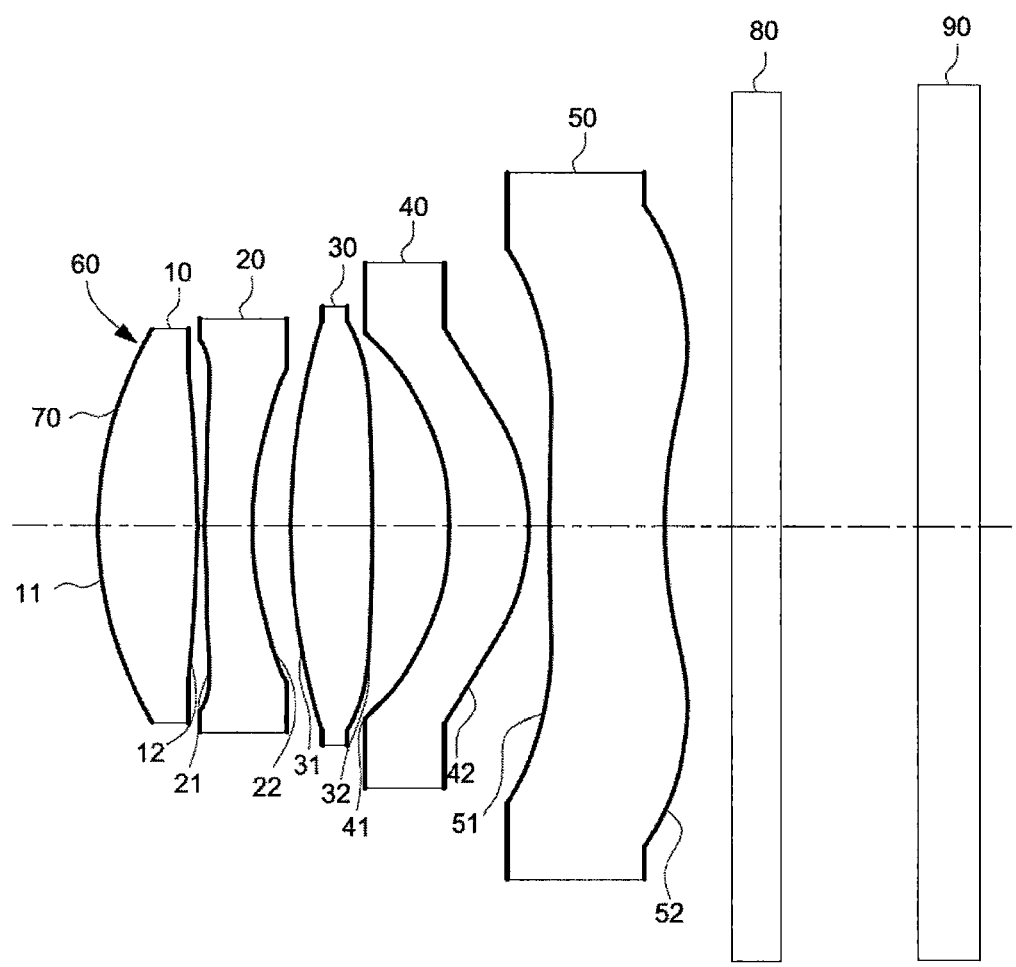
FIG. 8 shows an exemplary structure of the optical lens assembly.

Referring now to FIG. 8, which shows an exemplary embodiment of a structure of the optical lens assembly, the optical lens assembly comprises five pieces of the imaging lens 10, 20, 30, 40, 50, a cover glass 80, and an image sensor 90. The body of the imaging lens 10, 20, 30, 40, 50 is made by the plastic material, E48R, provided by ZEONEX. The imaging lens 10, 20, 30, 40, 50 respectively forms two surfaces 11, 12, 21, 22, 31, 32, 41, 42, 51, 52, wherein the surfaces 11, 21, 31, 41, 51 facing the object side are called "the object-side surface", and the surfaces 12, 22, 32, 42, 52 facing the image side are called "the image-side surface" here. In each embodiment, a plurality of layers of optical thin film 70 are formed on the object-side surface and/or image-side surface by vacuum coating; however example embodiments are not limited to this. The optical thin films 70 is a multilayer thin film structure formed by optical thin films of the first material (not shown) repeatedly layered with optical thin films of the second material having different refracting indexes (not shown). The optical thin films 70 are layered in a manner that a plurality of optical thin films of a first material and a plurality of optical thin films of a second material are layered along a direction to allow each optical thin film of the second material layered between two adjacent optical thin films of the first material. The optical thin films of the first material have a first refractive index greater than the refractive index of the body, and the optical thin films of the second material have a second refractive index lower than the refractive index of the body. After the incident light (not shown) enters the optical lens assembly through an aperture stop 60, it sequentially refracts through the imaging lens 10, 20, 30, 40, 50 and then reaches the image sensor 90 to sense an image. The data provided by the following embodiments prove that the imaging lens 10, 20, 30, 40, 50 and the optical thin films 70 accumulate the effect on the optical characteristics of the incident light to reduce the transmittance for the incident light with wavelength falling within the range of IR light so as to reduce a substantive amount of IR light from reaching the image sensor 90 to affect the image quality.

Embodiment I:

FIGS. 9-14 illustrate drawings of spectrums for example embodiments referred to as Embodiment I. The imaging lenses or the optical lens assembly chosen in the present embodiment are formed with 6 layers of the optical thin film, and the total thickness of the 6 layers of the optical thin film between 500 nm to 600 nm. The imaging lenses use the plastic material E48R, as provided by ZEONEX, as the body. On at least one surface of the imaging lenses (i.e. at least one of the object-side surface and the image-side surface), a total of 6 layers of the optical thin film of a first material and optical thin films of a second material having different refractive index are layered along a direction by vacuum coating. Here, the optical thin films of the first material are made of $Ti_3O_5$, and the optical thin films of the second material are made of $SiO_2$. Please refer to the following tables for details of thickness of each layer of the optical thin films of the first material and optical thin films of the second material and the total thickness of the optical thin films on a surface of the imaging lens in the present embodiment:

TABLE 11

| Total number of layers of the optical thin film | 6 | |
|---|---|---|
| Material | $Ti_3O_5$ | $SiO_2$ |
| Physical total thickness (nm) | 247.05 | 305.02 |
| Total thickness (nm) | 552.07 nm | |

TABLE 12

| | Layer | | | | | |
|---|---|---|---|---|---|---|
| | $1^{st}$ layer | $2^{nd}$ layer | $3^{rd}$ layer | $4^{th}$ layer | $5^{th}$ layer | $6^{th}$ layer |
| Material | $Ti_3O_5$ | $SiO_2$ | $Ti_3O_5$ | $SiO_2$ | $Ti_3O_5$ | $SiO_2$ |
| Physical thickness (nm) | 14.83 | 33.66 | 120.25 | 180.77 | 111.97 | 90.59 |

It should be noted that the layer nearest to the imaging lens is designated by the "$1^{st}$ layer", the $2^{nd}$ nearest layer to the imaging lens is designated by the "$2^{nd}$ layer", and so on, and other example embodiments designate the layers in the same manner.

As illustrated in the above tables, the thinnest layer of the optical thin films of the first material is adjacent to the thinnest layer of the optical thin films of the second material in the optical thin films in the present embodiment, and the thicknesses of the $1^{st}$ and $2^{nd}$ layers of the optical thin film are thinner than other layers of the optical thin films. Through such adjustment for the thickness, the ripple of the spectrum after the imaging lenses or the optical lens assembly may be effectively reduced in the present embodiment.

Figure 9:
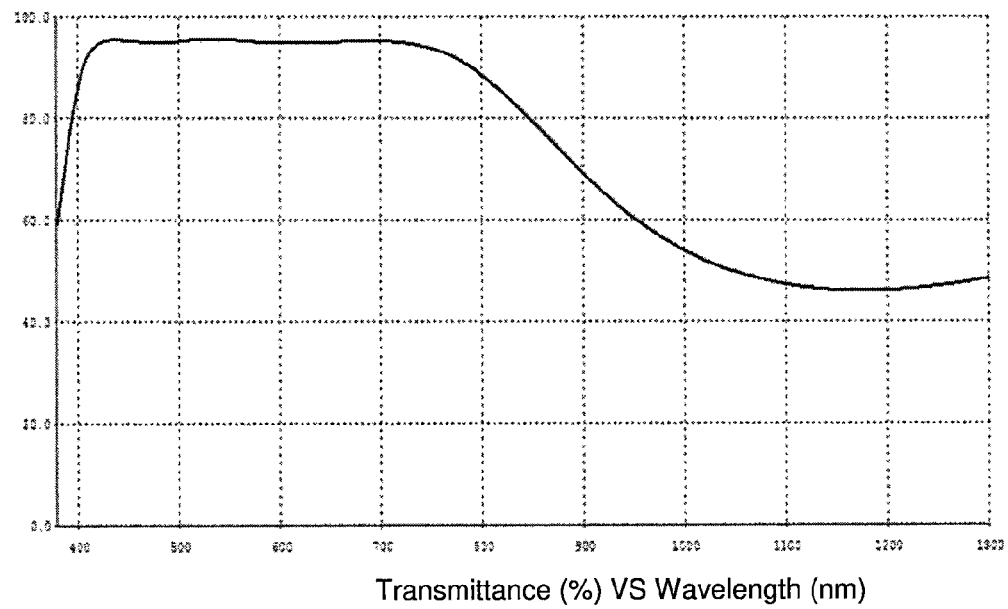
FIG. 9 shows a drawing of a spectrum after one piece of imaging lens which is formed only with 6 layers of the optical thin film on the object-side surface.
Figure 10:
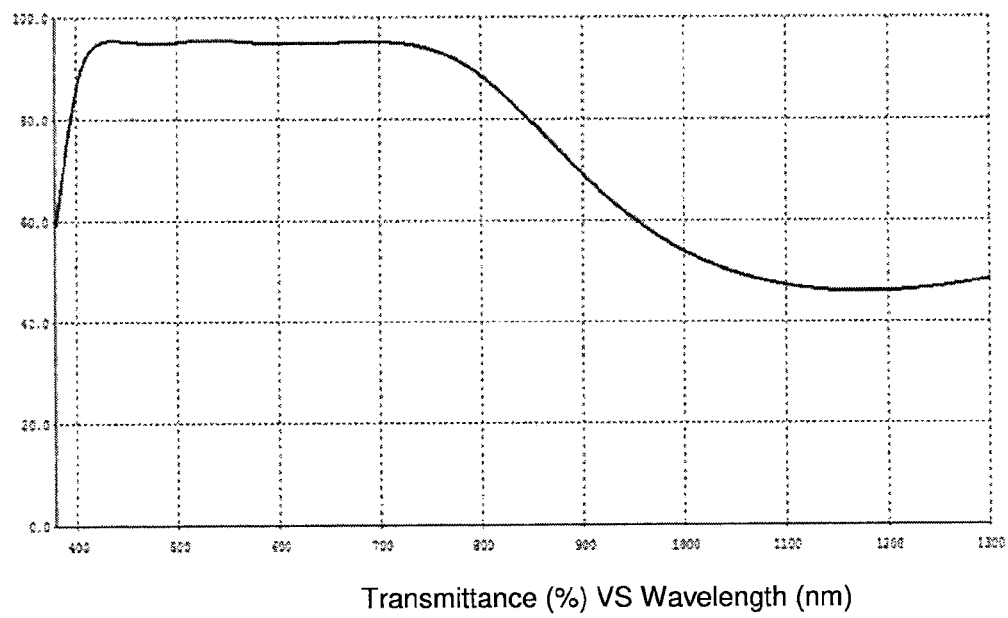
FIG. 10 shows a drawing of a spectrum after one piece of imaging lens which is formed only with 6 layers of the optical thin film on the image-side surface.

FIG. 9 shows a drawing of a spectrum after one piece of imaging lens formed only with 6 layers of the optical thin film on the object-side surface, and FIG. 10 shows a drawing of a spectrum after one piece of imaging lens which is formed only with 6 layers of the optical thin film on the image-side surface. According to FIGS. 9 and 10, it is clear that for the incident light with wavelength between 500 nm to 1300 nm, a minimum transmittance falls within the wavelength range between 900 nm to 1250 nm, and for the incident light with wavelength between 450 nm to 650 nm, the transmittance is over 80%.

Figure 11:
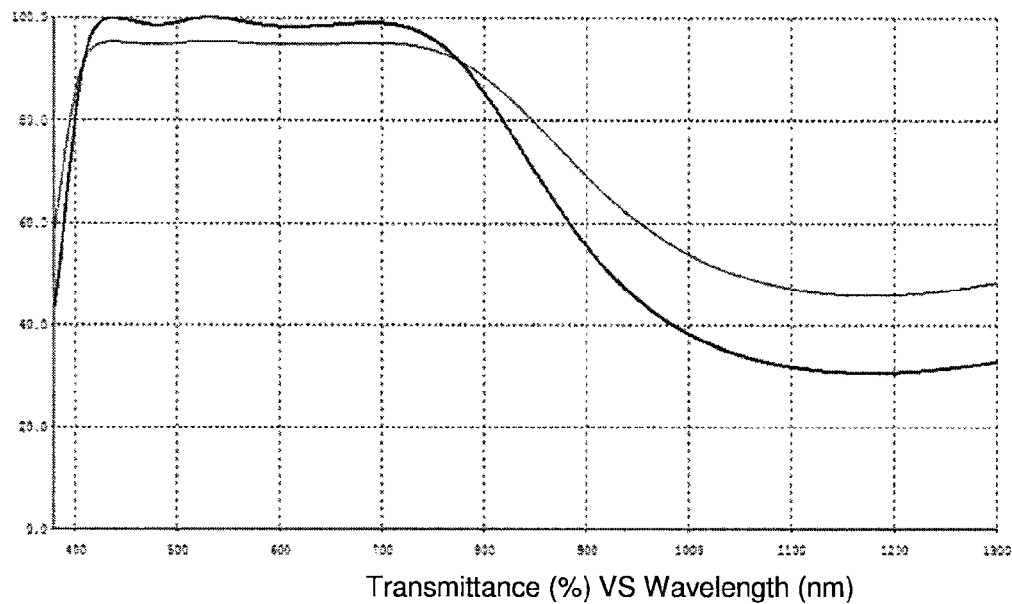
FIG. 11 shows a comparison drawing between the spectrum after one piece of imaging lens which is formed only with 6 layers of the optical thin film on one surface and the spectrum after one piece of imaging lens formed with 6 layers of the optical thin film on each surface.
Figure 12:
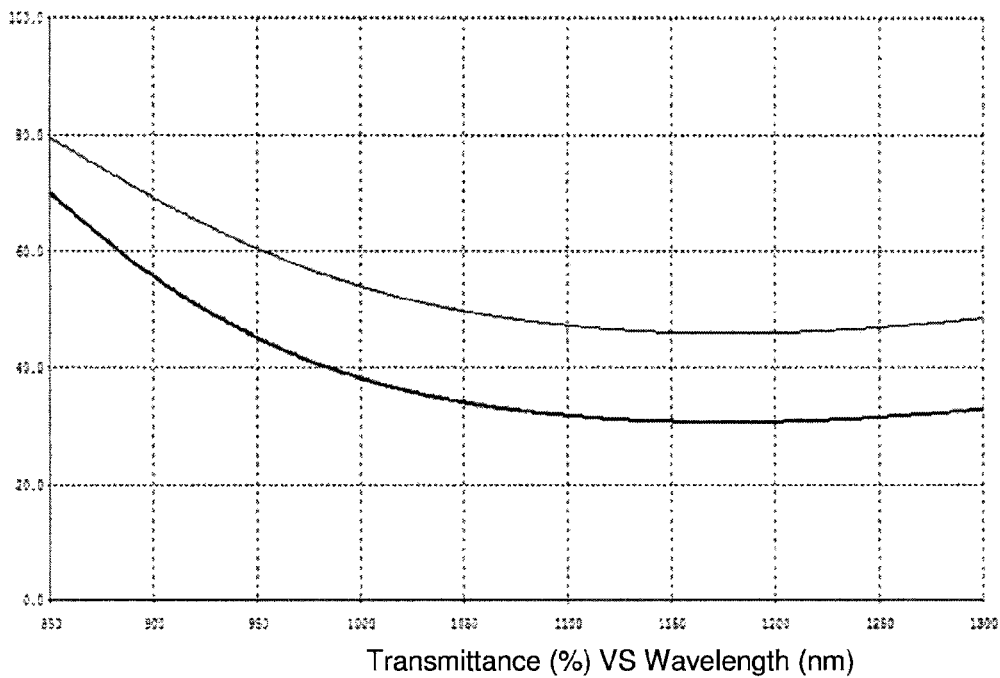
FIG. 12 shows an enlarged drawing of FIG. 11 in the wavelength range between 850 nm to 1300 nm.

FIG. 11 shows a comparison drawing between the spectrum after one piece of imaging lens formed only with 6 layers of the optical thin film on one surface (i.e. any one of the object-side surface and the image-side surface) and the spectrum after one piece of imaging lens formed with 6 layers of the optical thin film on each surface. FIG. 12 shows an enlarged drawing of FIG. 11 in the wavelength range between 850 nm to 1300 nm. The bold line represents the spectrum from an imaging lens formed with 6 layers of the optical thin film on each surface, and the thin line represents the spectrum from an imaging lens formed only with 6 layers of the optical thin film on one surface. The imaging lens formed only with 6 layers of the optical thin film on one surface does not have all of the three (a), (b1), and (c) characteristics, and the imaging lens formed with 6 layers of the optical thin film on each surface shows better characteristics than those of the imaging lens which is formed only with 6 layers of the optical thin film on one surface. The imaging lens formed with 6 layers of the optical thin film on each surface has aforesaid (a), (b1), and (c) characteristics and further lower transmittance for incident light with wavelength between 900 nm to 1250 nm, and meanwhile provide higher transmittance for incident light with wavelength between 450 nm to 650 nm.

The below Tables 13-16 illustrate the measured data of the transmittance for incident light with wavelength between 850 nm to 1300 nm, wherein both surfaces of one piece of the imaging lens are formed with 6 layers of the optical thin film:

TABLE 13

| Wavelength (nm) | 850 | 875 | 900 | 925 | 950 | 975 |
|---|---|---|---|---|---|---|
| Transmittance (%) | 70.1 | 62.4 | 55.6 | 49.8 | 45.1 | 41.1 |

TABLE 14

| Wavelength (nm) | 1000 | 1025 | 1050 | 1075 | 1100 | 1125 |
|---|---|---|---|---|---|---|
| Transmittance (%) | 38.1 | 35.8 | 34.1 | 32.7 | 31.7 | 31.1 |

TABLE 15

| Wavelength (nm) | 1150 | 1175 | 1200 | 1225 | 1250 | 1275 | 1300 |
|---|---|---|---|---|---|---|---|
| Transmittance (%) | 30.7 | 30.6 | 30.6 | 30.9 | 31.4 | 31.5 | 31.6 |

Figure 13:
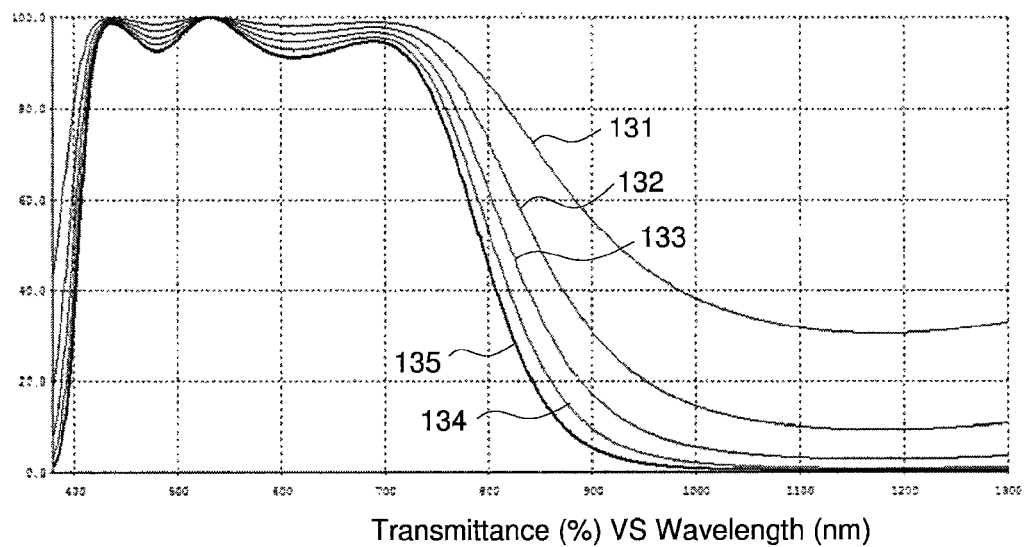
FIG. 13 shows a drawing of a spectrum after an optical lens assembly.
Figure 14:
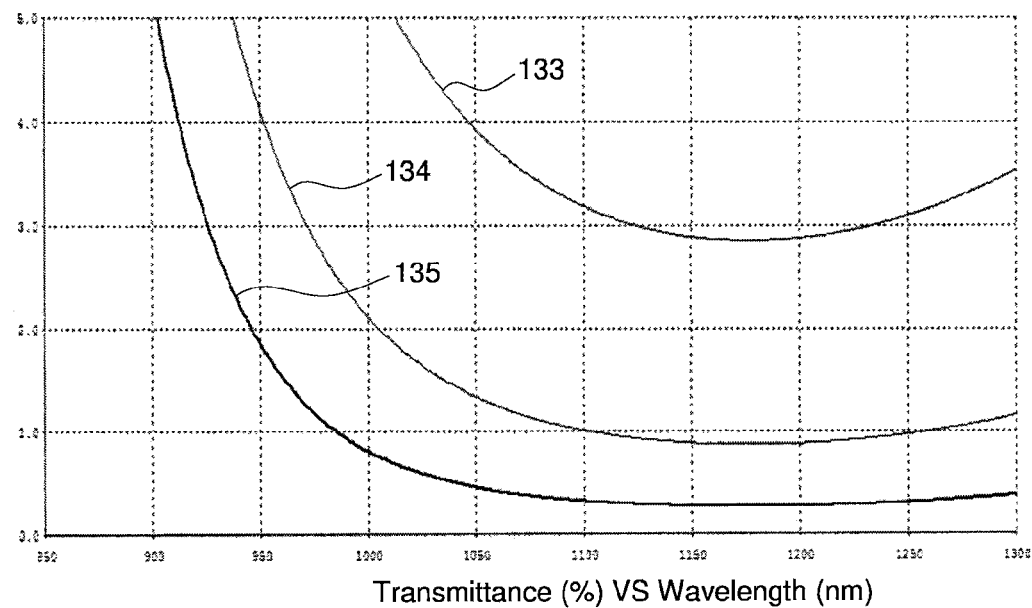
FIG. 14 shows an enlarged drawings of FIG. 13 in the wavelength range between 850 nm to 1300 nm.

FIG. 13 shows the spectrum from an optical lens assembly with several imaging lenses, and FIG. 14 shows an enlarged drawings of FIG. 13 in the wavelength range between 850 nm to 1300 nm. The imaging lenses used in the imaging lens assembly are produced with a body made of the plastic material E48R (refractive index 1.533), as provided by ZEONEX, and layered with a total of 6 layers of the optical thin film of the high refracting index material ($Ti_3O_5$) and the optical thin films of the low refracting index material ($SiO_2$) on both surfaces (i.e. the object-side surface and the image-side surface) of the body through vacuum coating. The thin line 131 represents the spectrum after one piece of imaging lens, the thin line 132 represent the spectrum after two pieces of the imaging lens, the thin line 133 represents the spectrum after three pieces of the imaging lens, the thin line 134 represents the spectrum after four pieces of the imaging lens, and the bold line 135 represents the spectrum after five pieces of the imaging lens which forms an optical lens assembly. According to the drawing, it is clear that the five pieces of the imaging lenses, each of which is formed with 6 layers of the optical thin film on each surface forming the imaging lens assembly, shows better IR filtering characters. Not only are the above (a), (b2), and (c) characteristics satisfied, but the transmittance is reduce to below 10% for the incident light with wavelength between 900 nm to 1250 nm, and the transmittance is sustained to be higher than 80% for the incident light with wavelength between 450 nm to 650 nm. Please refer to Tables 16-18 as follows for the detail data:

TABLE 16

| Wavelength (nm) | 850 | 875 | 900 | 925 | 950 | 975 |
|---|---|---|---|---|---|---|
| Transmittance (%) | 16.9112 | 9.4801 | 5.3009 | 3.0646 | 1.8527 | 1.1846 |

TABLE 17

| Wavelength (nm) | 1000 | 1025 | 1050 | 1075 | 1100 | 1125 |
|---|---|---|---|---|---|---|
| Transmittance (%) | 0.8051 | 0.5878 | 0.4549 | 0.3719 | 0.3201 | 0.2888 |

TABLE 18

| Wavelength (nm) | 1150 | 1175 | 1200 | 1225 | 1250 | 1275 | 1300 |
|---|---|---|---|---|---|---|---|
| Transmittance (%) | 0.2721 | 0.2665 | 0.2705 | 0.2833 | 0.3052 | 0.3567 | 0.3942 |

Embodiment II:

FIGS. 15-20 illustrate drawings of spectrums for example embodiments referred to as Embodiment II. The imaging lenses or the optical lens assembly chosen in the present embodiment are formed with 8 layers of the optical thin film, and the total thickness of the 8 layers of the optical thin film is between 601 nm to 900 nm. The imaging lenses use the plastic material, E48R (refractive index 1.533), provided by ZEONEX as the body. On at least one surface of the imaging lenses (i.e. at least one of the object-side surface and the image-side surface), a total of 8 layers of the optical thin film of a first material and optical thin films of a second material having different refractive indexes are layered along a direction by vacuum coating. Here, for comparison with other embodiments, the optical thin films of the first material are made of $Ti_3O_5$, and the optical thin films of the second material, $SiO_2$, are not limited to this. Please refer to Tables 19-20 for details of the thickness of each layer of the optical thin films of the first material and optical thin films of the second material and the total thickness of the optical thin films on the object-side surface and the image-side surface of the imaging lens in the present embodiment:

TABLE 19

| Total number of layers of the optical thin film | 8 | |
|---|---|---|
| Material | $Ti_3O_5$ | $SiO_2$ |
| Physical total thickness (nm) | 351.75 | 480.17 |
| Total thickness (nm) | 831.93 nm | |

TABLE 20

| Layer | 1st layer | 2nd layer | 3rd layer | 4th layer | 5th layer | 6th layer | 7th layer | 8th layer |
|---|---|---|---|---|---|---|---|---|
| Material | $Ti_3O_5$ | $SiO_2$ | $Ti_3O_5$ | $SiO_2$ | $Ti_3O_5$ | $SiO_2$ | $Ti_3O_5$ | $SiO_2$ |
| Physical thickness (nm) | 13.13 | 35.2 | 117.92 | 178.17 | 110.95 | 178.29 | 109.75 | 88.52 |

Figure 15:
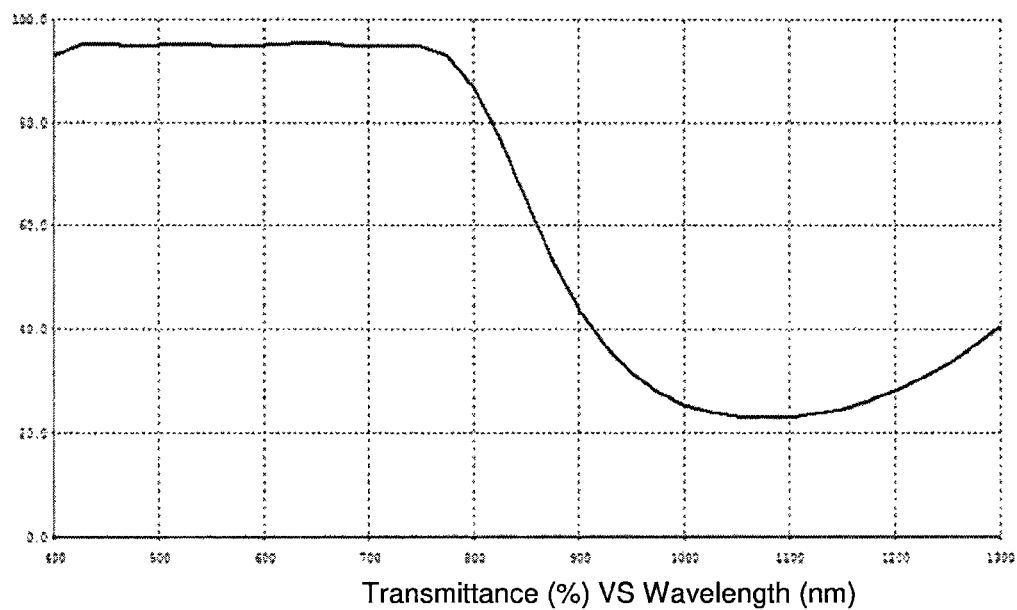
FIG. 15 shows a drawing of a spectrum after one piece of imaging lens which is formed only with 8 layers of the optical thin film on the object-side surface.
Figure 16:
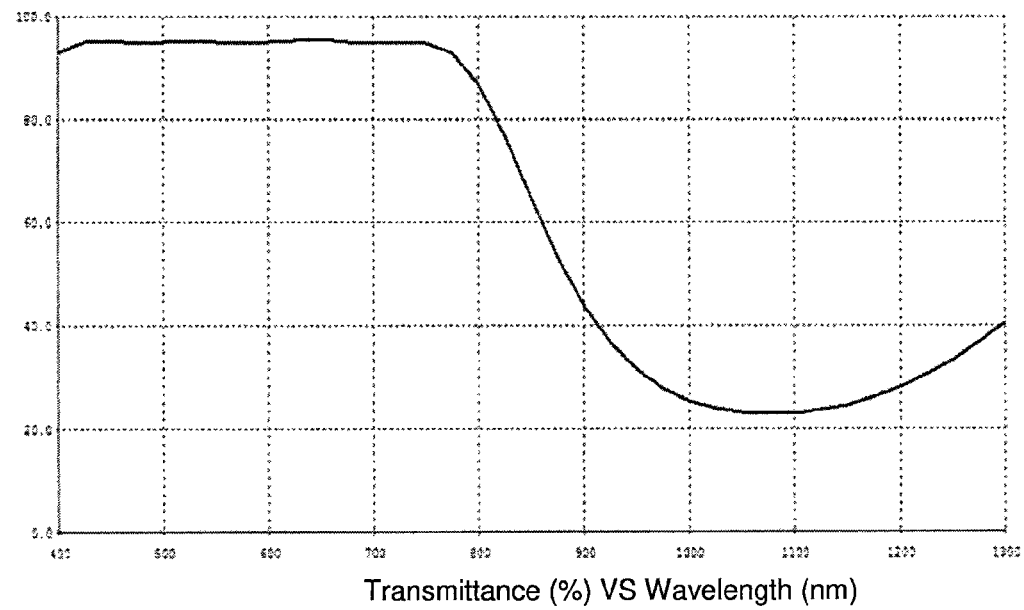
FIG. 16 shows a drawing of a spectrum after one piece of imaging lens which is formed only with 8 layers of the optical thin film on the image-side surface.

FIG. 15 shows the spectrum after one piece of imaging lens, which is formed only with 8 layers of the optical thin film on the object-side surface. FIG. 16 shows the spectrum after one piece of imaging lens, which is formed only with 8 layers of the optical thin film on the image-side surface. According to FIGS. 15 and 16, it is clear that for incident light with wavelength between 500 nm to 1300 nm, a minimum transmittance falls within the wavelength range between 900 nm to 1250 nm. Furthermore, for incident light with wavelength between 900 nm to 1250 nm, the transmittance is not greater than 50%. Meanwhile, for incident light with wavelength between 450 nm to 650 nm, the transmittance is over 90%.

Figure 17:
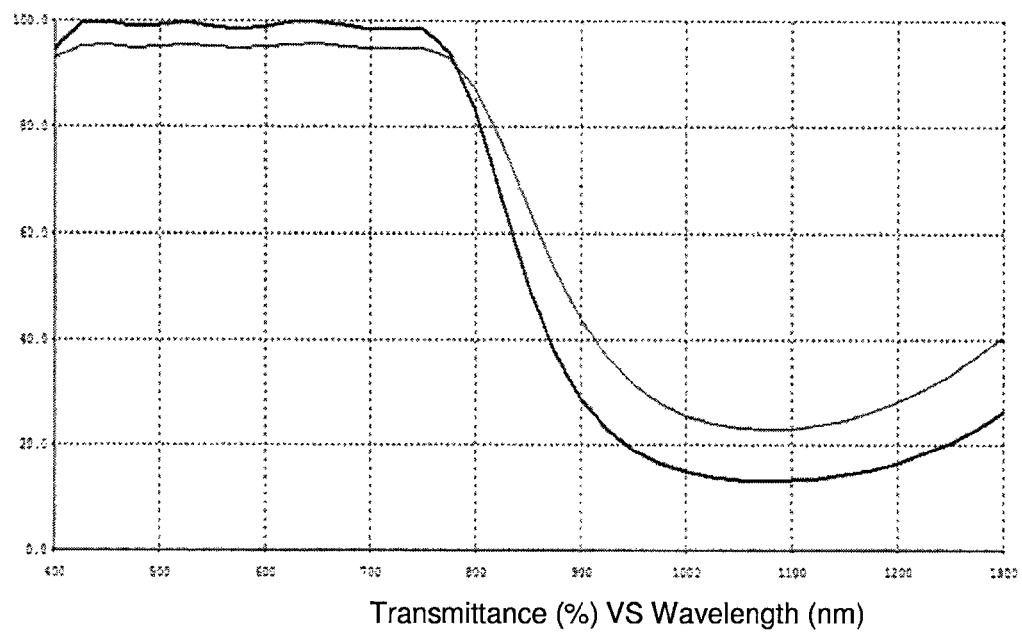
FIG. 17 shows a comparison drawing between the spectrum after one piece of imaging lens which is formed only with 8 layers of the optical thin film on one surface and the spectrum after one piece of imaging lens formed with 8 layers of the optical thin film on each surface.
Figure 18:
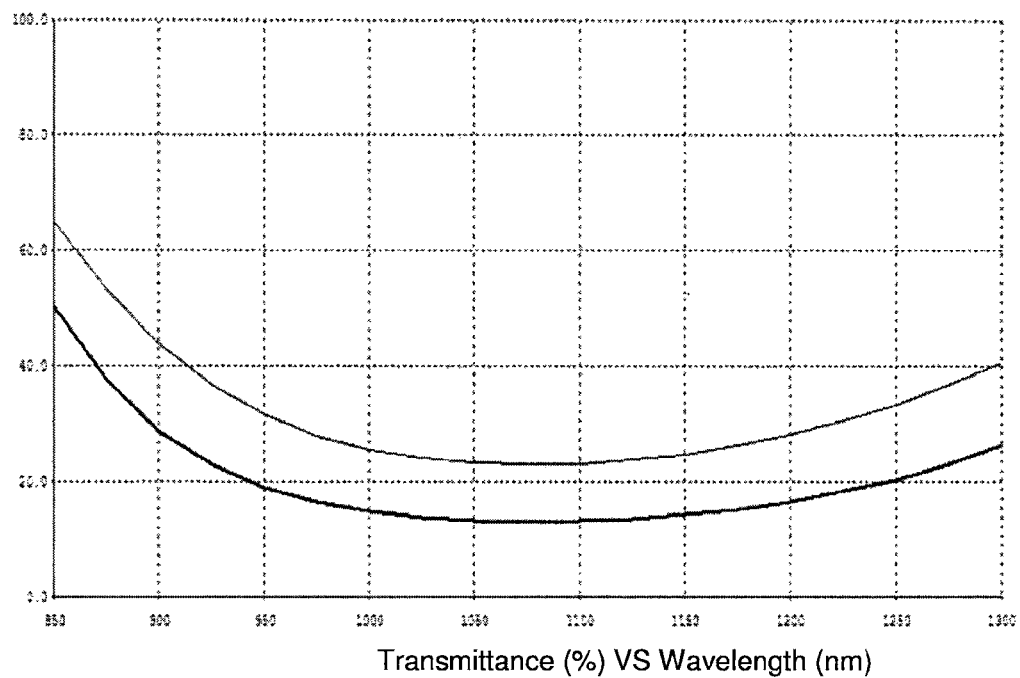
FIG. 18 shows an enlarged drawing of FIG. 16 in the wavelength range between 850 nm to 1300 nm.

FIG. 17 shows a summary of the spectrum after one piece of imaging lens, which is formed only with 8 layers of the optical thin film on one surface (i.e. any one of the object-side surface and the image-side surface) and the spectrum after one piece of imaging lens formed with 8 layers of the optical thin film on each surface (i.e. both surfaces, for example, the object-side surface and the image-side surface). FIG. 18 shows an enlarged drawing of FIG. 17 in the wavelength range between 850 nm to 1300 nm. The bold line represents the spectrum after one piece of the imaging lens formed with 8 layers of the optical thin film on each surface, and the thin line represents the spectrum after one piece of the imaging lens is formed only with 8 layers of the optical thin film on one surface. Since the imaging lens, which is formed only with 8 layers of the optical thin film on one surface, has all of the three (a), (b1) and (c) characteristics, the other surface of the imaging lens could be formed with anti-reflection thin films, optical thin films and/or other thin films. The imaging lens formed with 8 layers of the optical thin film on each surface shows better characteristics than those of the imaging lens formed only with 8 layers of the optical thin film on one surface. The imaging lens formed with 8 layers of the optical thin film on each surface has aforesaid (a), (b1) and (c) characteristics and further lowers the transmittance of incident light with wavelength between 900 nm to 1250 nm, and meanwhile provides higher transmittance for incident light with wavelength between 450 nm to 650 nm.

Please refer to Tables 21-23 for the measured data of the transmittance for incident light with wavelength between 850 nm to 1300 nm of one piece of the imaging lens whose surfaces are both formed with 8 layers of the optical thin film:

TABLE 21

| Wavelength (nm) | 850 | 875 | 900 | 925 | 950 | 975 |
|---|---|---|---|---|---|---|
| Transmittance (%) | 50.3 | 37.6 | 28.8 | 22.9 | 19.1 | 16.5 |

TABLE 22

| Wavelength (nm) | 1000 | 1025 | 1050 | 1075 | 1100 | 1125 |
|---|---|---|---|---|---|---|
| Transmittance (%) | 14.8 | 13.8 | 13.2 | 13.1 | 13.2 | 13.6 |

TABLE 23

| Wavelength (nm) | 1150 | 1175 | 1200 | 1225 | 1250 | 1275 | 1300 |
|---|---|---|---|---|---|---|---|
| Transmittance (%) | 14.3 | 15.3 | 16.6 | 18.3 | 20.4 | 22.6 | 25.1 |

Figure 19:
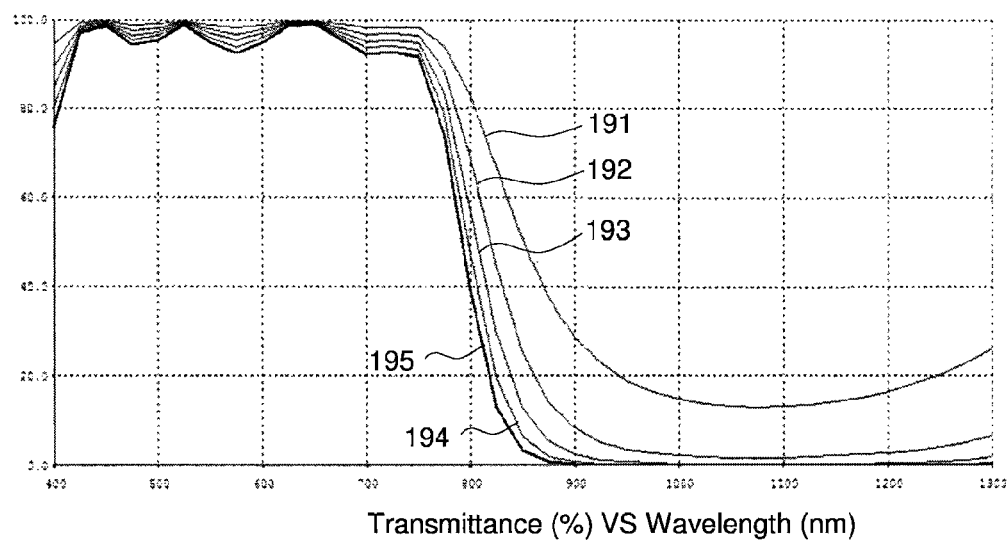
FIG. 19 shows a drawing of a spectrum after an optical lens assembly, which comprises five imaging lenses.
Figure 20:
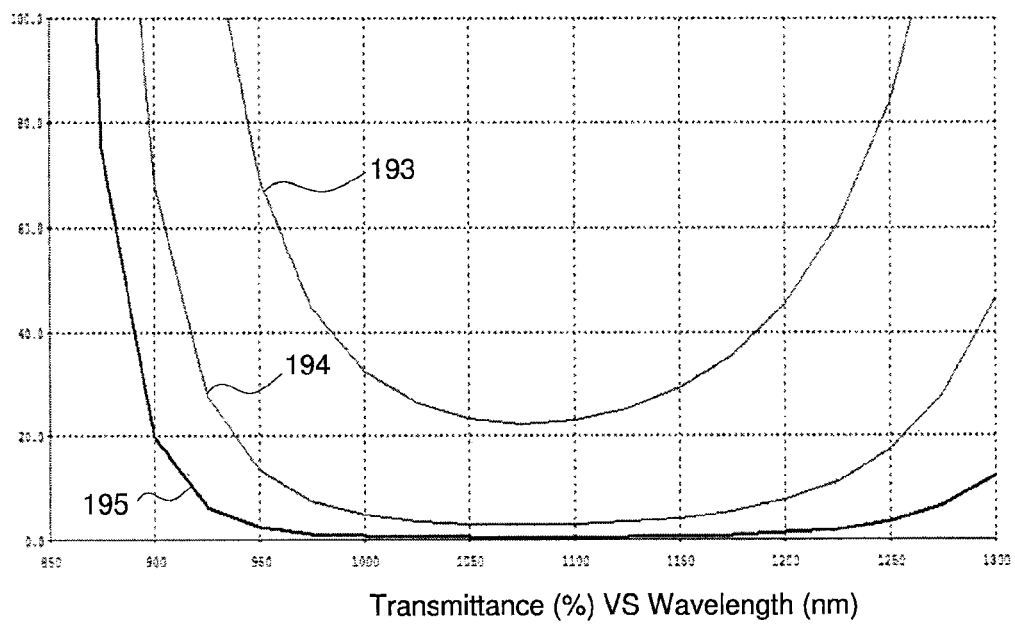
FIG. 20 shows an enlarged drawing of FIG. 19 in the wavelength range between 850 nm to 1300 nm.

FIG. 19 shows the spectrum from an optical lens assembly with several imaging lenses. FIG. 20 shows an enlarged drawing of FIG. 19 in the wavelength range between 850 nm to 1300 nm. The imaging lenses comprise a body made of the plastic material E48R (refractive index 1.533), as provided by ZEONEX, and layered with a total of 8 layers of the optical thin film of the high refractive index material ($Ti_3O_5$) and the optical thin films of the low refractive index material ($SiO_2$) on both surfaces (i.e. the object-side surface and the image-side surface) of the body through vacuum coating. The thin line 191 represents the spectrum after one piece of imaging lens, the thin line 192 represent the spectrum after two pieces of the imaging lens, the thin line 193 represents the spectrum after three pieces of the imaging lens, the thin line 194 represents the spectrum after four pieces of the imaging lens, and the bold line 195 represents the spectrum after five pieces of the imaging lens. According to the drawing, it is clear that the five pieces of the imaging lens, each of which is formed with 8 layers of the optical thin film on the each surface, show better IR filtering characteristics. Not only are the above (a), (b2) and (c) characteristics satisfied, the transmittance is reduce to below 0.2% for incident light with wavelength between 900 nm to 1250 nm, and the transmittance is sustained to be higher than 80% for incident light with wavelength between 450 nm to 650 nm. Please refer to Tables 24-26 as follows for the detail data:

TABLE 24

| Wavelength (nm) | 850 | 875 | 900 | 925 | 950 | 975 |
|---|---|---|---|---|---|---|
| Transmittance (%) | 3.2039 | 0.7506 | 0.1972 | 0.0634 | 0.0251 | 0.0121 |

TABLE 25

| Wavelength (nm) | 1000 | 1025 | 1050 | 1075 | 1100 | 1125 |
|---|---|---|---|---|---|---|
| Transmittance (%) | 0.0071 | 0.0049 | 0.0041 | 0.0038 | 0.0039 | 0.0046 |

TABLE 26

| Wavelength (nm) | 1150 | 1175 | 1200 | 1225 | 1250 | 1275 | 1300 |
|---|---|---|---|---|---|---|---|
| Transmittance (%) | 0.0059 | 0.0083 | 0.0126 | 0.0203 | 0.0349 | 0.0672 | 0.1155 |

Embodiment III:

FIGS. 21-26 illustrate the spectrums for example embodiments referred to as Embodiment III. The imaging lenses or the optical lens assembly chosen in the present embodiment are formed with 12 layers of the optical thin film, and the total thickness of the 12 layers of the optical thin film is between 1201 nm to 1550 nm. Specifically, the imaging lenses use the plastic material E48R (refractive index 1.533), as provided by ZEONEX, for the body, and on at least one surface of the imaging lenses (i.e. at least one of the object-side surface and the image-side surface), a total of 12 layers of the optical thin film of a first material having higher refractive index ($Ti_3O_5$) and optical thin films of a second material having lower refractive index ($SiO_2$) are layered by vacuum coating. Please refer to Tables 27-28 for the detail thickness of each layer of the optical thin films of the first material and optical thin films of the second material and the total thickness of the optical thin films on the object-side surface of the imaging lens in the present embodiment:

TABLE 27

| The object-side surface | Total number of layers of the optical thin film | 12 | |
|---|---|---|---|
| | Material | $Ti_3O_5$ | $SiO_2$ |
| | Physical total thickness (nm) | 567.72 | 828.17 |
| | Total thickness (nm) | 1395.89 nm | |

TABLE 28

The object-side surface of the imaging lens

| | Layer | | | | | |
|---|---|---|---|---|---|---|
| | $1^{st}$ layer | $2^{nd}$ layer | $3^{rd}$ layer | $4^{th}$ layer | $5^{th}$ layer | $6^{th}$ layer |
| Material | $Ti_3O_5$ | $SiO_2$ | $Ti_3O_5$ | $SiO_2$ | $Ti_3O_5$ | $SiO_2$ |
| Physical thickness (nm) | 13.07 | 35.53 | 119.3 | 179.34 | 110.42 | 174.43 |

TABLE 28-continued

The object-side surface of the imaging lens

| | Layer | | | | | |
|---|---|---|---|---|---|---|
| | $7^{th}$ layer | $8^{th}$ layer | $9^{th}$ layer | $10^{th}$ layer | $11^{th}$ layer | $12^{th}$ layer |
| Material | $Ti_3O_5$ | $SiO_2$ | $Ti_3O_5$ | $SiO_2$ | $Ti_3O_5$ | $SiO_2$ |
| Physical thickness (nm) | 105.83 | 171.44 | 108.71 | 177.83 | 110.4 | 89.6 |

Please refer to Tables 29-30 for the detail thickness of each layer of the optical thin films of the first material and the optical thin films of the second material and the total thickness of the optical thin films on the image-side surface of the imaging lens in the present embodiment:

TABLE 29

| The image-side surface | Total number of layers of the optical thin film | 12 | |
|---|---|---|---|
| | Material | $Ti_3O_5$ | $SiO_2$ |
| | Physical total thickness (nm) | 584.76 | 853.02 |
| | Total thickness (nm) | 1437.78 nm | |

TABLE 30

The image-side surface of the imaging lens

| | Layer | | | | | |
|---|---|---|---|---|---|---|
| | 1st layer | 2nd layer | 3rd layer | 4th layer | 5th layer | 6th layer |
| Material | $Ti_3O_5$ | $SiO_2$ | $Ti_3O_5$ | $SiO_2$ | $Ti_3O_5$ | $SiO_2$ |
| Physical thickness (nm) | 13.46 | 36.6 | 122.88 | 184.72 | 113.73 | 179.66 |

| | Layer | | | | | |
|---|---|---|---|---|---|---|
| | 7th layer | 8th layer | 9th layer | 10th layer | 11th layer | 12th layer |
| Material | $Ti_3O_5$ | $SiO_2$ | $Ti_3O_5$ | $SiO_2$ | $Ti_3O_5$ | $SiO_2$ |
| Physical thickness (nm) | 109 | 176.58 | 111.97 | 183.16 | 113.71 | 92.29 |

Figure 21:
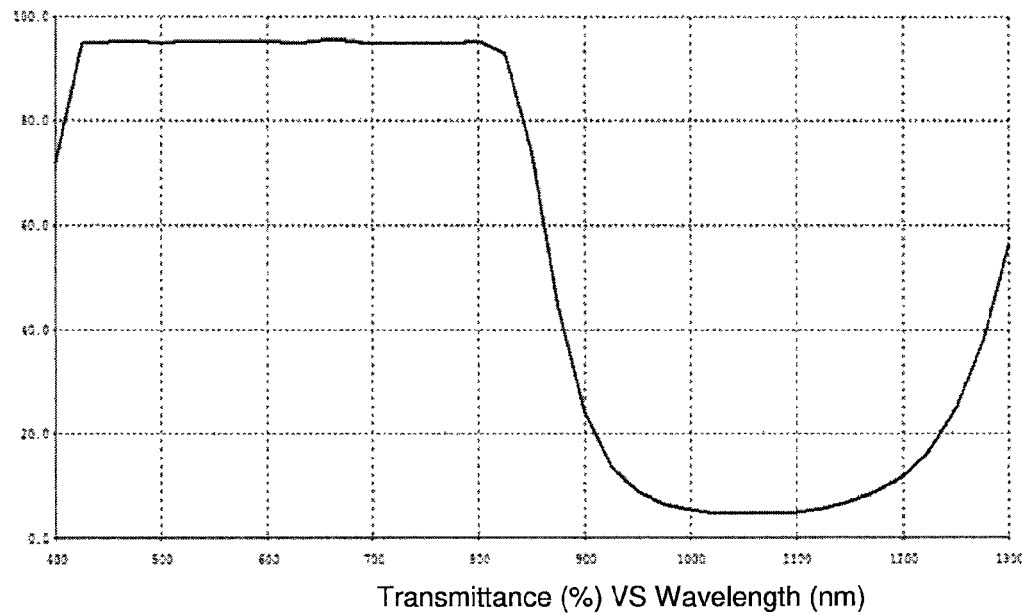
FIG. 21 shows a drawing of a spectrum after one piece of imaging lens, which is formed only with 12 layers of the optical thin film on the object-side surface.
Figure 22:
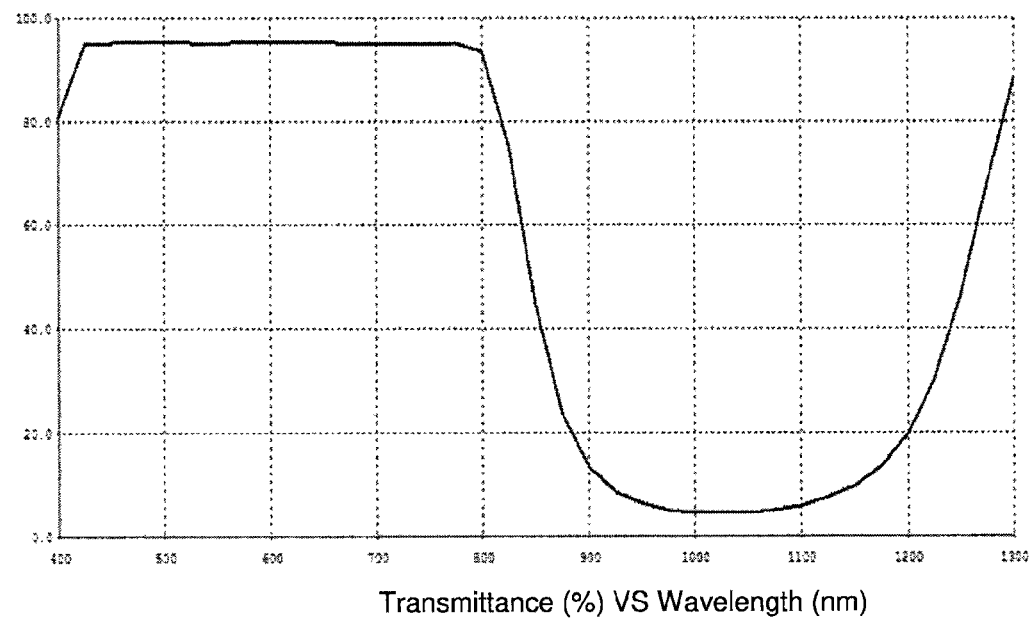
FIG. 22 shows a drawing of a spectrum after one piece of imaging lens, which is formed only with 12 layers of the optical thin film on the image-side surface.

FIG. 21 shows the spectrum after one piece of imaging lens, which is formed only with 12 layers of the optical thin film on the object-side surface. FIG. 22 shows the spectrum after one piece of imaging lens formed only with 12 layers of the optical thin film on the image-side surface. According to FIGS. 21 and 22, it is clear that for incident light with wavelength between 500 nm to 1300 nm, a minimum transmittance falls within the wavelength range between 900 nm to 1250 nm. Furthermore, for incident light with wavelength between 900 nm to 1250 nm, the transmittance is not greater than 30%. Meanwhile, for incident light with wavelength between 450 nm to 650 nm, the transmittance is over 90%.

Figure 23:
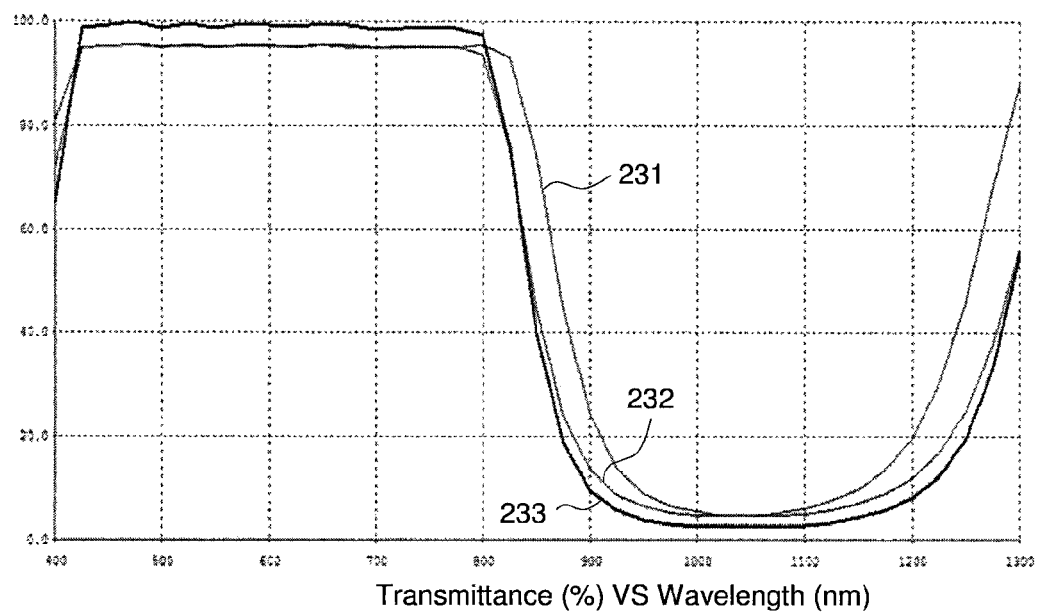
FIG. 23 shows a comparison drawing between the spectrum after one piece of imaging lens, which is formed only with 12 layers of the optical thin film on one surface and the spectrum after one piece of imaging lens formed with 12 layers of the optical thin film on each surface.
Figure 24:
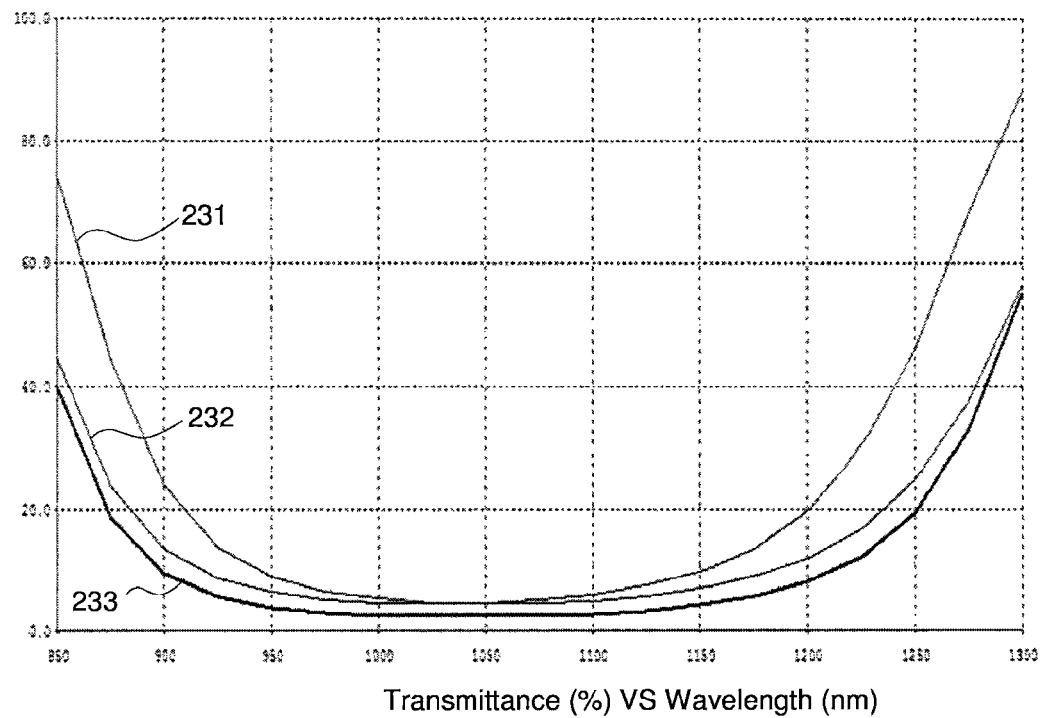
FIG. 24 shows an enlarged drawing of FIG. 23 in the wavelength range between 850 nm to 1300 nm.

FIG. 23 shows a summary of the spectrum after one piece of imaging lens is formed only with 12 layers of the optical thin film on one surface (i.e. any one of the object-side surface and the image-side surface), and the spectrum after one piece of imaging lens is formed with 12 layers of the optical thin film on each surface (i.e. the object-side surface and the image-side surface). FIG. 24 shows an enlarged drawing of FIG. 23 in the wavelength range between 850 nm to 1300 nm. The thin line 231 represents the spectrum after one piece of the imaging lens is formed only with 12 layers of the optical thin film on the object-side surface, thin line 232 represents the spectrum after one piece of the imaging lens is formed only with 12 layers of the optical thin film on the image-side surface, and the bold line 233 represents the spectrum after one piece of the imaging lens is formed with 12 layers of the optical thin film on each surface. Since the imaging lens formed only with 12 layers of the optical thin film on one surface has all of the three (a), (b1) and (c) characteristics, the other surface of the imaging lens could be formed with anti-reflection thin films, optical thin films and/or other thin films. The imaging lens formed with 12 layers of the optical thin film on each surface shows better characteristics than those of the imaging lens formed only with 12 layers of the optical thin film on one surface. The imaging lens formed with 12 layers of the optical thin film on each surface has aforesaid (a), (b1) and (c) characteristics and further lower transmittance for incident light with wavelength between 900 nm to 1250 nm, and meanwhile provides transmittance greater than 80% for incident light with wavelength between 450 nm to 650 nm.

Please refer to Tables 31-33 for the measured data of the transmittance for incident light with wavelength between 850 nm to 1300 nm of one piece of the imaging lens having both surfaces formed with 12 layers of the optical thin film:

TABLE 31

| Wavelength (nm) | 850 | 875 | 900 | 925 | 950 | 975 |
|---|---|---|---|---|---|---|
| Transmittance (%) | 40.083 | 18.564 | 9.536 | 5.711 | 3.912 | 3.006 |

TABLE 32

| Wavelength (nm) | 1000 | 1025 | 1050 | 1075 | 1100 | 1125 |
|---|---|---|---|---|---|---|
| Transmittance (%) | 2.546 | 2.357 | 2.347 | 2.494 | 2.816 | 3.367 |

TABLE 33

| Wavelength (nm) | 1150 | 1175 | 1200 | 1225 | 1250 | 1275 | 1300 |
|---|---|---|---|---|---|---|---|
| Transmittance (%) | 4.261 | 5.704 | 8.098 | 12.218 | 19.587 | 38.765 | 55.512 |

Figure 25:
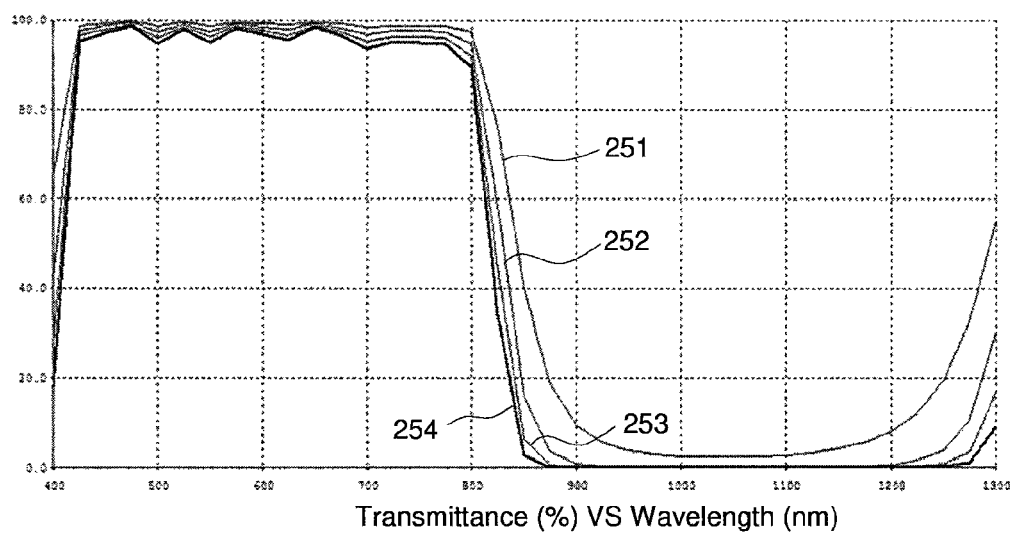
FIG. 25 shows a drawing of a spectrum after an optical lens assembly, which imaging lens assembly comprises one, two, three or four imaging lenses.
Figure 26:
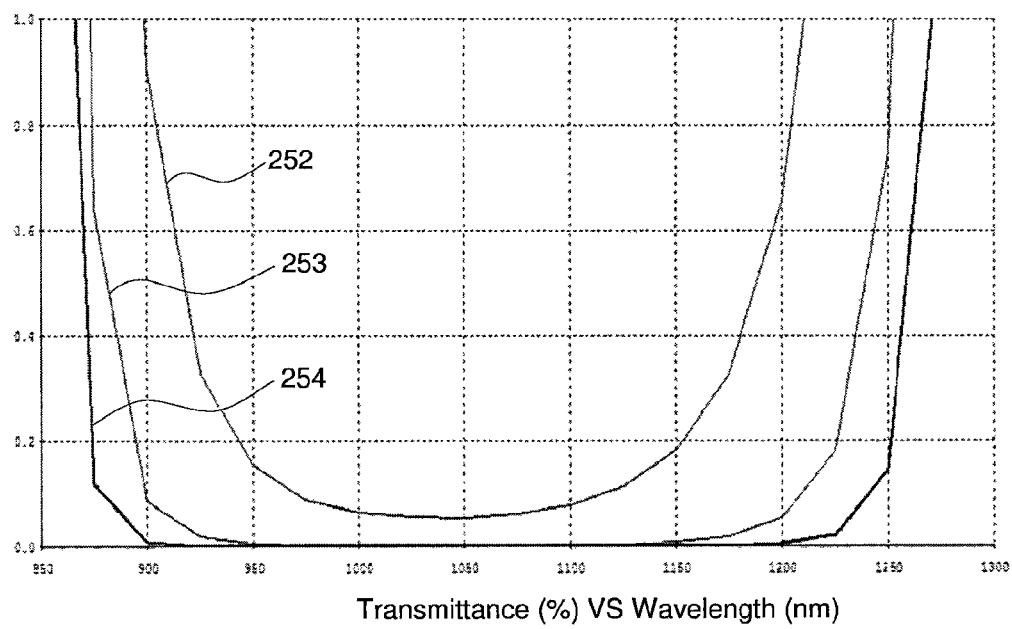
FIG. 26 shows an enlarged drawing of FIG. 25 in the wavelength range between 850 nm to 1300 nm.

FIG. 25 shows the spectrum of an optical lens assembly comprising several imaging lenses. FIG. 26 shows an enlarged drawing of FIG. 25 in the wavelength range between 850 nm to 1300 nm. The imaging lenses comprise a body made of the plastic material E48R (refractive index 1.533), as provided by ZEONEX, and layered with a total of 12 layers of the optical thin film of the high refractive index material ($Ti_3O_5$) and the optical thin films of the low refractive index material ($SiO_2$) on both surfaces (i.e. the object-side surface and the image-side surface) of the body through vacuum coating. The thin line 251 represents the spectrum after one piece of imaging lens, the thin line 252 represent the spectrum after two pieces of the imaging lens, the thin line 253 represents the spectrum after three pieces of the imaging lens, and the bold line 254 represents the spectrum after four pieces of the imaging lens to form an optical lens assembly. According to the drawing, it is clear that the four pieces of the imaging lens, each of which is formed with 12 layers of the optical thin film on the each surface, show better IR filtering characters. Not only are the above (a), (b2) and (c) characteristics satisfied, the transmittance is reduce to below 0.2% for incident light with wavelength between 900 nm to 1250 nm, and the transmittance is sustained to be greater than 80% for incident light with wavelength between 450 nm to 650 nm. Please refer to Tables 34-36 as follows for the detail data:

TABLE 34

| Wavelength (nm) | 850 | 875 | 900 | 925 | 950 | 975 |
|---|---|---|---|---|---|---|
| Transmittance (%) | 2.581432 | 0.118763 | 0.008269 | 0.001064 | 0.000234 | 0.000082 |

TABLE 35

| Wavelength (nm) | 1000 | 1025 | 1050 | 1075 | 1100 | 1125 |
|---|---|---|---|---|---|---|
| Transmittance (%) | 0.000042 | 0.000031 | 0.000032 | 0.000039 | 0.000063 | 0.000129 |

TABLE 36

| Wavelength (nm) | 1150 | 1175 | 1200 | 1225 | 1250 | 1275 | 1300 |
|---|---|---|---|---|---|---|---|
| Transmittance (%) | 0.000329 | 0.001059 | 0.004300 | 0.022281 | 0.147179 | 9.500000 | 4.010000 |

Embodiment IV:

FIGS. 27-34 illustrate the spectrums for example embodiments referred to as Embodiment IV. The imaging lenses or the optical lens assembly assemblies chosen in the present embodiment comprise those formed with 12 layers of the optical thin film on at least one surface, wherein the total thickness of the 12 layers of the optical thin film is between 1201 nm to 1550 nm, and those formed with 6 layers of anti-reflection thin film on each surface. For clarify, in respect to the two types of imaging lenses, the former will be referred to as the "first-type imaging lens", and the latter will be referred to as the "second-type imaging lens." The first-type imaging lenses comprise a body made of the plastic material E48R (refractive index 1.533), as provided by ZEONEX, and on at least one surface of the imaging lenses, a total of 12 layers of the optical thin film of a first material made of $Ti_3O_5$ and optical thin films of a second material made of $SiO_2$ having different refractive indexes are layered along a direction by vacuum coating. The second-type imaging lens comprise a body made of the plastic material E48R (refractive index 1.533), as provided by ZEONEX, and on both surfaces of the imaging lenses, a total of 6 layers of the anti-reflection thin film are layered by vacuum coating. Please refer to Tables 37-38 for the detail thickness of each layer of the optical thin films of the first material and optical thin films of the second material and the total thickness of the optical thin films on the object-side surface of the first-type imaging lens in the present embodiment:

TABLE 37

| The object-side surface | Total number of layers of the optical thin film | 12 | |
|---|---|---|---|
| | Material | $Ti_3O_5$ | $SiO_2$ |
| | Physical total thickness (nm) | 567.72 | 828.17 |
| | Total thickness (nm) | 1395.89 nm | |

TABLE 38

The object-side surface of the $1^{st}$ type of the imaging lens

| | Layer | | | | | |
|---|---|---|---|---|---|---|
| | $1^{st}$ layer | $2^{nd}$ layer | $3^{rd}$ layer | $4^{th}$ layer | $5^{th}$ layer | $6^{th}$ layer |
| Material | $Ti_3O_5$ | $SiO_2$ | $Ti_3O_5$ | $SiO_2$ | $Ti_3O_5$ | $SiO_2$ |
| Physical thickness (nm) | 13.07 | 35.53 | 119.3 | 179.34 | 110.42 | 174.43 |

TABLE 38-continued

The object-side surface of the $1^{st}$ type of the imaging lens

| | Layer | | | | | |
|---|---|---|---|---|---|---|
| | $7^{th}$ layer | $8^{th}$ layer | $9^{th}$ layer | $10^{th}$ layer | $11^{th}$ layer | $12^{th}$ layer |
| Material | $Ti_3O_5$ | $SiO_2$ | $Ti_3O_5$ | $SiO_2$ | $Ti_3O_5$ | $SiO_2$ |
| Physical thickness (nm) | 105.83 | 171.44 | 108.71 | 177.83 | 110.4 | 89.6 |

Please refer to Tables 39-40 for the detail thickness of each layer of the optical thin films of the first material and the optical thin films of the second material and the total thickness of the optical thin films on the image-side surface of the first-type imaging lens in the present embodiment:

TABLE 39

| The image-side surface | Total number of layers of the optical thin film | 12 | |
|---|---|---|---|
| | Material | $Ti_3O_5$ | $SiO_2$ |
| | Physical total thickness (nm) | 584.76 | 853.02 |
| | Total thickness (nm) | 1437.78 nm | |

TABLE 40

The image-side surface of the $1^{st}$ type of the imaging lens

| | Layer | | | | | |
|---|---|---|---|---|---|---|
| | $1^{st}$ layer | $2^{nd}$ layer | $3^{rd}$ layer | $4^{th}$ layer | $5^{th}$ layer | $6^{th}$ layer |
| Material | $Ti_3O_5$ | $SiO_2$ | $Ti_3O_5$ | $SiO_2$ | $Ti_3O_5$ | $SiO_2$ |
| Physical thickness (nm) | 13.46 | 36.6 | 122.88 | 184.72 | 113.73 | 179.66 |

| | Layer | | | | | |
|---|---|---|---|---|---|---|
| | $7^{th}$ layer | $8^{th}$ layer | $9^{th}$ layer | $10^{th}$ layer | $11^{th}$ layer | $12^{th}$ layer |
| Material | $Ti_3O_5$ | $SiO_2$ | $Ti_3O_5$ | $SiO_2$ | $Ti_3O_5$ | $SiO_2$ |
| Physical thickness (nm) | 109 | 176.58 | 111.97 | 183.16 | 113.71 | 92.29 |

Please refer to Tables 41-42 for the detail thickness of each layer of the anti-reflection thin films and the total thickness of the anti-reflection thin films on the both surfaces of the second-type imaging lens in the present embodiment:

TABLE 41

| Total number of layers of the optical thin film | 6 | |
|---|---|---|
| Material | Ti₃O₅ | SiO₂ |
| Physical total thickness (nm) | 95.61 | 169.6 |
| Total thickness (nm) | 265.21 nm | |

TABLE 42

| | Layer | | | | | |
|---|---|---|---|---|---|---|
| | 1$^{st}$ layer | 2$^{nd}$ layer | 3$^{rd}$ layer | 4$^{th}$ layer | 5$^{th}$ layer | 6$^{th}$ layer |
| Material | Ti₃O₅ | SiO₂ | Ti₃O₅ | SiO₂ | Ti₃O₅ | SiO₂ |
| Physical thickness (nm) | 14.79 | 38.2 | 46.43 | 23.43 | 34.39 | 107.97 |

Figure 27:
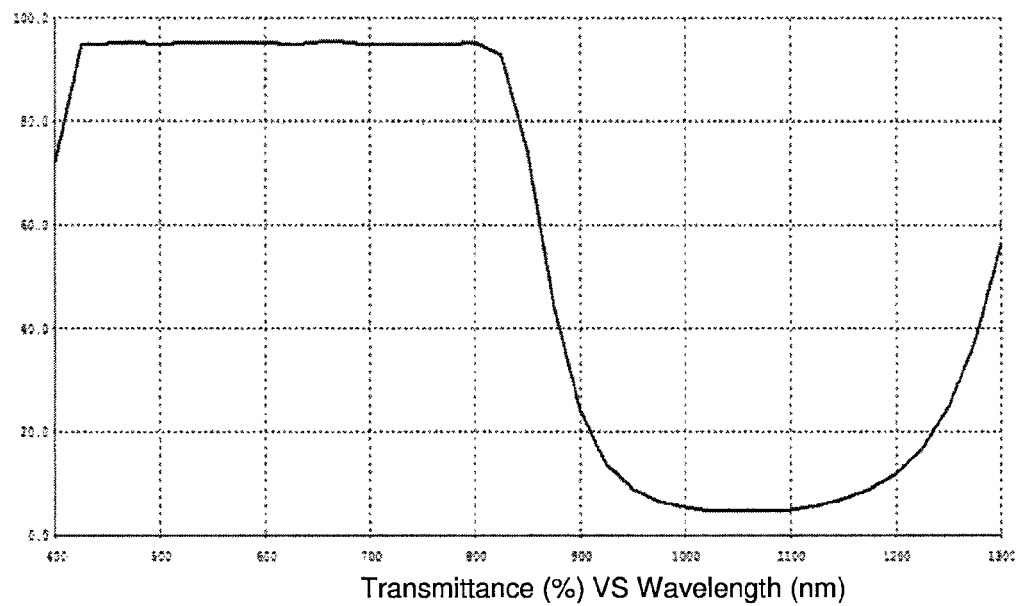
FIG. 27 shows a drawing of a spectrum after one piece of first-type imaging lens, which is formed only with 12 layers of the optical thin film on the object-side surface.
Figure 28:
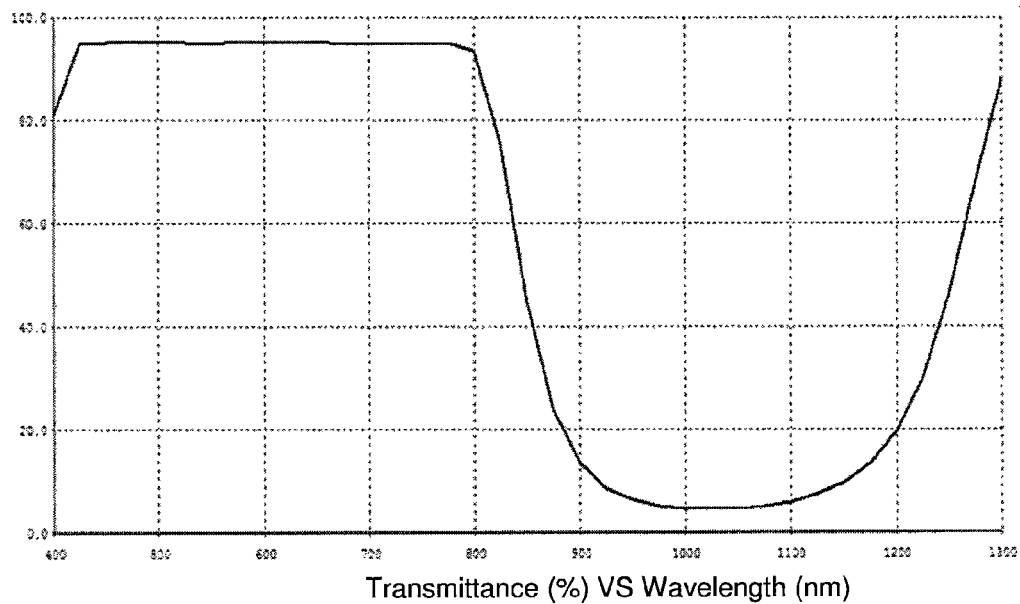
FIG. 28 shows a drawing of a spectrum after one piece of first-type imaging lens, which is formed only with 12 layers of the optical thin film on the image-side surface.

The comparison among the first-type imaging lenses is as follows. FIG. 27 shows the spectrum after one piece of the first-type imaging lens, which is formed only with 12 layers of the optical thin film on the object-side surface. FIG. 28 shows the spectrum after one piece of first-type imaging lens, which is formed only with 12 layers of the optical thin film on the image-side surface. According to FIGS. 27 and 28, it is clear that for incident light with wavelength between 500 nm to 1300 nm, a minimum transmittance falls within the wavelength range between 900 nm to 1250 nm. Furthermore, for incident light with wavelength between 900 nm to 1250 nm, the transmittance is not greater than 30%. Meanwhile, for incident light with wavelength between 450 nm to 650 nm, the transmittance is over 90%.

Figure 29:
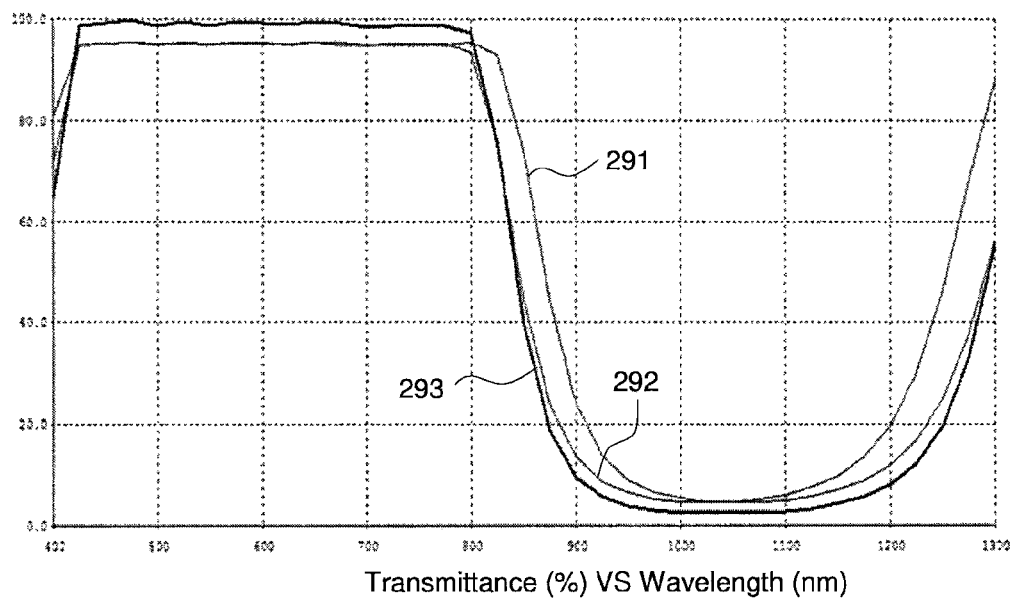
FIG. 29 shows a comparison drawing between the spectrum after one piece of first-type imaging lens, which is formed only with 12 layers of the optical thin film on one surface and the spectrum after one piece of first-type imaging lens formed with 12 layers of the optical thin film on each surface.
Figure 30:
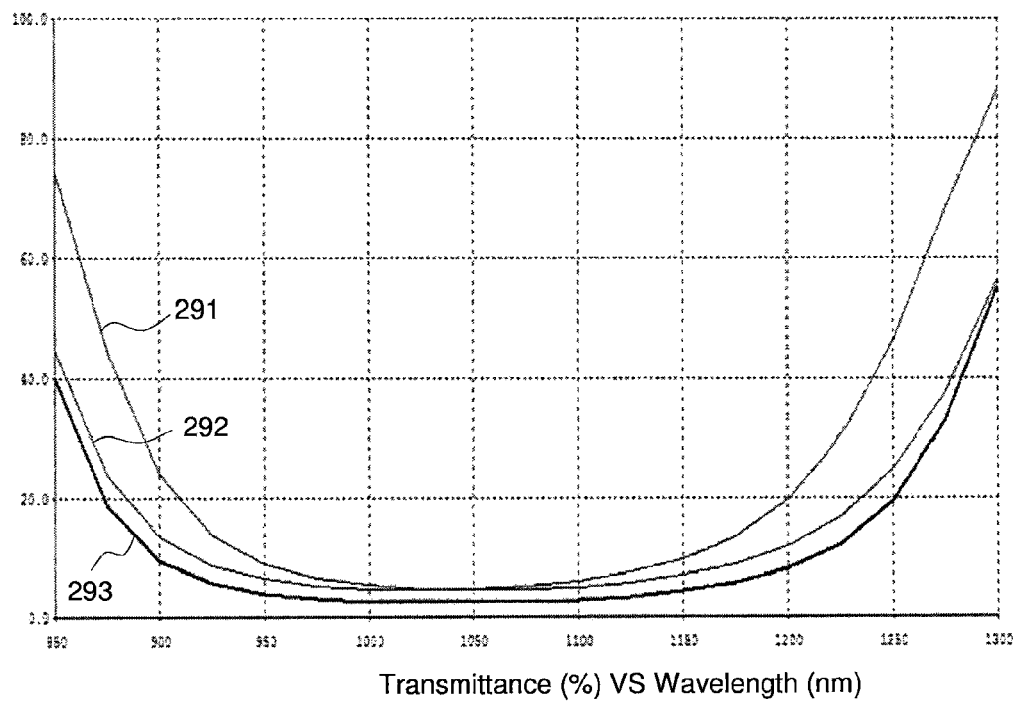
FIG. 30 shows an enlarged drawing of FIG. 29 in the wavelength range between 850 nm to 1300 nm.

FIG. 29 shows a summary of the spectrum after one piece of the first-type imaging lens formed only with 12 layers of the optical thin film on one surface, and the spectrum after one piece of the first-type imaging lens formed with 12 layers of the optical thin film on each surface. FIG. 30 shows an enlarged drawing of FIG. 29 in the wavelength range between 850 nm to 1300 nm. The thin line 291 represents the spectrum after one piece of the imaging lens formed only with 12 layers of the optical thin film on the object-side surface, thin line 292 represents the spectrum after one piece of the imaging lens formed only with 12 layers of the optical thin film on the image-side surface, and the bold line 293 represents the spectrum after one piece of the imaging lens formed with 12 layers of the optical thin film on each surface. Since the imaging lens, which is formed only with 12 layers of the optical thin film on one surface, has all of the three (a), (b1) and (c) characteristics, the other surface of the imaging lens could be formed with anti-reflection thin films, optical thin films and/or other thin films. The imaging lens formed with 12 layers of the optical thin film on each surface shows better characteristics than those of the imaging lens formed only with 12 layers of the optical thin film on one surface. The imaging lens formed with 12 layers of the optical thin film on each surface has aforesaid (a), (b1) and (c) characteristics and further lower transmittance for the incident light with wavelength between 900 nm to 1250 nm, and meanwhile provide transmittance higher than 80% for incident light with wavelength between 450 nm to 650 nm.

Please refer to Tables 43-46 for the measured data of transmittance of incident light with wavelength between 850 nm to 1300 nm of one piece of the first-type imaging lens having both surfaces formed with 12 layers of the optical thin film:

TABLE 43

| Wavelength (nm) | 850 | 875 | 900 | 925 | 950 | 975 |
|---|---|---|---|---|---|---|
| Transmittance (%) | 40.083 | 18.564 | 9.536 | 5.711 | 3.912 | 3.006 |

TABLE 44

| Wavelength (nm) | 1000 | 1025 | 1050 | 1075 | 1100 | 1125 |
|---|---|---|---|---|---|---|
| Transmittance (%) | 2.546 | 2.357 | 2.347 | 2.494 | 2.816 | 3.367 |

TABLE 45

| Wavelength (nm) | 1150 | 1175 | 1200 | 1225 | 1250 | 1275 | 1300 |
|---|---|---|---|---|---|---|---|
| Transmittance (%) | 4.261 | 5.704 | 8.098 | 12.218 | 19.587 | 38.765 | 55.512 |

Figure 31:
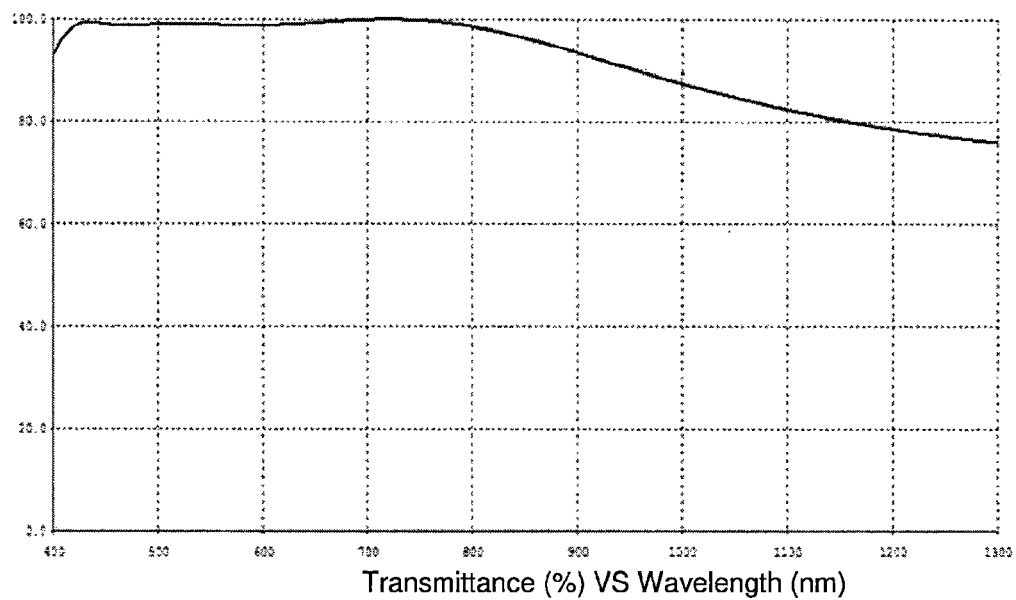
FIG. 31 shows a drawing of a spectrum after one piece of second-type imaging lens formed with 6 layers of the anti-reflection thin film on the both surfaces.
Figure 32:
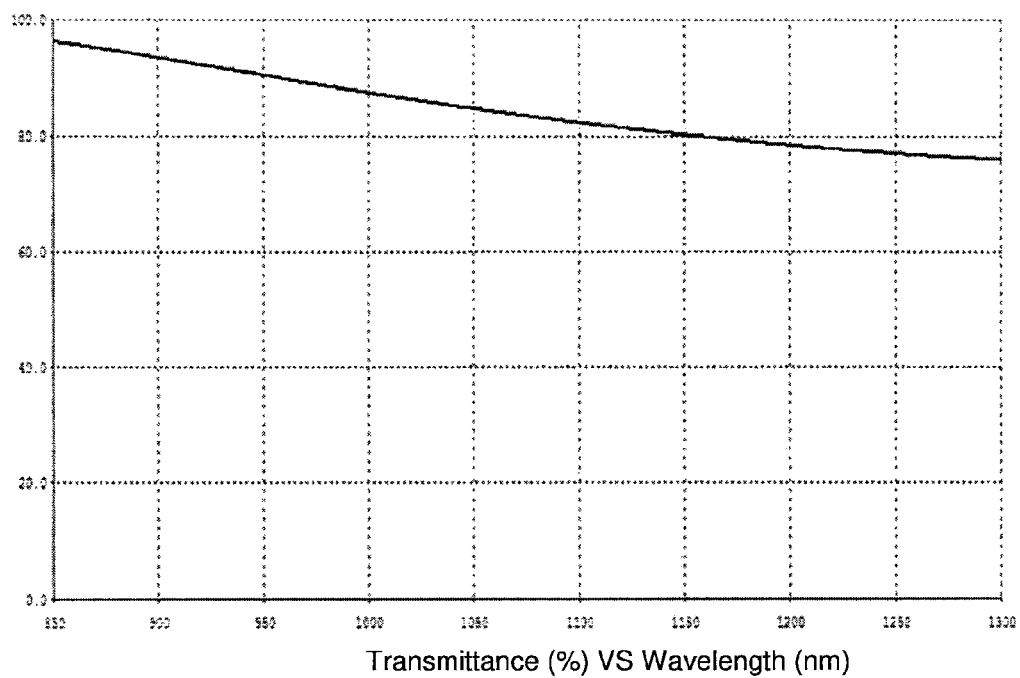
FIG. 32 shows an enlarged drawing of FIG. 30 in the wavelength range between 850 nm to 1300 nm.

For the second-type imaging lens, FIG. 31 shows the spectrum after one piece of the second-type imaging lens formed with 6 layers of the anti-reflection thin film on both surfaces. FIG. 32 shows an enlarged drawing of FIG. 31 in the wavelength range between 850 nm to 1300 nm. Please refer to the below Tables 46-48 for the measured data of the transmittance of incident light with wavelength between 850 nm to 1300 nm of one piece of the second-type imaging lens having both surfaces formed with 6 layers of the anti-reflection thin film (i.e. both of the object-side surface and the image-side surface):

TABLE 46

| Wavelength (nm) | 850 | 875 | 900 | 925 | 950 | 975 |
|---|---|---|---|---|---|---|
| Transmittance (%) | 96.273903 | 94.903741 | 93.428992 | 91.914006 | 90.380883 | 88.863557 |

TABLE 47

| Wavelength (nm) | 1000 | 1025 | 1050 | 1075 | 1100 | 1125 |
|---|---|---|---|---|---|---|
| Transmittance (%) | 87.387577 | 85.999609 | 84.680712 | 83.438789 | 82.278242 | 81.200766 |

TABLE 48

| Wavelength (nm) | 1150 | 1175 | 1200 | 1225 | 1250 | 1275 | 1300 |
|---|---|---|---|---|---|---|---|
| Transmittance (%) | 80.206031 | 79.292244 | 78.456591 | 77.695583 | 77.005322 | 76.536825 | 74.923047 |

From FIG. 31, it is clear that for the incident light with wavelength between 450 nm to 650 nm, the transmittance of one piece of the second-type imaging lens formed with 6 layers of the anti-reflection thin film is greater than 80%. Therefore, the anti-reflection thin films could facilitate a higher transmittance for visible light.

Further, the optical lens assembly used in the present embodiment comprises the first-type imaging lens formed with 12 layers of optical thin film on the object-side surface and the image-side surface, and/or the second-type imaging lens formed with 6 layers of anti-reflection thin film on the object-side surface and the image-side surface.

Figure 33:
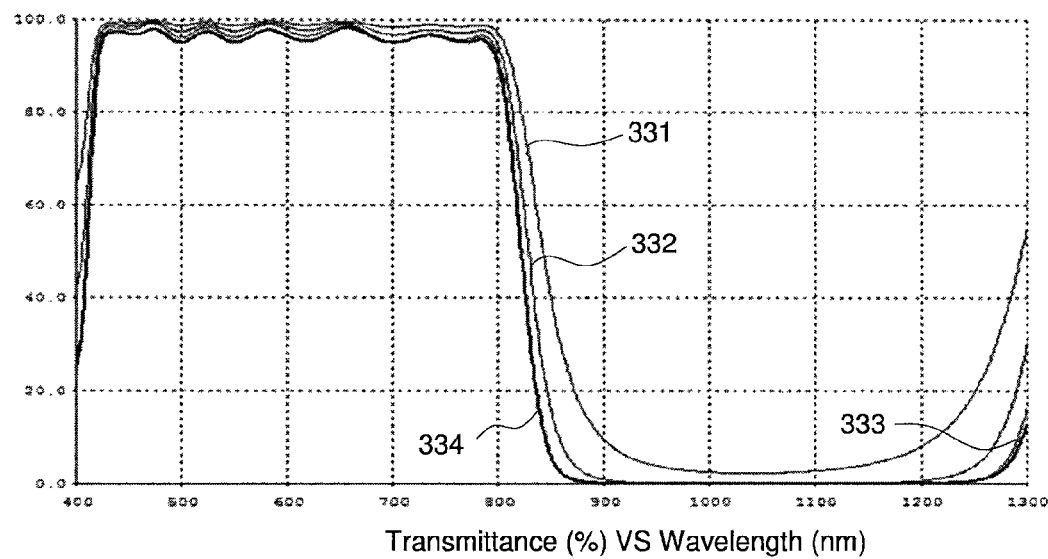
FIG. 33 shows a drawing of a spectrum after an optical lens assembly, which imaging lens assembly comprises one, two, three or four imaging lenses.
Figure 34:
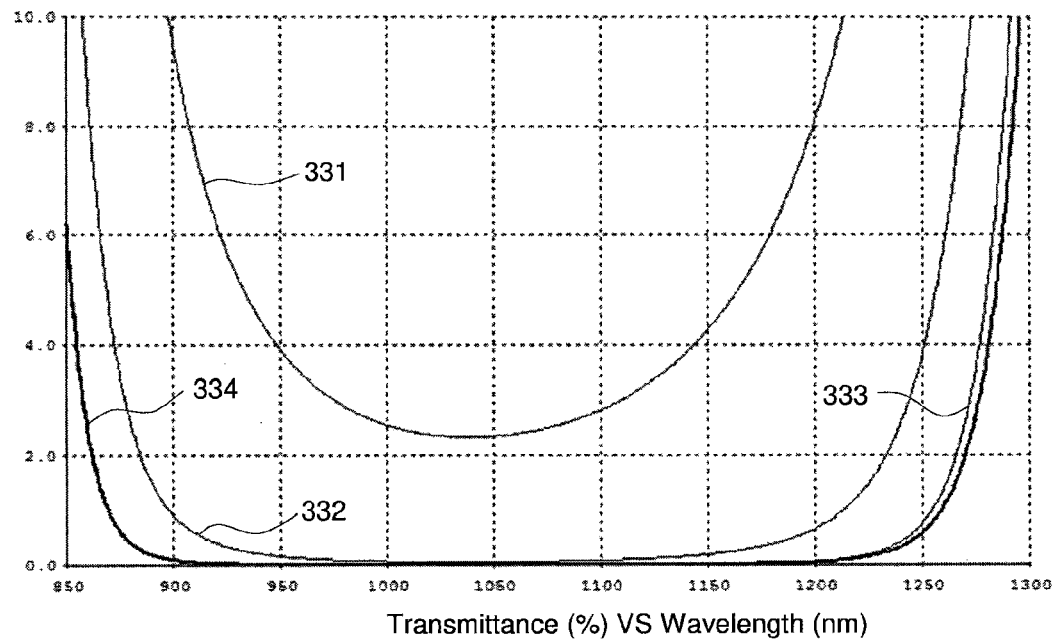
FIG. 34 shows an enlarged drawing of FIG. 33 in the wavelength range between 850 nm to 1300 nm.

FIG. 33 shows the spectrum after an optical lens assembly, which comprises several the first-type and/or second-type imaging lenses. FIG. 34 shows an enlarged drawings of FIG. 33 in the wavelength range between 850 nm to 1300 nm. The thin line 331 represents the spectrum after only one piece of the first-type imaging lens, the thin line 332 represent the spectrum after only two pieces of the first-type imaging lenses, the thin line 333 represents the spectrum after only three pieces of the first-type imaging lenses, and the bold line 334 represents the spectrum after three pieces of the first-type imaging lenses and one piece of the second-type imaging lens. According to the drawing, it is clear that the imaging lenses comprising three pieces of the first-type imaging lens, each of which is formed with 12 layers of the optical thin film on each surface, and one piece of the second-type imaging lens formed with 6 layers of the anti-reflection thin film on each surface (i.e. four pieces of imaging lenses, at least one of which formed with a plurality of anti-reflection thin films on both surfaces) show better IR filtering characters. Not only are the above (a), (b2) and (c) characteristics satisfied, the transmittance is reduce to below 0.6% for incident light with wavelength between 900 nm to 1250 nm, and the transmittance is sustained to be higher than 80% for the incident light with wavelength between 450 nm to 650 nm. Please refer to Tables 49-51 as follows for the detail data:

TABLE 49

| Wavelength (nm) | 850 | 875 | 900 | 925 | 950 | 975 |
|---|---|---|---|---|---|---|
| Transmittance (%) | 6.20114 | 0.607226 | 0.08102 | 0.017126 | 0.005413 | 0.002413 |

TABLE 50

| Wavelength (nm) | 1000 | 1025 | 1050 | 1075 | 1100 | 1125 |
|---|---|---|---|---|---|---|
| Transmittance (%) | 0.001441 | 0.001126 | 0.001094 | 0.001294 | 0.001836 | 0.003099 |

TABLE 51

| Wavelength (nm) | 1150 | 1175 | 1200 | 1225 | 1250 | 1275 | 1300 |
|---|---|---|---|---|---|---|---|
| Transmittance (%) | 0.006199 | 0.014709 | 0.041637 | 0.14161 | 0.578273 | 3.647753 | 11.25463 |

Embodiment V:

FIGS. 35-43 illustrate the spectrums for example embodiments referred to as Embodiment V. The imaging lenses or the optical lens assembly assemblies chosen in the present embodiment comprises imaging lenses formed with 12 layers of the optical thin film on at least one surface (hereinafter "first-type imaging lenses") and imaging lens formed with 12 layers of the optical thin film on one surface and 6 layers of anti-reflection thin film on the other surface (hereinafter "third-type imaging lenses"), wherein the total thickness of the 12 layers of the optical thin film is between 1201 nm to 1550 nm. The first-type imaging lenses comprise a body made of the plastic material E48R (refractive index 1.533), as provided by ZEONEX, and on at least one surface of the imaging lenses (i.e. at least one of the object-side surface and the image-side surface), a total of 12 layers of the optical thin film of a first material made of $Ti_3O_5$ and optical thin films of a second material made of $SiO_2$ having different refractive indexes are layered along a direction by vacuum coating. The third-type imaging lens comprises a body made of the plastic material E48R (refractive index 1.533), as provided by ZEONEX, and on one of the object-side surface and the image-side surface, a total of 12 layers of the optical thin film are layered by vacuum coating, and on the other surface, a total of 6 layers of the anti-reflection thin film are layered by vacuum coating. Please refer to Tables 52-53 for the detail thickness of each layer of the optical thin films of the first material and optical thin films of the second material and the total thickness of the optical thin films on the object-side surface of the first-type imaging lens in the present embodiment:

TABLE 52

| The object-side surface | Total number of layers of the optical thin film | 12 | |
|---|---|---|---|
| | Material | $Ti_3O_5$ | $SiO_2$ |
| | Physical total thickness (nm) | 567.72 | 828.17 |
| | Total thickness (nm) | 1395.89 nm | |

TABLE 53

The object-side surface of the 1st type of the imaging lens

| | Layer | | | | | |
|---|---|---|---|---|---|---|
| | 1st layer | 2nd layer | 3rd layer | 4th layer | 5th layer | 6th layer |
| Material | $Ti_3O_5$ | $SiO_2$ | $Ti_3O_5$ | $SiO_2$ | $Ti_3O_5$ | $SiO_2$ |
| Physical thickness (nm) | 13.07 | 35.53 | 119.3 | 179.34 | 110.42 | 174.43 |

| | Layer | | | | | |
|---|---|---|---|---|---|---|
| | 7th layer | 8th layer | 9th layer | 10th layer | 11th layer | 12th layer |
| Material | $Ti_3O_5$ | $SiO_2$ | $Ti_3O_5$ | $SiO_2$ | $Ti_3O_5$ | $SiO_2$ |
| Physical thickness (nm) | 105.83 | 171.44 | 108.71 | 177.83 | 110.4 | 89.6 |

Please refer to Tables 54-55 for the detail thickness of each layer of the 12-layer optical thin films of the first material and the optical thin films of the second material and the total thickness of the optical thin films on the image-side surface of the first-type imaging lens in the present embodiment:

TABLE 54

| The image-side surface | Total number of layers of the optical thin film | 12 | |
|---|---|---|---|
| | Material | $Ti_3O_5$ | $SiO_2$ |
| | Physical total thickness (nm) | 584.76 | 853.02 |
| | Total thickness (nm) | 1437.78 nm | |

TABLE 55

The image-side surface of the 1st type of the imaging lens

| | Layer | | | | | |
|---|---|---|---|---|---|---|
| | 1st layer | 2nd layer | 3rd layer | 4th layer | 5th layer | 6th layer |
| Material | $Ti_3O_5$ | $SiO_2$ | $Ti_3O_5$ | $SiO_2$ | $Ti_3O_5$ | $SiO_2$ |
| Physical thickness (nm) | 13.46 | 36.6 | 122.88 | 184.72 | 113.73 | 179.66 |

| | Layer | | | | | |
|---|---|---|---|---|---|---|
| | 7th layer | 8th layer | 9th layer | 10th layer | 11th layer | 12th layer |
| Material | $Ti_3O_5$ | $SiO_2$ | $Ti_3O_5$ | $SiO_2$ | $Ti_3O_5$ | $SiO_2$ |
| Physical thickness (nm) | 109 | 176.58 | 111.97 | 183.16 | 113.71 | 92.29 |

Please refer to Tables 56-57 for the detail thickness of each layer of the 12 layers of the optical thin film and the total thickness of the optical thin films on the object-side surface of the third-type imaging lens in the present embodiment:

TABLE 56

| The object-side surface | Total number of layers of the optical thin film | 12 | |
|---|---|---|---|
| | Material | $SiO_2$ | $SiO_2$ |
| | Physical total thickness (nm) | 828.17 | 169.6 |
| | Total thickness (nm) | 1395.89 nm | |

TABLE 57

The object-side surface of the third-type imaging lens

| | Layer | | | | | |
|---|---|---|---|---|---|---|
| | 1st layer | 2nd layer | 3rd layer | 4th layer | 5th layer | 6th layer |
| Material | $Ti_3O_5$ | $SiO_2$ | $Ti_3O_5$ | $SiO_2$ | $Ti_3O_5$ | $SiO_2$ |
| Physical thickness (nm) | 13.07 | 35.53 | 119.3 | 179.34 | 110.42 | 174.43 |

| | Layer | | | | | |
|---|---|---|---|---|---|---|
| | 7th layer | 8th layer | 9th layer | 10th layer | 11th layer | 12th layer |
| Material | $Ti_3O_5$ | $SiO_2$ | $Ti_3O_5$ | $SiO_2$ | $Ti_3O_5$ | $SiO_2$ |
| Physical thickness (nm) | 105.83 | 171.44 | 108.71 | 177.83 | 110.4 | 89.6 |

Please refer to Tables 58-59 for the detail thickness of each layer of the 6 layers of the anti-reflection thin film and the total thickness of the anti-reflection thin films on the image-side surface of the third-type imaging lens in the present embodiment:

TABLE 58

| The image-side surface | Total number of layers of the optical thin film | 6 | |
|---|---|---|---|
| | Material | $Ti_3O_5$ | $SiO_2$ |
| | Physical total thickness (nm) | 95.61 | 169.6 |
| | Total thickness (nm) | 265.21 nm | |

TABLE 59

The image-side surface of the third-type imaging lens

| | Layer | | | | | |
|---|---|---|---|---|---|---|
| | 1st layer | 2nd layer | 3rd layer | 4th layer | 5th layer | 6th layer |
| Material | $Ti_3O_5$ | $SiO_2$ | $Ti_3O_5$ | $SiO_2$ | $Ti_3O_5$ | $SiO_2$ |
| Physical thickness (nm) | 14.79 | 38.2 | 46.43 | 23.43 | 34.39 | 107.97 |

Figure 35:
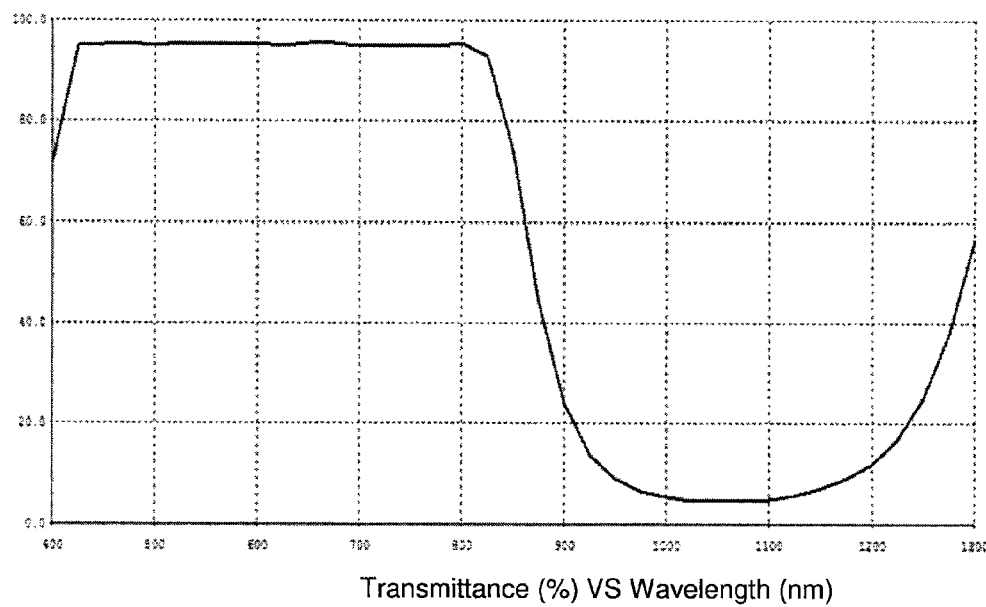
FIG. 35 shows a drawing of a spectrum after one piece of first-type imaging lens, which is formed only with 12 layers of the optical thin film on the object-side surface.
Figure 36:
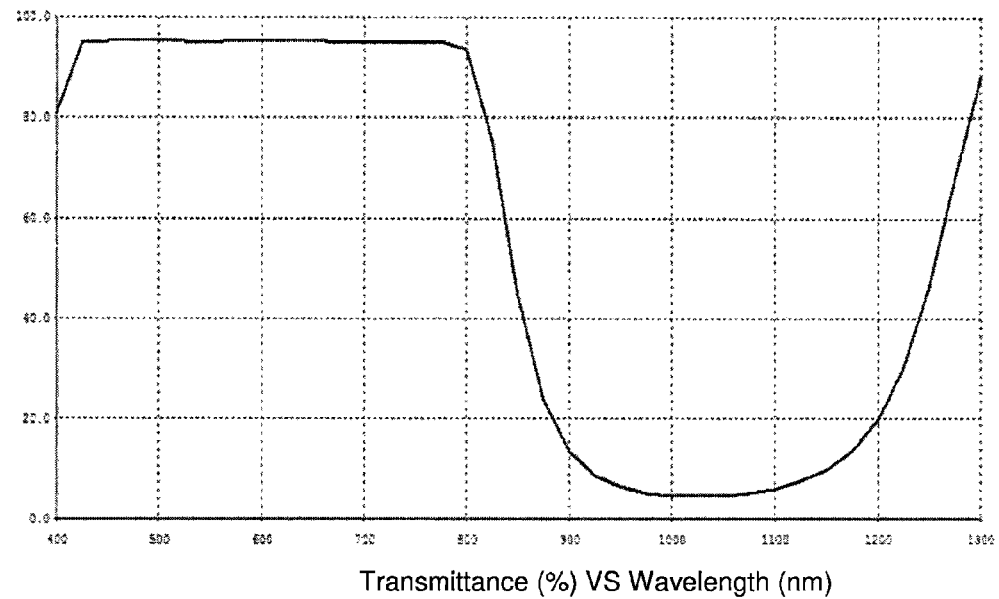
FIG. 36 shows a drawing of a spectrum after one piece of first-type imaging lens, which is formed only with 12 layers of the optical thin film on the image-side surface.
Figure 37:
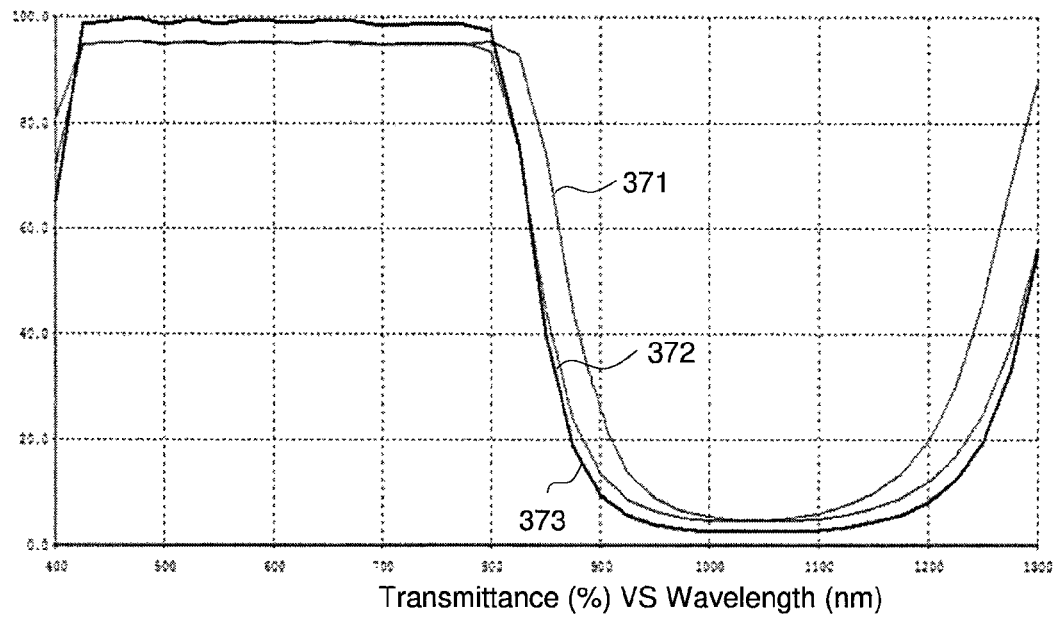
FIG. 37 shows a comparison drawing between the spectrum after one piece of first-type imaging lens, which is formed only with 12 layers of the optical thin film on one surface and the spectrum after one piece of first-type imaging lens formed with 12 layers of the optical thin film on each surface.
Figure 38:
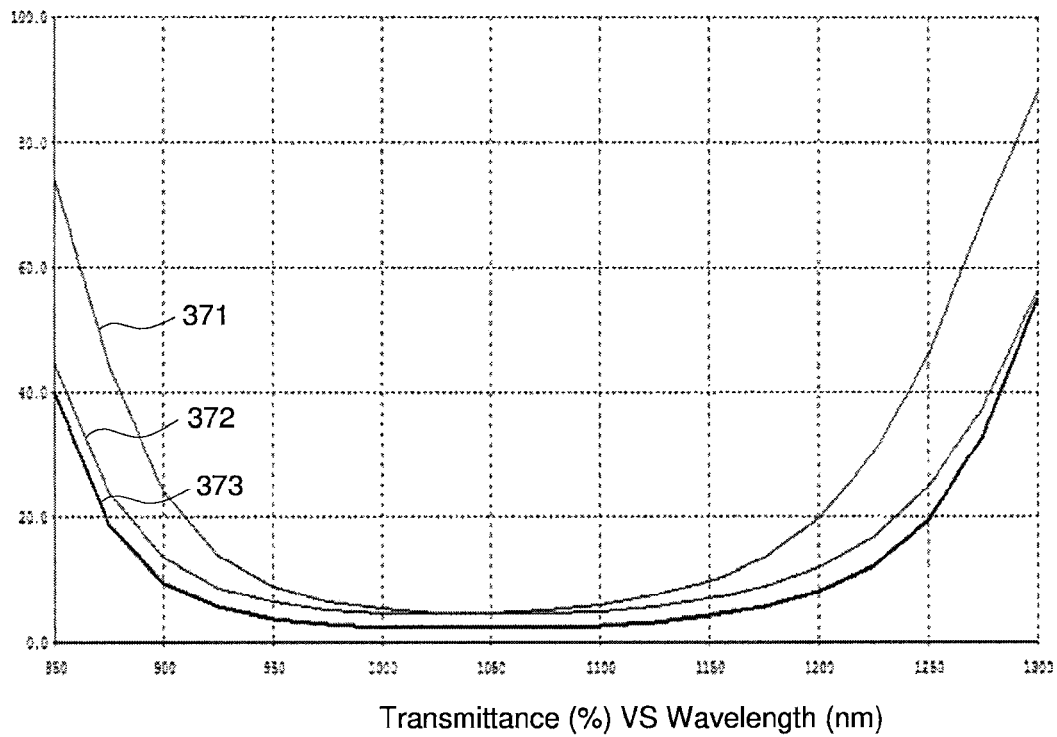
FIG. 38 shows an enlarged drawing of FIG. 37 in the wavelength range between 850 nm to 1300 nm.

A summary of the first-type imaging lenses is as follows. FIG. 35 shows the spectrum after one piece of the first-type imaging lens, which is formed only with 12 layers of the optical thin film on the object-side surface. FIG. 36 shows the spectrum after one piece of the first-type imaging lens, which is formed only with 12 layers of the optical thin film on the image-side surface. According to FIGS. 35 and 36, it is clear that for incident light with wavelength between 500 nm to 1300 nm, a minimum transmittance falls within the wavelength range between 900 nm to 1250 nm. For incident light with wavelength between this range, the transmittance is not greater than 30%, and meanwhile, for incident light with wavelength between 450 nm to 650 nm, the transmittance is over 90%. FIG. 37 shows a comparison drawing between the spectrum after one piece of the first-type imaging lens, which is formed only with 12 layers of the optical thin film on one surface (i.e. any one of the object-side surface and the image-side surface), and the spectrum after one piece of the first-type imaging lens formed with 12 layers of the optical thin film on each surface (i.e. both of the object-side surface and the image-side surface). FIG. 38 shows an enlarged drawing of FIG. 37 in the wavelength range between 850 nm to 1300 nm. The thin line 371 represents the spectrum after one piece of the imaging lens, which is formed only with 12 layers of the optical thin film on the object-side surface, thin line 372 represents the spectrum after one piece of the imaging lens, which is formed only with 12 layers of the optical thin film on the image-side surface, and the bold line 373 represents the spectrum after one piece of the imaging lens formed with 12 layers of the optical thin film on each surface. The first-type imaging lens formed with 12 layers of the optical thin film on each surface shows better characteristics than those of the first-type imaging lens, which is formed only with 12 layers of the optical thin film on one surface. The first-type imaging lens formed with 12 layers of the optical thin film on each surface has aforesaid (a), (b1) and (c) characteristics and lower transmittance for incident light with wavelength between 900 nm to 1250 nm, and meanwhile provide higher transmittance for incident light with wavelength between 450 nm to 650 nm.

Please refer to Tables 60-62 for the measured data of the transmittance for incident light with wavelength between 850 nm to 1300 nm of one piece of the first-type imaging lens whose surfaces are both formed with 12 layers of the optical thin film:

TABLE 60

| Wavelength (nm) | 850 | 875 | 900 | 925 | 950 | 975 |
|---|---|---|---|---|---|---|
| Transmittance (%) | 40.083 | 18.564 | 9.536 | 5.711 | 3.912 | 3.006 |

TABLE 61

| Wavelength (nm) | 1000 | 1025 | 1050 | 1075 | 1100 | 1125 |
|---|---|---|---|---|---|---|
| Transmittance (%) | 2.546 | 2.357 | 2.347 | 2.494 | 2.816 | 3.367 |

TABLE 62

| Wavelength (nm) | 1150 | 1175 | 1200 | 1225 | 1250 | 1275 | 1300 |
|---|---|---|---|---|---|---|---|
| Transmittance (%) | 4.261 | 5.704 | 8.098 | 12.218 | 19.587 | 38.765 | 55.512 |

Figure 39:
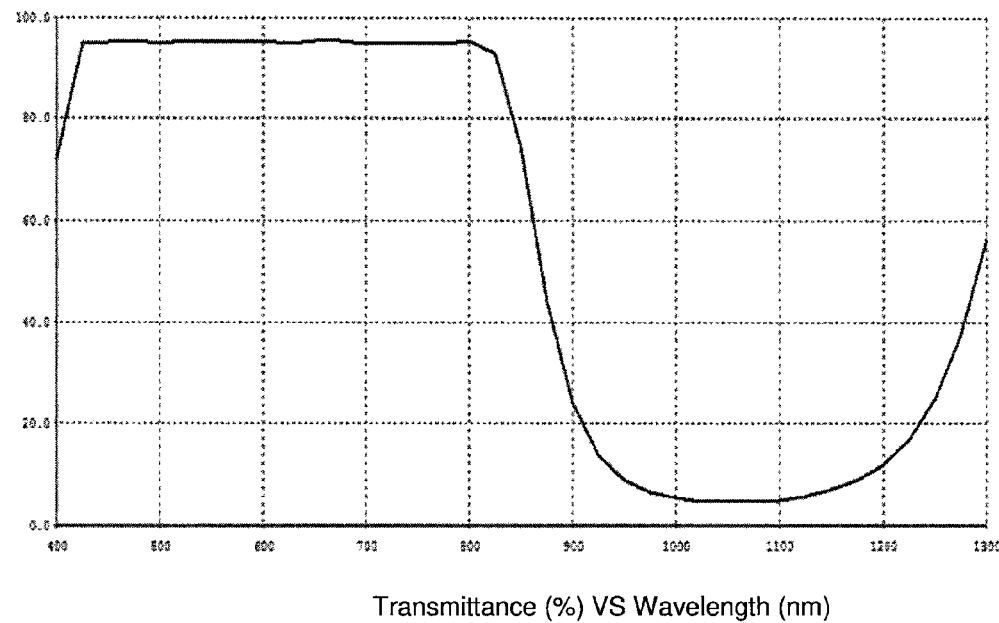
FIG. 39 shows a drawing of a spectrum after one piece of imaging lens formed only with 12 layers of the optical thin film on the object-side surface.
Figure 40:
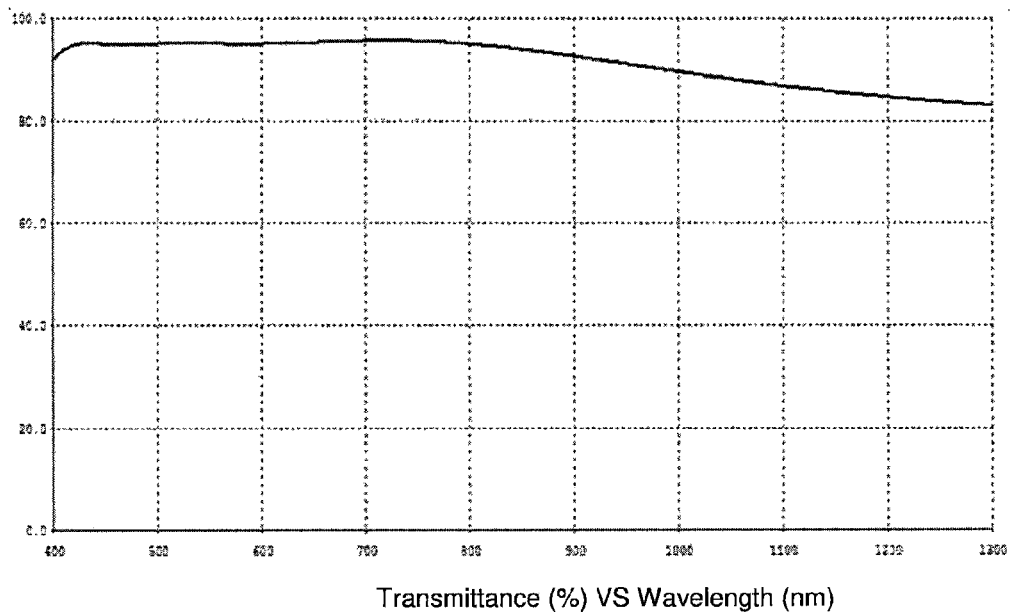
FIG. 40 shows a drawing of a spectrum after one piece of imaging lens formed only with 6 layers of anti-reflection thin film on the image-side surface.
Figure 41:
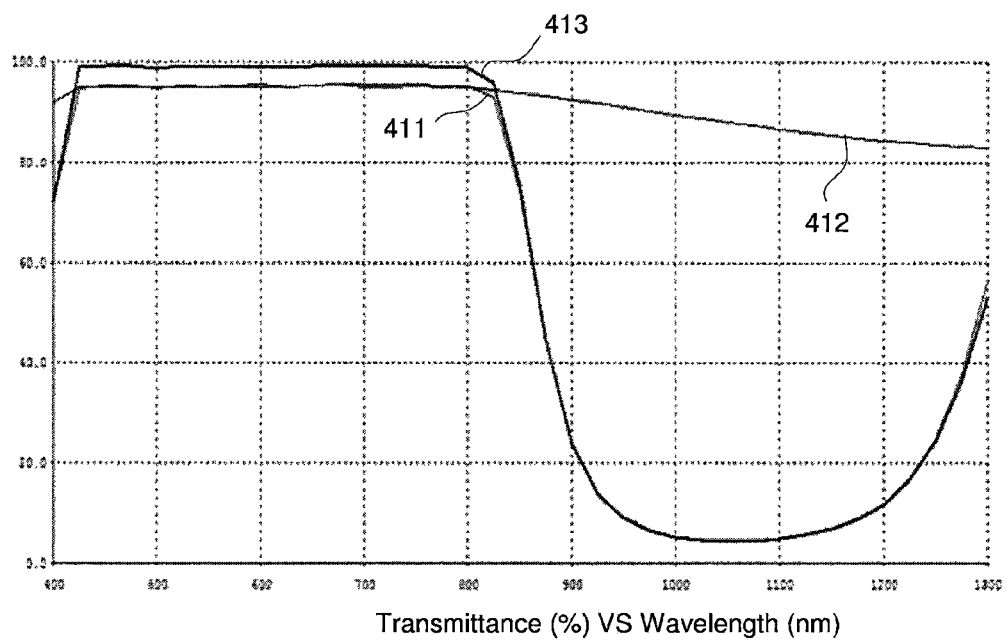
FIG. 41 shows a comparison drawing of the spectrum shown in FIGS. 39 and 40 and a spectrum after one piece of third-type imaging lens formed with 12 layers of the optical thin film on the object-side surface and 6 layers of the anti-reflection thin film on the image-side surfaces.
Figure 42:
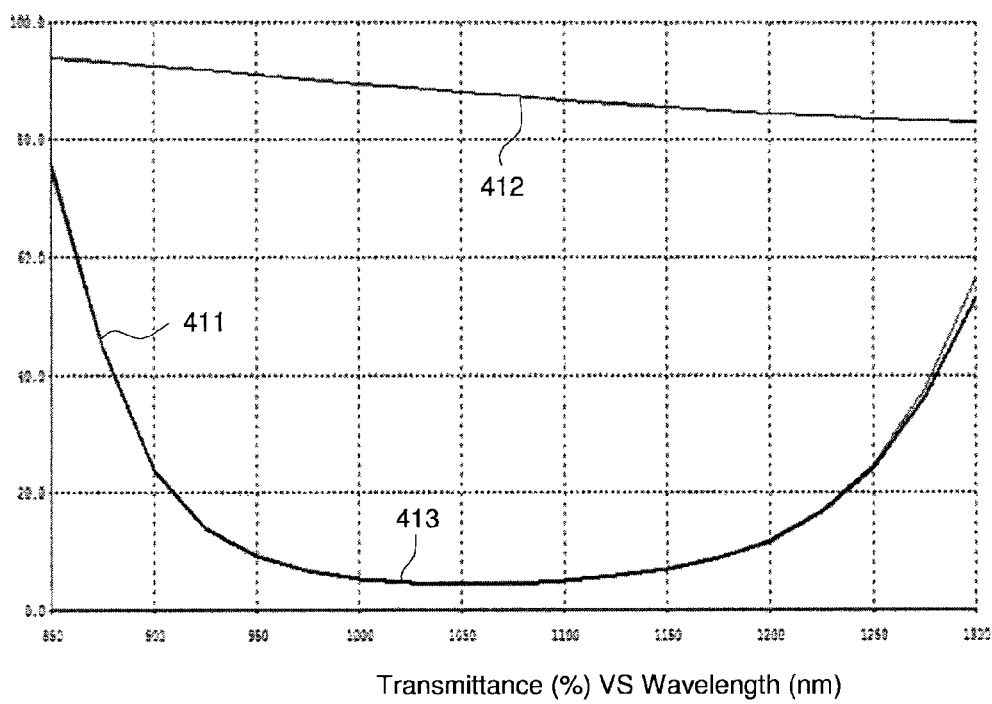
FIG. 42 shows an enlarged drawing of FIG. 41 in the wavelength range between 850 nm to 1300 nm.

For the third-type imaging lens, FIG. 39 shows the spectrum after one piece of the imaging lens formed only with 12 layers of the optical thin film on the object-side surface. FIG. 40 shows a drawing of the spectrum after one piece of the imaging lens formed only with 6 layers of anti-reflection thin film on the image-side surface. FIG. 41 shows a comparison drawing of the spectrums shown in FIGS. 39 and 40 and a spectrum after one piece of the third-type imaging lens formed with 12 layers of the optical thin film on the object-side surface and 6 layers of the anti-reflection thin film on the image-side surfaces. The thin line 411 represents the spectrum after one piece of the imaging lens, which is formed only with 12 layers of the optical thin film on the object-side surface. FIG. 42 shows an enlarged drawing of FIG. 41 in the wavelength range between 850 nm to 1300 nm. The thin line 412 represents the spectrum after one piece of the imaging lens, which is formed only with 6 layers of the anti-reflection thin film on the image-side surface. The bold line 413 represents the spectrum after one piece of the third-type imaging lens formed with 12 layers of the optical thin film on the object-side surface and 6 layers of the anti-reflection thin film on the image-side surface. Please refer to the below Tables 63-65 for the measured data of the transmittance for incident light with wavelength between 850 nm to 1300 nm of one piece of the third-type imaging lens, wherein the object-side surface is formed with 12 layers of the optical thin film and wherein the image-side surface is formed with 6 layers of the anti-reflection thin film:

TABLE 63

| Wavelength (nm) | 850 | 875 | 900 | 925 | 950 | 975 |
|---|---|---|---|---|---|---|
| Transmittance (%) | 75.868202 | 44.788956 | 24.006757 | 13.893367 | 9.034656 | 6.584297 |

TABLE 64

| Wavelength (nm) | 1000 | 1025 | 1050 | 1075 | 1100 | 1125 |
|---|---|---|---|---|---|---|
| Transmittance (%) | 5.308655 | 4.699266 | 4.485123 | 4.577695 | 4.965648 | 5.699364 |

TABLE 65

| Wavelength (nm) | 1150 | 1175 | 1200 | 1225 | 1250 | 1275 | 1300 |
|---|---|---|---|---|---|---|---|
| Transmittance (%) | 6.900259 | 8.734197 | 11.778213 | 16.532625 | 24.156327 | 38.453831 | 52.563673 |

Therefore, it is clear that one piece of the third-type imaging lens formed with 12 layers of the optical thin film on the object-side surface and 6 layers of the anti-reflection thin film on the image-side surface shows a better IR filtering characteristic.

Figure 43:
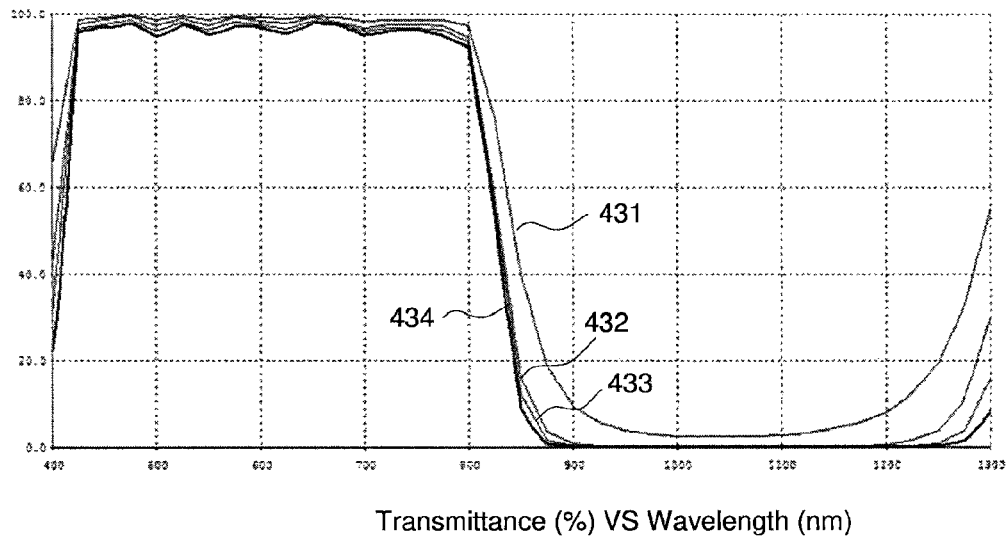
FIG. 43 shows a drawing of a spectrum after an optical lens assembly, which imaging lens assembly comprises one, two, three or four pieces of imaging lenses.
Figure 44:
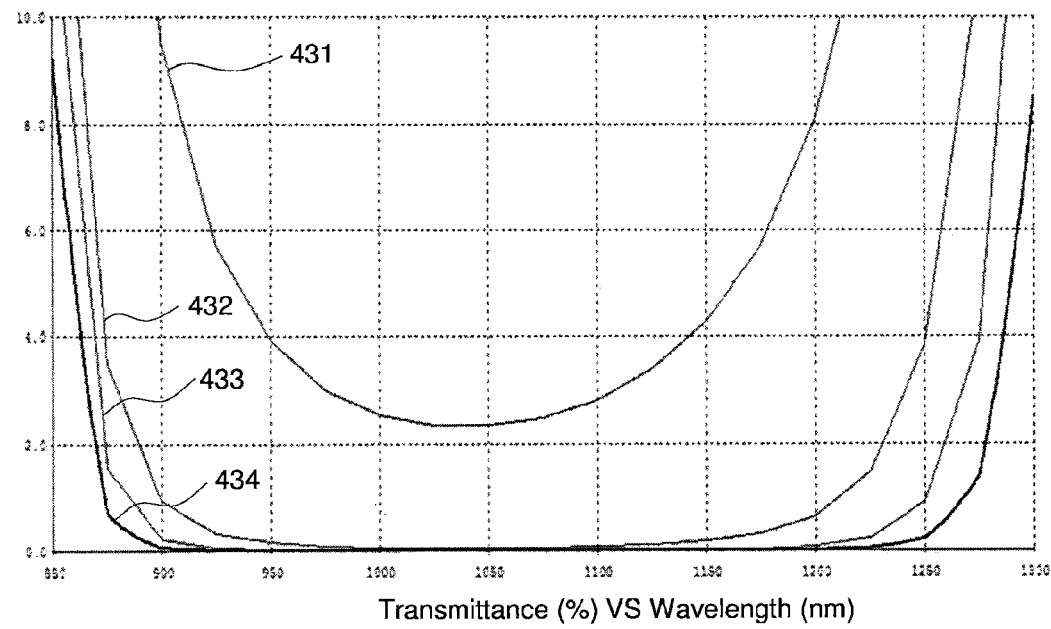
FIG. 44 shows an enlarged drawing of FIG. 43 in the wavelength range between 850 nm to 1300 nm.

Further, the optical lens assembly used here comprises an optical lens assembly comprising the first-type imaging lens formed with 12 layers of optical thin film on both object-side and image-side surfaces and/or the third-type imaging lens formed with 12 layers of optical thin film on the object-side surface and 6 layers of anti-reflection thin film on the image-side surface. FIG. 43 shows the spectrum after an optical lens assembly comprises several imaging lenses. FIG. 44 shows an enlarged drawings of FIG. 43 in the wavelength range between 850 nm to 1300 nm. The thin line 431 represents the spectrum after only one piece of the first-type imaging lens, the thin line 432 represents the spectrum after only two pieces of the first-type imaging lenses, the thin line 433 represents the spectrum after two pieces of the first-type imaging lenses and one piece of the third-type imaging lens, and the bold line 434 represents the spectrum after two pieces of the first-type imaging lenses and two pieces of the third-type imaging lenses. According to the drawing, it is clear that the imaging lenses comprising two pieces of the first-type imaging lenses, each of which is formed with 12 layers of the optical thin film on each surface, and two pieces of the third-type imaging lenses formed with 12 layers of the optical thin film on the object-side surface and 6 layers of the anti-reflection thin film on the image-side surface, show better IR filtering characteristics. In this regard, not only are the above (a), (b2) and (c) characteristics satisfied, but the transmittance is reduce to below 0.3% for the incident light with wavelength between 900 nm to 1250 nm and the transmittance is sustained to be higher than 80% for the incident light with wavelength between 450 nm to 650 nm. Please refer to Tables 66-68 as follows for the detail data:

TABLE 66

| Wavelength (nm) | 850 | 875 | 900 | 925 | 950 | 975 |
|---|---|---|---|---|---|---|
| Transmittance (%) | 9.248044 | 0.691325 | 0.052406 | 0.006297 | 0.001249 | 0.000392 |

TABLE 67

| Wavelength (nm) | 1000 | 1025 | 1050 | 1075 | 1100 | 1125 |
|---|---|---|---|---|---|---|
| Transmittance (%) | 0.000183 | 0.000123 | 0.000111 | 0.000131 | 0.000196 | 0.000368 |

TABLE 68

| Wavelength (nm) | 1150 | 1175 | 1200 | 1225 | 1250 | 1275 | 1300 |
|---|---|---|---|---|---|---|---|
| Transmittance (%) | 0.000864 | 0.002516 | 0.009097 | 0.040799 | 0.223864 | 1.536483 | 8.364383 |

Embodiment VI:

FIGS. 45-50 illustrate the spectrums for example embodiments referred to as Embodiment VI. The imaging lenses or the optical lens assembly assemblies chosen in the present embodiment are formed with 14 layers of the optical thin film, and the total thickness of the 14 layers of the optical thin film is between 1551 nm to 1900 nm. The imaging lenses comprise a body made of the plastic material E48R (refractive index 1.533), as provided by ZEONEX, and on at least one surface of the imaging lenses (i.e. at least one of the object-side surface and the image-side surface), a total of 14 layers of the optical thin film of a first material having higher refractive index ($Ti_3O_5$) and optical thin films of a second material having lower refractive index ($SiO_2$) are layered along a direction by vacuum coating. Please refer to Tables 69-70 for details of the thickness of each layer of the optical thin films of the first material and optical thin films of the second material and the total thickness of the optical thin films on the object-side surface of the imaging lens in the present embodiment:

TABLE 69

| The object-side surface | Total number of layers of the optical thin film | 14 | |
|---|---|---|---|
| | Material | $Ti_3O_5$ | $SiO_2$ |
| | Physical total thickness (nm) | 669.29 | 991.07 |
| | Total thickness (nm) | 1660.36 nm | |

TABLE 70

| The object-side surface of the imaging lens | | | | | | | |
|---|---|---|---|---|---|---|---|
| Layer | 1$^{st}$ layer | 2$^{nd}$ layer | 3$^{rd}$ layer | 4$^{th}$ layer | 5$^{th}$ layer | 6$^{th}$ layer | 7$^{th}$ layer |
| Material | $Ti_3O_5$ | $SiO_2$ | $Ti_3O_5$ | $SiO_2$ | $Ti_3O_5$ | $SiO_2$ | $SiO_2$ |
| Physical thickness (nm) | 13.66 | 33.98 | 117.44 | 176.99 | 109.83 | 174.7 | 105.61 |
| Layer | 8$^{th}$ layer | 9$^{th}$ layer | 10$^{th}$ layer | 11$^{th}$ layer | 12$^{th}$ layer | 13$^{th}$ layer | 14$^{th}$ layer |
| Material | $Ti_3O_5$ | $SiO_2$ | $Ti_3O_5$ | $SiO_2$ | $Ti_3O_5$ | $SiO_2$ | $SiO_2$ |
| Physical thickness (nm) | 167.71 | 104.55 | 173.34 | 109.15 | 176.2 | 109.06 | 88.15 |

Please refer to Tables 71-72 for details of the thickness of each layer of the optical thin films of the first material and the optical thin films of the second material and the total thickness of the optical thin films on the image-side surface of the imaging lens in the present embodiment:

TABLE 71

| The image-side surface | Total number of layers of the optical thin film | 14 | |
|---|---|---|---|
| | Material | $Ti_3O_5$ | $SiO_2$ |
| | Physical total thickness (nm) | 13.7 | 36.26 |
| | Total thickness (nm) | 1718.13 nm | |

TABLE 72

| The image-side surface of the imaging lens | | | | | | | |
|---|---|---|---|---|---|---|---|
| Layer | 1$^{st}$ layer | 2$^{nd}$ layer | 3$^{rd}$ layer | 4$^{th}$ layer | 5$^{th}$ layer | 6$^{th}$ layer | 7$^{th}$ layer |
| Material | $Ti_3O_5$ | $SiO_2$ | $Ti_3O_5$ | $SiO_2$ | $Ti_3O_5$ | $SiO_2$ | $SiO_2$ |
| Physical thickness (nm) | 13.7 | 36.26 | 123.17 | 184.97 | 113.52 | 179.98 | 108.72 |
| Layer | 8$^{th}$ layer | 9$^{th}$ layer | 10$^{th}$ layer | 11$^{th}$ layer | 12$^{th}$ layer | 13$^{th}$ layer | 14$^{th}$ layer |
| Material | $Ti_3O_5$ | $SiO_2$ | $Ti_3O_5$ | $SiO_2$ | $Ti_3O_5$ | $SiO_2$ | $SiO_2$ |
| Physical thickness (nm) | 173.66 | 108.5 | 178.71 | 111.32 | 181.07 | 112.6 | 91.94 |

Figure 45:
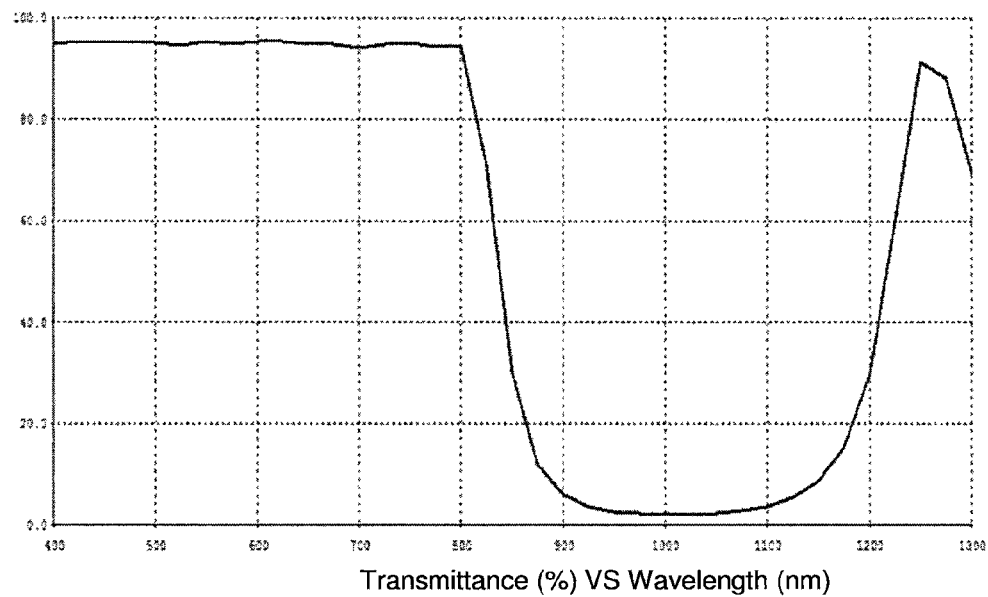
FIG. 45 shows a drawing of a spectrum after one piece of imaging lens, which is formed only with 14 layers of the optical thin film on the object-side surface.
Figure 46:
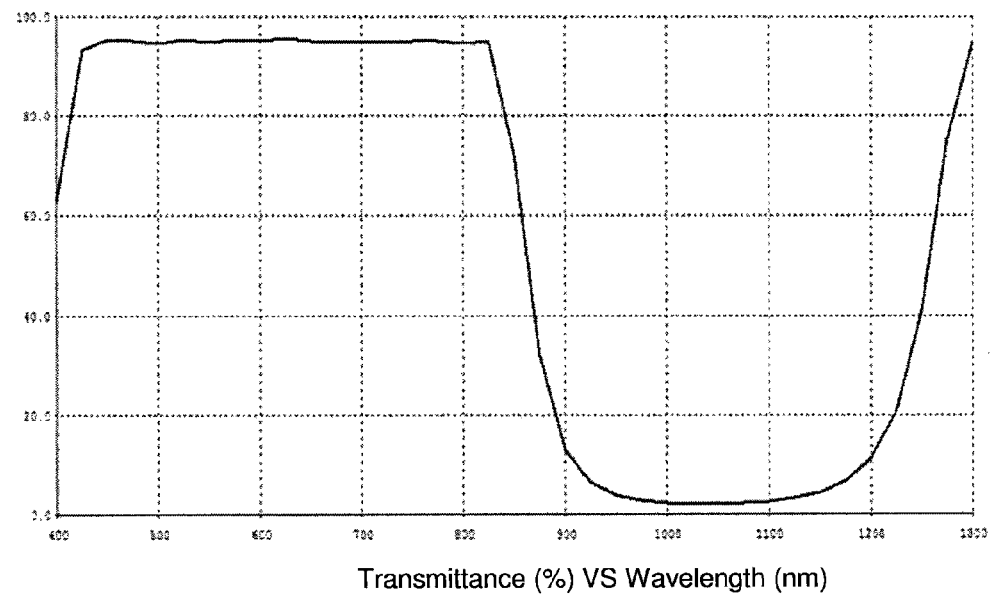
FIG. 46 shows a drawing of a spectrum after one piece of imaging lens, which is formed only with 14 layers of the optical thin film on the image-side surface.

FIG. 45 shows a drawing of a spectrum after one piece of imaging lens, which is formed only with 14 layers of the optical thin film on the object-side surface. FIG. 46 shows a drawing of a spectrum after one piece of imaging lens, which is formed only with 14 layers of the optical thin film on the image-side surface. According to FIGS. 45 and 46, it is clear that for incident light with wavelength between 500 nm to 1300 nm, a minimum transmittance falls within the wavelength range between 900 nm to 1250 nm, and for incident light with wavelength between 450 nm to 650 nm, the transmittance is over 80%.

Figure 47:
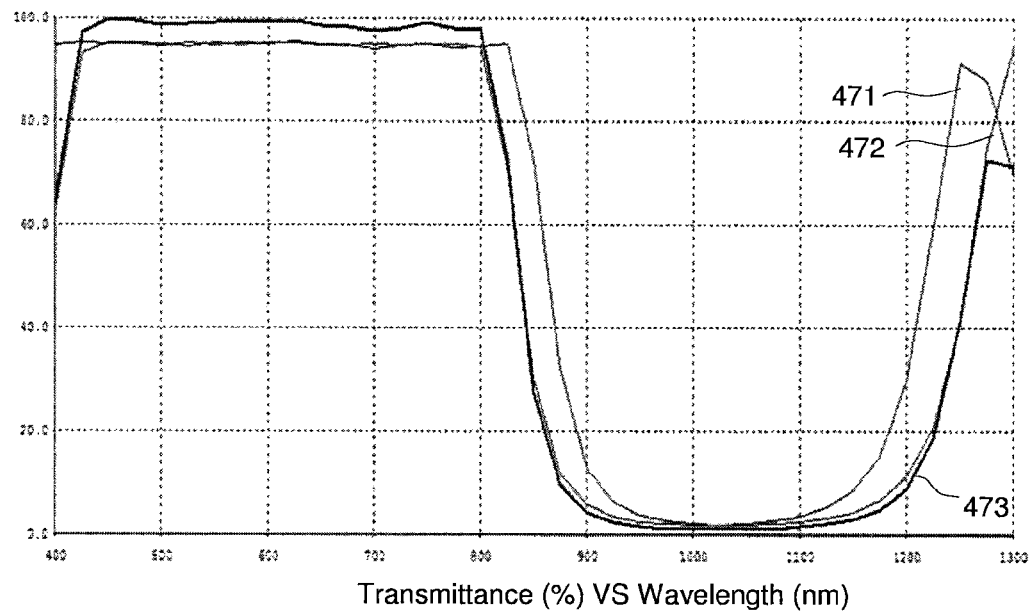
FIG. 47 shows a comparison drawing between the spectrum after one piece of imaging lens, which is formed only with 14 layers of the optical thin film on one surface and the spectrum after one piece of imaging lens formed with 14 layers of the optical thin film on each surface.
Figure 48:
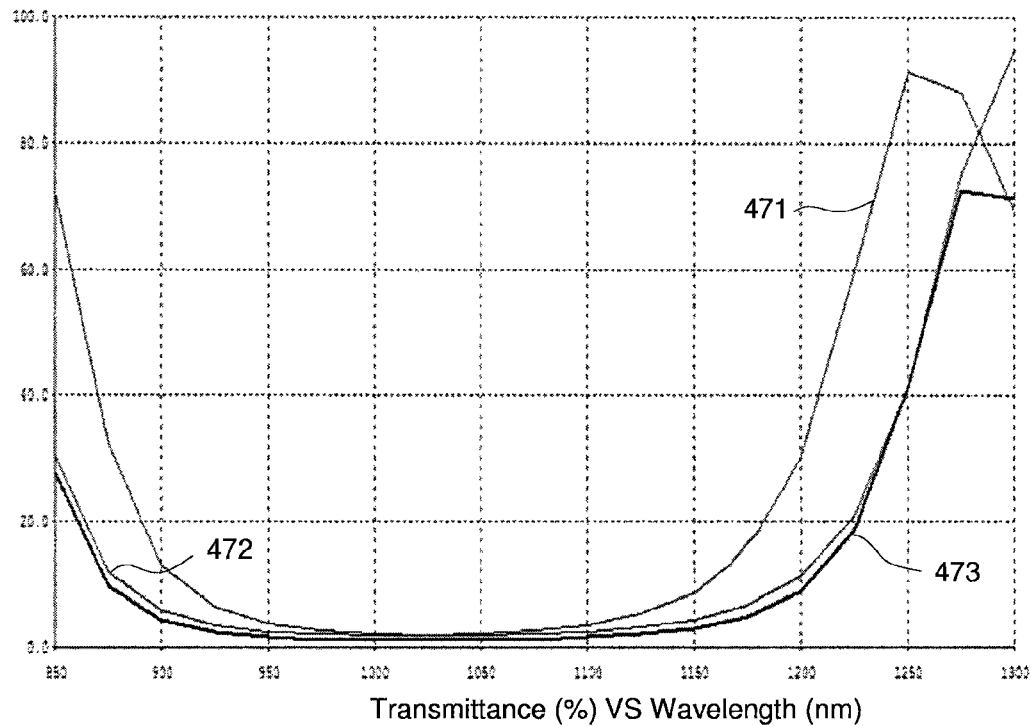
FIG. 48 shows an enlarged drawing of FIG. 47 in the wavelength range between 850 nm to 1300 nm.

FIG. 47 shows a summary of the spectrum after one piece of the imaging lens, which is formed only with 14 layers of the optical thin film on one surface (i.e. any one of the object-side surface and the image-side surface) and the spectrum after one piece of the imaging lens formed with 14 layers of the optical thin film on each surface (i.e. the object-side surface and the image-side surface). FIG. 48 shows an enlarged drawing of FIG. 47 in the wavelength range between 850 nm to 1300 nm. The thin line 471 represents the spectrum after one piece of the imaging lens, which is formed only with 14 layers of the optical thin film on the object-side surface, thin line 472 represents the spectrum after one piece of the imaging lens, which is formed only with 14 layers of the optical thin film on the image-side surface, and the bold line 473 represents the spectrum after one piece of the imaging lens formed with 14 layers of the optical thin film on each surface. The imaging lens formed with 14 layers of the optical thin film on each surface shows better characteristics than those of the imaging lens formed only with 14 layers of the optical thin film on one surface. The imaging lens formed with 14 layers of the optical thin film on each surface has aforesaid (a), (b1) and (c) characteristics and lower transmittance for incident light with wavelength between 900 nm to 1250 nm, and meanwhile provide transmittance greater than 80% for incident light with wavelength between 450 nm to 650 nm.

Please refer to Tables 73-75 for measured data of the transmittance of incident light with wavelength between 850 nm to 1300 nm of one piece of the imaging lens having both surfaces formed with 14 layers of the optical thin film:

TABLE 73

| Wavelength (nm) | 850 | 875 | 900 | 925 | 950 | 975 |
|---|---|---|---|---|---|---|
| Transmittance (%) | 27.68 | 9.64 | 4.21 | 2.32 | 1.52 | 1.16 |

TABLE 74

| Wavelength (nm) | 1000 | 1025 | 1050 | 1075 | 1100 | 1125 |
|---|---|---|---|---|---|---|
| Transmittance (%) | 1.01 | 0.97 | 1.03 | 1.19 | 1.49 | 2.03 |

TABLE 75

| Wavelength (nm) | 1150 | 1175 | 1200 | 1225 | 1250 | 1275 | 1300 |
|---|---|---|---|---|---|---|---|
| Transmittance (%) | 3.02 | 4.94 | 9.01 | 18.54 | 40.95 | 72.64 | 71.55 |

Figure 49:
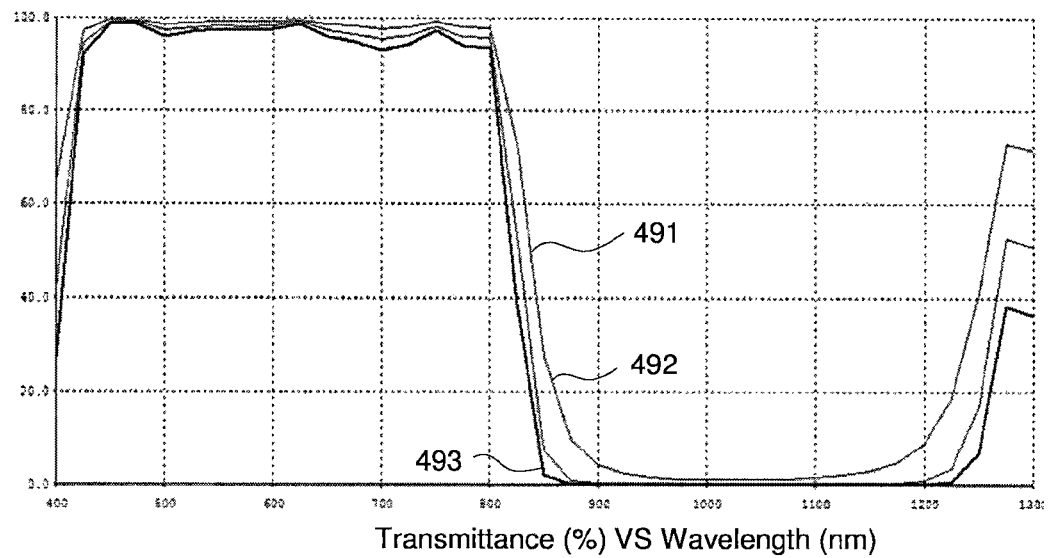
FIG. 49 shows a drawing of a spectrum after an optical lens assembly, which imaging lens assembly comprises one, two or three imaging lenses.
Figure 50:
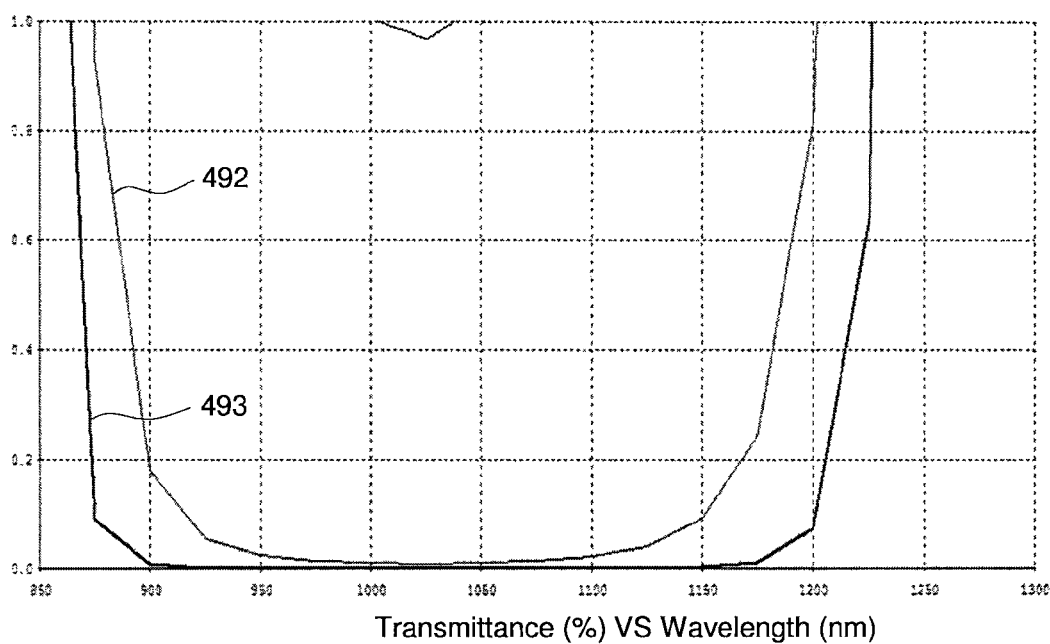
FIG. 50 shows an enlarged drawings of FIG. 49 in the wavelength range between 850 nm to 1300 nm.

FIG. 49 shows the spectrum after an optical lens assembly having several imaging lenses, and FIG. 50 shows an enlarged drawings of FIG. 49 in the wavelength range between 850 nm to 1300 nm. The imaging lenses comprise a body made of plastic material E48R (refractive index 1.533) by ZEONEX and layered with a total of 14 layers of the optical thin film of the first material made of $Ti_3O_5$ and the optical thin films of the second material made of $SiO_2$ layered along a direction on both surfaces (i.e. the object-side surface and the image-side surface) of the body through vacuum coating. The thin line 491 represents the spectrum after one piece of the imaging lens, the thin line 492 represents the spectrum after two pieces of the imaging lens, and the bold line 493 represents the spectrum after three pieces of the imaging lens. According to the drawing, it is clear that the optical lens assembly comprising three pieces of the imaging lens, each of which is formed with 14 layers of the optical thin film on each surface, shows better IR filtering characteristics. Not only are the above (a), (b2) and (c) characteristics satisfied, but the transmittance is reduce to below 0.7% for the incident light with wavelength between 900 nm to 1250 nm, and the transmittance is sustained to be higher than 80% for incident light with wavelength between 450 nm to 650 nm. Please refer to Tables 76-78 as follows for the detail data:

TABLE 76

| Wavelength (nm) | 850 | 875 | 900 | 925 | 950 | 975 |
|---|---|---|---|---|---|---|
| Transmittance (%) | 2.121334 | 0.089718 | 0.007471 | 0.001241 | 0.000354 | 0.000157 |

TABLE 77

| Wavelength (nm) | 1000 | 1025 | 1050 | 1075 | 1100 | 1125 |
|---|---|---|---|---|---|---|
| Transmittance (%) | 0.000101 | 0.000091 | 0.000109 | 0.000109 | 0.000168 | 0.000331 |

TABLE 78

| Wavelength (nm) | 1150 | 1175 | 1200 | 1225 | 1250 | 1275 | 1300 |
|---|---|---|---|---|---|---|---|
| Transmittance (%) | 0.000838 | 0.002752 | 0.012051 | 0.073258 | 0.636851 | 6.867583 | 38.527615 |

The below Table 79 summarizes the transmittance values of the above embodiments based on the spectrum of one piece of the imaging lens formed with the optical thin films or anti-reflection thin films on both object-side and image-side surfaces for incident light with wavelength between 850 nm to 1300 nm:

(a) The Imaging Lens:

TABLE 79

| Wavelength (nm) | Embodiment I<br>One piece of imaging lens<br>6 layers of the optical thin film<br>Total thickness on the object-side surface: 552.07 nm<br>Total thickness on the image-side surface: 552.07 nm<br>Transmittance | Embodiment II<br>One piece of imaging lens<br>8 layers of the optical thin film<br>Total thickness on the object-side: 831.93 nm<br>Total thickness on the image-side surface: 831.93 nm<br>Transmittance | Embodiment III<br>One piece of imaging lens<br>12 layers of the optical thin film<br>Total thickness on the object-side: 1395.89 nm<br>Total thickness on the image-side surface: 1437.78 nm<br>Transmittance | Embodiment IV — One piece of imaging lens (the first-type imaging lens)<br>12 layers of the optical thin film<br>Total thickness on the object-side: 1395.89 nm<br>Total thickness on the image-side surface: 1437.78 nm<br>Transmittance | Embodiment IV — One piece of imaging lens (the second-type imaging lens)<br>6 layers of anti-reflection thin film<br>Total thickness on the object-side: 265.21 nm<br>Total thickness on the image-side surface: 265.21 nm<br>Transmittance |
|---|---|---|---|---|---|
| 850 | 70.1 | 50.3 | 40.083 | 40.083 | 96.273903 |
| 875 | 62.4 | 37.6 | 18.564 | 18.564 | 94.903741 |
| 900 | 55.6 | 28.8 | 9.536 | 9.536 | 93.428992 |
| 925 | 49.8 | 22.9 | 5.711 | 5.711 | 91.914006 |
| 950 | 45.1 | 19.1 | 3.912 | 3.912 | 90.380883 |
| 975 | 41.1 | 16.5 | 3.006 | 3.006 | 88.863557 |
| 1000 | 38.1 | 14.8 | 2.546 | 2.546 | 87.387577 |
| 1025 | 35.8 | 13.8 | 2.357 | 2.357 | 85.999609 |
| 1050 | 34.1 | 13.2 | 2.347 (Minimum) | 2.347 (Minimum) | 84.680712 |
| 1075 | 32.7 | 13.1 (Minimum) | 2.494 | 2.494 | 83.438789 |
| 1100 | 31.7 | 13.2 | 2.816 | 2.816 | 82.278242 |
| 1125 | 31.1 | 13.6 | 3.367 | 3.367 | 81.200766 |
| 1150 | 30.7 | 14.3 | 4.261 | 4.261 | 80.206031 |
| 1175 | 30.6 | 15.3 | 5.704 | 5.704 | 79.292244 |
| 1200 | 30.6 (Minimum) | 16.6 | 8.098 | 8.098 | 78.456591 |
| 1225 | 30.9 | 18.3 | 12.218 | 12.218 | 77.695583 |
| 1250 | 31.4 | 20.4 | 19.587 | 19.587 | 77.005322 |
| 1275 | 31.5 | 22.6 | 38.765 | 38.765 | 76.536825 |
| 1300 | 31.6 | 25.1 | 55.512 | 55.512 | 74.923047 (Minimum) |

| Wavelength (nm) | Embodiment V — One piece of imaging lens (the first-type imaging lens)<br>12 layers of the optical thin film<br>Total thickness on the object-side surface: 1395.89 nm<br>Total thickness on the image-side surface: 1437.78 nm<br>Transmittance | Embodiment V — One piece of imaging lens (the third-type imaging lens)<br>12 layers of the optical thin film<br>Total thickness on the object-side surface: 1395.89 nm<br>6 layers of anti-reflection thin film<br>Total thickness on the image-side surface: 265.21 nm<br>Transmittance | Embodiment VI<br>One piece of imaging lens<br>14 layers of the optical thin film<br>Total thickness on the object-side surface: 1660.36 nm<br>Total thickness on the image-side surface: 1718.13 nm<br>Transmittance |
|---|---|---|---|
| 850 | 40.083 | 75.868202 | 27.68 |
| 875 | 18.564 | 44.788956 | 9.64 |
| 900 | 9.536 | 24.006757 | 4.21 |
| 925 | 5.711 | 13.893367 | 2.32 |
| 950 | 3.912 | 9.034656 | 1.52 |
| 975 | 3.006 | 6.584297 | 1.16 |
| 1000 | 2.546 | 5.308655 | 1.01 |
| 1025 | 2.357 | 4.699266 | 0.97 (Minimum) |
| 1050 | 2.347 (Minimum) | 4.485123 (Minimum) | 1.03 |
| 1075 | 2.494 | 4.577695 | 1.19 |
| 1100 | 2.816 | 4.965648 | 1.49 |
| 1125 | 3.367 | 5.699364 | 2.03 |
| 1150 | 4.261 | 6.900259 | 3.02 |

TABLE 79-continued

| | | | |
|---|---|---|---|
| 1175 | 5.704 | 8.734197 | 4.94 |
| 1200 | 8.098 | 11.778213 | 9.01 |
| 1225 | 12.218 | 16.532625 | 18.54 |
| 1250 | 19.587 | 24.156327 | 40.95 |
| 1275 | 38.765 | 38.453831 | 72.64 |
| 1300 | 55.512 | 52.563673 | 71.55 |

As seen from above data:

1. The minimum transmittance of one piece of the imaging lens formed with 6 layers of the optical thin film on the object-side and image-side surfaces of Embodiment I is 30.6% and occurs at a wavelength of 1175 nm.

2. The minimum transmittance of one piece of the imaging lens formed with 8 layers of the optical thin film on the object-side and image-side surfaces of Embodiment II is 13.1% and occurs at a wavelength of 1075 nm.

3. The minimum transmittance of one piece of the imaging lens formed with 12 layers of the optical thin film on the object-side and image-side surfaces of Embodiment III is 2.347% and occurs at a wavelength of 1050 nm.

4. The minimum transmittance of one piece of the first-type imaging lens formed with 12 layers of the optical thin film on the object-side and image-side surfaces of Embodiment IV is 2.347% and occurs at a wavelength of 1050 nm; the minimum transmittance of one piece of the second-type imaging lens formed with 6 layers of the anti-reflection thin film on the object-side and image-side surfaces of Embodiment IV is 74.923047% and occurs at a wavelength of 1300 nm.

5. The minimum transmittance of one piece of the first-type imaging lens formed with 12 layers of the optical thin film on the object-side and image-side surfaces of Embodiment V is 2.347% and occurs at a wavelength of 1050 nm; the minimum transmittance of one piece of the third-type imaging lens formed with 12 layers of the optical thin film on the object-side surfaces and 6 layers of the anti-reflection thin film on the image-side surfaces of Embodiment V is 4.485123% and occurs at a wavelength of 1050 nm.

6. The minimum transmittance of one piece of the imaging lens formed with 14 layers of the optical thin film on the object-side and image-side surfaces of Embodiment VI is 0.97% and occurs at a wavelength of 1025 nm.

7. In summary, the minimum transmittance of one piece of the imaging lens formed with the optical thin films of example embodiments falls within the wavelength range between 900 nm to 1250 nm, and for the range between 900 nm to 1250 nm wavelength, the value of the transmittance is not greater than 60%.

The below Table 80 summarizes the transmittance values and spectrums of the optical lens assembly of example embodiments and conventional optical lens assembly for incident light with wavelength between 850 nm to 1300 nm:

(b) The Optical Lens Assembly:

TABLE 80

| | | | Embodiment III | Embodiment IV | |
|---|---|---|---|---|---|
| Wavelength (nm) | Embodiment I Five pieces of the imaging lens 6 layers of the optical thin film Total thickness on the object-side surface: 552.07 nm Total thickness on the image-side surface: 552.07 nm Transmittance | Embodiment II Five pieces of the imaging lens 8 layers of the optical thin film Total thickness on the object-side surface: 831.93 nm Total thickness on the image-side surface: 831.93 nm Transmittance | Four pieces of the imaging lens 12 layers of the optical thin film Total thickness on the object-side surface: 1395.89 nm Total thickness on the image-side surface: 1437.78 nm Transmittance | Three pieces of the imaging lens (the first-type imaging lens) 12 layers of the optical thin film Total thickness on the object-side surface: 1395.89 nm Total thickness on the image-side surface: 1437.78 nm Transmittance | One piece of the imaging lens (the second-type imaging lens) 6 layers of the anti-reflection thin film Total thickness on the object-side surface: 265.21 nm Total thickness on the image-side surface: 265.21 nm Transmittance |
| 850 | 16.9112 | 3.2039 | 2.581432 | 6.20114 | |
| 875 | 9.4801 | 0.7506 | 0.118763 | 0.607226 | |
| 900 | 5.3009 | 0.1972 | 0.008269 | 0.081021 | |
| 925 | 3.0646 | 0.0634 | 0.001064 | 0.017126 | |
| 950 | 1.8527 | 0.0251 | 0.000234 | 0.005413 | |
| 975 | 1.1846 | 0.0121 | 0.000082 | 0.002413 | |
| 1000 | 0.8051 | 0.0071 | 0.000042 | 0.001441 | |
| 1025 | 0.5878 | 0.0049 | 0.000031 (Minimum) | 0.001126 | |
| 1050 | 0.4549 | 0.0041 | 0.000032 | 0.001094 (Minimum) | |
| 1075 | 0.3719 | 0.0038 (Minimum) | 0.000039 | 0.001294 | |
| 1100 | 0.3201 | 0.0039 | 0.000063 | 0.001836 | |
| 1125 | 0.2888 | 0.0046 | 0.000129 | 0.003099 | |
| 1150 | 0.2721 | 0.0059 | 0.000329 | 0.006199 | |
| 1175 | 0.2665 (Minimum) | 0.0083 | 0.001059 | 0.014709 | |
| 1200 | 0.2705 | 0.0126 | 0.0043 | 0.041637 | |
| 1225 | 0.2833 | 0.0203 | 0.022281 | 0.141611 | |
| 1250 | 0.3052 | 0.0349 | 0.147179 | 0.578273 | |
| 1275 | 0.3567 | 0.0672 | 9.5 | 3.647753 | |
| 1300 | 0.3942 | 0.1155 | 4.01 | 11.25463 | |

TABLE 80-continued

| | Embodiment V | | | Conventional optical lens assembly |
| --- | --- | --- | --- | --- |
| Wavelength (nm) | Two pieces of the imaging lens (the first-type imaging lens) 12 layers of the optical thin films Total thickness on the object-side surface: 1395.89 nm Total thickness on the image-side surface: 1437.78 nm transmittance | Two pieces of the imaging lens (the third-type imaging lens) 12 layers of the optical thin films Total thickness on the object-side surface: 1395.89 nm Six layers of the anti-reflection thin film Total thickness on the image-side surface: 265.21 nm transmittance | Embodiment VI Three pieces of the imaging lens 14 layers of the optical thin films Total thickness on the object-side surface: 1660.36 nm Total thickness on the image-side surface: 1718.13 nm transmittance | Five pieces of the imaging lens and the IR filter 60 layers of IR filtering thin films Total thickness on the object-side surface: 8709.71 nm 4 layers of the anti-reflection thin film Total thickness on the image-side surface: 271.39 nm transmittance |
| 850 | 9.248044 | | 2.121334 | 54.602513 |
| 875 | 0.691325 | | 0.089718 | 0.136266 |
| 900 | 0.052406 | | 0.007471 | 0.006065 |
| 925 | 0.006297 | | 0.001241 | 0.000021 |
| 950 | 0.001249 | | 0.000354 | 0.000001 |
| 975 | 0.000392 | | 0.000157 | 0.000001 |
| 1000 | 0.000183 | | 0.000101 | 0.000001 |
| 1025 | 0.000123 | | 0.000091 (Minimum) | 0.000001 |
| 1050 | 0.000111 (Minimum) | | 0.000109 | 0.000001 |
| 1075 | 0.000131 | | 0.000109 | 0.000001 |
| 1100 | 0.000196 | | 0.000168 | 0.000001 |
| 1125 | 0.000368 | | 0.000331 | 0.000001 |
| 1150 | 0.000864 | | 0.000838 | 0.000142 |
| 1175 | 0.002516 | | 0.002752 | 0.000421 |
| 1200 | 0.009097 | | 0.012051 | 0.061105 |
| 1225 | 0.040799 | | 0.073258 | 0.033138 |
| 1250 | 0.223864 | | 0.636851 | 0.983475 |
| 1275 | 1.536483 | | 6.867583 | 6.389431 |
| 1300 | 8.364383 | | 38.527615 | 2.364835 |

The transmittance of the conventional optical lens assembly, which uses a combination of the IR filter and five pieces of traditional imaging lens, is not greater than 1% for the wavelength range between 900 nm to 1250 nm. However, the optical lens assembly in example embodiments comprising the imaging lens having multiple layers of the optical thin film or anti-reflection thin films also achieves a transmittance not greater than 1% for the wavelength range between 900 nm to 1250 nm. Since the transmittance shown in Embodiment I may be greater than 1% for the wavelength range between 900 nm to 1000 nm, this is acceptable for low-end products, which could use the optical lens assembly to provide transmittance not greater than 10%.

Additionally, from the values shown in Embodiment II to Embodiment VI, between wavelength 900 nm to 950 nm, the transmittance is far below 1%, and even below 0.01%. Therefore, the effect of filtering the IR lights in example embodiments is much better than those in conventional optical lens assembly assemblies.

Based on the data of above table, it is clear that:

1. The minimum transmittance of the optical lens assembly comprising the five pieces of the imaging lens (formed with 6 layers of the optical thin film on the both object-side and image-side surfaces) of Embodiment I is 0.2665% and occurs at a wavelength of 1175 nm, and the transmittance for the wavelength between 900 nm to 1250 nm is in the range between 5.3009% to 0.3052%.

2. The minimum transmittance of the optical lens assembly comprising the five pieces of the imaging lens (formed with 8 layers of the optical thin film on the both object-side and image-side surfaces) of Embodiment II is 0.0038% and occurs at a wavelength of 1075 nm, and the transmittance for the wavelength between 900 nm to 1250 nm is in the range between 0.1972% to 0.0349%.

3. The minimum transmittance of the optical lens assembly comprising the four pieces of the imaging lens (formed with 12 layers of the optical thin film on the both object-side and image-side surfaces) of Embodiment III is 0.000031% and occurs at a wavelength of 1025 nm, and the transmittance for the wavelength between 900 nm to 1250 nm is in the range between 0.008269% to 0.147179%.

4. The minimum transmittance of the optical lens assembly comprising the three pieces of the imaging lens (formed with 12 layers of the optical thin film on the both object-side and image-side surfaces) and one piece of the imaging lens (formed with 6 layers of the anti-reflection thin film on the both object-side and image-side surfaces) of Embodiment IV is 0.001094% and occurs at a wavelength of 1050 nm, and the transmittance for the wavelength between 900 nm to 1250 nm is in the range between 0.081021% to 0.578273%.

5. The minimum transmittance of the optical lens assembly comprising the two pieces of the imaging lens (formed with 12 layers of the optical thin film on the both object-side and image-side surfaces) and two pieces of the imaging lens (formed with 12 layers of the optical thin film on the object-side surface and 6 layers of the anti-reflection thin film on the image-side surfaces) of Embodiment V is 0.000111% and occurs at a wavelength of 1050 nm, and the transmittance for the wavelength between 900 nm to 1250 nm is in the range between 0.052406% to 0.223864%.

6. The minimum transmittance of the optical lens assembly comprising the three pieces of the imaging lens (formed with 14 layers of the optical thin film on the both object-side and image-side surfaces) of Embodiment VI is 0.000091% and occurs at a wavelength of 1025 nm, and the transmittance for the wavelength between 900 nm to 1250 nm is in the range between 0.007471% to 0.636851%.

7. In summary, the minimum transmittance of the optical lens assembly formed with the optical thin films of example embodiments falls in the wavelength range between 900 nm to 1250 nm, and for the wavelength range between 900 nm to 1250 nm, the value of the transmittance is not greater than 6%.

Therefore, a lower transmittance for the IR light can be achievable by a greater total amount and thicker total thickness of the optical thin films on the imaging lens, which enables the optical lens assembly to filter the IR light.

Additionally, for the incident light with wavelength between 450 nm to 650 nm, all of the imaging lens and the optical lens assembly of the aforesaid embodiments are operable to provide transmittance of over 80%. In some embodiments, such as the imaging lens of Embodiment I, a transmittance of greater than 90% is achievable. As such, example embodiments are operable to achieve high transparency of visible light.

Hence, through the layered structure of the optical thin films on at least one of the object-side surface and image-side surface of the imaging lens, which accumulatedly filters the IR light band in the spectrum, example embodiments of the imaging lenses satisfy the conditions as follows: (a) for incident light with wavelength between 500 nm to 1300 nm, a minimum transmittance of the imaging lens falls within a range between 900 nm and 1250 nm; (b1) for incident light with wavelength between 900 nm to 1250 nm, transmittance of the imaging lens is not greater than 60%; and (c) for incident light with wavelength between 450 nm to 650 nm, transmittance of the imaging lens is greater than 80%. Furthermore, example embodiments of the optical lens assembly assemblies satisfy the conditions as follows: (a) for incident light with wavelength between 500 nm to 1300 nm, a minimum transmittance of the optical lens assembly falls within a range between 900 nm and 1250 nm; (b2) for incident light with wavelength between 900 nm to 1250 nm, transmittance of the optical lens assembly is not greater than 10%; and (c) for incident light with wavelength between 450 nm to 650 nm, transmittance of the optical lens assembly is greater than 80%. As such, example embodiments of the optical lens assembly and imaging lens are operable to filter the IR light with the imaging lens to reduce the undesirable effect of the IR light, which would affect the image quality, and such embodiments do not require any additional IR filter. As such, a reduction in total length of the optical lens assembly is achievable.

While various embodiments in accordance with the disclosed principles have been described above, it should be understood that they have been presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only one piece of point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An imaging lens, comprising:
   a body having refractive index, said body comprising two surfaces, wherein at least one of the surfaces comprises a curved surface portion, and wherein at least one of the surfaces comprises a plurality of layers of optical thin film;
   wherein the optical thin films comprises a plurality of optical thin films of a first material and a plurality of optical thin films of a second material layered along a direction, each of the optical thin films of the second material layered between two adjacent layers of optical thin films of the first material, the optical thin films of the first material having a first refractive index greater than the refractive index of the body, and the optical thin films of the second material having a second refractive index less than the refractive index of the body;
   wherein a total number of optical thin films on each of the two surfaces is not greater than 20 layers;
   wherein a total thickness of the optical thin films on one single surface is not less than 400 nm and not greater than 2000 nm; and
   wherein the imaging lens is configurable to achieve:
   a. a minimum transmittance of the imaging lens within a range between 900 nm and 1250 nm for incident light with wavelength between 500 nm to 1300 nm;
   b1. a transmittance of the imaging lens being not greater than 60% for incident light with wavelength between 900 nm to 1250 nm; and
   c. a transmittance of the imaging lens being greater than 80% for incident light within the whole visible light spectrum range of wavelengths between 450 nm to 700 nm.

2. The imaging lens of claim 1, wherein the total number of optical thin films on each of the two surfaces is not less than 8 layers and not greater than 16 layers.

3. The imaging lens of claim 2, wherein the thinnest layer of the optical thin films of the first material is adjacent to the thinnest layer of the optical thin films of the second material.

4. The imaging lens of claim 3, wherein a plurality of layers of anti-reflection thin film are formed on a surface of the imaging lens, and the transmittance of the imaging lens is greater than 80% for incident light with wavelength between 450 nm to 650 nm.

5. The imaging lens of claim 1, wherein the optical thin films are formed on each surface of the body, and the total number of optical thin films on each surface is not less than 6 layers and not greater than 16 layers.

6. The imaging lens of claim 1, wherein the thinnest layer of the optical thin films of the first material is adjacent to the thinnest layer of the optical thin films of the second material.

7. The imaging lens of claim 1, wherein a plurality of layers of anti-reflection thin film are formed on a surface of the imaging lens, and the transmittance of the imaging lens is greater than 80% for incident light with wavelength between 450 nm to 650 nm.

* * * * *